(12) United States Patent
von Flotow et al.

(10) Patent No.: US 11,414,187 B2
(45) Date of Patent: Aug. 16, 2022

(54) PARASAIL-ASSISTED SYSTEMS AND METHODS FOR LAUNCHING AND RETRIEVING A FIXED-WING AIRCRAFT INTO AND FROM FREE FLIGHT

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 862 days.

(21) Appl. No.: 16/119,301

(22) Filed: Aug. 31, 2018

(65) Prior Publication Data

US 2019/0071176 A1 Mar. 7, 2019

Related U.S. Application Data

(60) Provisional application No. 62/554,901, filed on Sep. 6, 2017, provisional application No. 62/657,104, filed on Apr. 13, 2018.

(51) Int. Cl.
| | |
|---|---|
| *B64C 39/02* | (2006.01) |
| *B64F 1/02* | (2006.01) |
| *B64F 1/10* | (2006.01) |
| *B64F 1/36* | (2017.01) |
| *B64F 1/34* | (2006.01) |

(Continued)

(52) U.S. Cl.
CPC ............ *B64C 39/024* (2013.01); *B64F 1/025* (2013.01); *B64F 1/0295* (2020.01); *B64F 1/04* (2013.01); *B64F 1/10* (2013.01); *B64F 1/34* (2013.01); *B64F 1/36* (2013.01); *B66D 1/46* (2013.01); *B66D 1/60* (2013.01); *B64C 2201/021* (2013.01); *B64C 2201/08* (2013.01); *B64C 2201/104* (2013.01); *B64C 2201/107* (2013.01);

(Continued)

(58) Field of Classification Search
CPC .......... B64C 2201/08; B64C 2201/182; B64C 2201/205; B64F 1/0295; B64F 1/0297
See application file for complete search history.

(56) References Cited

U.S. PATENT DOCUMENTS

| | | | |
|---|---|---|---|
| 968,339 | A | 8/1910 | Geraldson |
| 1,144,505 | A | 6/1915 | Steffan |

(Continued)

FOREIGN PATENT DOCUMENTS

| | | |
|---|---|---|
| CA | 781808 | 4/1968 |
| CA | 839101 | 4/1970 |

(Continued)

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (23 pp.).

(Continued)

*Primary Examiner* — Nicholas McFall
(74) *Attorney, Agent, or Firm* — Neal, Gerber & Eisenberg LLP

(57) ABSTRACT

Various embodiments of the present disclosure provide a parasail-assisted system for launching a fixed-wing aircraft into free flight and for retrieving a fixed-wing aircraft from free flight.

30 Claims, 54 Drawing Sheets

(51) Int. Cl.
B66D 1/46 (2006.01)
B66D 1/60 (2006.01)
B64F 1/04 (2006.01)

(52) U.S. Cl.
CPC .. *B64C 2201/182* (2013.01); *B64C 2201/205* (2013.01)

(56) References Cited

U.S. PATENT DOCUMENTS

| | | |
|---|---|---|
| 1,306,860 A | 6/1919 | Smith |
| 1,383,595 A | 7/1921 | Black |
| 1,499,472 A | 7/1924 | Pratt |
| 1,582,188 A | 4/1926 | Mummert |
| 1,625,020 A | 4/1927 | Guillermo |
| 1,686,298 A | 10/1928 | Uhl |
| 1,716,670 A | 6/1929 | Sperry |
| 1,731,091 A | 10/1929 | Clayton |
| 1,748,663 A | 2/1930 | Tucker |
| 1,836,010 A | 12/1931 | Audrain |
| 1,848,828 A | 3/1932 | Griffin |
| 1,912,723 A | 6/1933 | Perkins |
| 2,415,071 A | 2/1947 | Brie |
| 2,435,197 A | 2/1948 | Brodie |
| 2,440,574 A | 4/1948 | Cotton |
| 2,448,209 A | 8/1948 | Boyer et al. |
| 2,488,050 A | 11/1949 | Brodie |
| 2,488,051 A | 11/1949 | Brodie |
| 2,552,115 A | 5/1951 | Replogle |
| 2,807,429 A | 9/1957 | Hawkins, Jr. et al. |
| 2,843,337 A | 7/1958 | Bennett |
| 2,944,815 A | 7/1960 | Moyer |
| 3,017,138 A | 1/1962 | Flint |
| 3,029,049 A | 4/1962 | Melville |
| 3,146,974 A | 9/1964 | Petoia |
| 3,351,325 A | 11/1967 | Cotton |
| 3,389,880 A | 6/1968 | Ferguson |
| 3,785,316 A | 1/1974 | Leming et al. |
| 3,980,259 A | 9/1976 | Greenhalgh et al. |
| 3,987,746 A | 10/1976 | McCulloh |
| 4,079,901 A | 3/1978 | Mayhew et al. |
| 4,116,408 A | 9/1978 | Soloy |
| 4,123,020 A | 10/1978 | Korsak |
| 4,147,317 A | 4/1979 | Mayhew et al. |
| 4,267,987 A | 5/1981 | McDonnell |
| 4,311,290 A | 1/1982 | Koper |
| 4,313,582 A | 2/1982 | Hasquenoph et al. |
| 4,523,729 A | 6/1985 | Frick |
| 4,575,026 A | 3/1986 | Brittain et al. |
| 4,680,962 A | 7/1987 | Durbin |
| 4,738,414 A | 4/1988 | McCulloh |
| 4,753,400 A * | 6/1988 | Reuter ............... B64F 1/027 244/110 R |
| 4,757,959 A | 7/1988 | Schroder et al. |
| 4,790,497 A | 12/1988 | Yoffe |
| 4,842,222 A | 6/1989 | Baird |
| 5,000,398 A | 3/1991 | Rashev |
| 5,039,034 A | 8/1991 | Burgess et al. |
| 5,042,750 A | 8/1991 | Winter |
| 5,054,717 A | 10/1991 | Taylor |
| 5,092,540 A | 3/1992 | Burgess et al. |
| 5,687,930 A | 11/1997 | Wagner et al. |
| 5,799,900 A | 9/1998 | McDonnell |
| 5,806,795 A | 9/1998 | Ortelli |
| 6,264,140 B1 | 7/2001 | McGeer et al. |
| 6,824,102 B2 | 11/2004 | Haggard |
| 6,874,729 B1 * | 4/2005 | McDonnell ............ B64C 25/68 244/63 |
| 6,961,018 B2 | 11/2005 | Heppe et al. |
| 7,000,883 B2 | 2/2006 | Mercadal et al. |
| 7,028,947 B2 | 4/2006 | Burns |
| 7,059,564 B2 | 6/2006 | Dennis |
| 7,066,430 B2 | 6/2006 | Dennis et al. |
| 7,090,166 B2 | 8/2006 | Dennis et al. |
| 7,097,137 B2 | 8/2006 | McDonnell |
| 7,104,495 B2 | 9/2006 | McGeer |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,143,976 B2 | 12/2006 | Snediker et al. |
| 7,152,827 B2 | 12/2006 | McGeer |
| 7,165,745 B2 | 1/2007 | McGeer et al. |
| 7,175,135 B2 | 2/2007 | Dennis et al. |
| 7,219,856 B2 | 5/2007 | Watts et al. |
| 7,264,204 B1 | 9/2007 | Portmann |
| 7,344,108 B2 | 3/2008 | Muylaert et al. |
| 7,360,741 B2 | 4/2008 | McGeer et al. |
| 7,410,125 B2 | 8/2008 | Steele |
| 7,464,650 B2 | 12/2008 | Steinkerchner et al. |
| 7,510,145 B2 | 3/2009 | Snediker |
| 7,530,527 B2 | 5/2009 | Kelleher |
| 7,543,780 B1 | 6/2009 | Marshall et al. |
| 7,562,843 B2 | 7/2009 | Lipponen |
| 7,578,467 B2 | 8/2009 | Goodrich |
| 7,581,702 B2 | 9/2009 | Olson et al. |
| 7,602,415 B2 | 10/2009 | von Flotow et al. |
| 7,665,691 B2 | 2/2010 | Hanzlick et al. |
| 7,712,702 B2 | 5/2010 | McGeer et al. |
| 7,798,445 B2 | 9/2010 | Heppe et al. |
| 7,806,366 B2 | 10/2010 | Jackson |
| 7,876,359 B2 | 1/2011 | von Flotow et al. |
| 7,883,059 B2 | 2/2011 | Kunz |
| 7,954,758 B2 | 6/2011 | McGeer et al. |
| 8,091,833 B2 | 1/2012 | von Flotow et al. |
| 8,140,200 B2 | 3/2012 | Heppe et al. |
| 8,162,256 B2 | 4/2012 | Goossen et al. |
| 8,172,177 B2 | 5/2012 | Lovell et al. |
| 8,226,039 B2 | 7/2012 | von Flotow et al. |
| 8,231,083 B2 | 7/2012 | Kutzmann et al. |
| 8,245,968 B2 | 8/2012 | McGeer et al. |
| 8,276,844 B2 | 10/2012 | Kariv |
| 8,292,215 B2 | 10/2012 | Olm et al. |
| 8,313,057 B2 | 11/2012 | Rednikov |
| 8,348,193 B2 | 1/2013 | McGeer et al. |
| 8,405,723 B2 | 3/2013 | von Flotow et al. |
| 8,453,966 B2 | 6/2013 | McGeer et al. |
| 8,464,981 B2 | 6/2013 | Goldie et al. |
| 8,573,536 B2 | 11/2013 | McGeer et al. |
| 8,596,576 B1 | 12/2013 | McGeer et al. |
| 8,672,264 B1 | 3/2014 | McGeer et al. |
| 8,708,277 B1 | 4/2014 | McGeer et al. |
| 8,708,278 B2 | 4/2014 | McGeer et al. |
| 8,714,482 B2 | 5/2014 | McGeer et al. |
| 8,740,134 B2 | 6/2014 | Suzuki |
| 8,740,142 B2 | 6/2014 | McGeer et al. |
| 8,944,373 B2 | 2/2015 | Dickson et al. |
| 8,950,698 B1 | 2/2015 | Rossi |
| 8,955,800 B2 | 2/2015 | McGeer et al. |
| 8,955,801 B2 | 2/2015 | McGeer et al. |
| 8,991,793 B2 | 3/2015 | Bernhardt |
| 9,004,402 B2 | 4/2015 | McGeer et al. |
| 9,010,683 B2 | 4/2015 | Gundlach et al. |
| 9,132,916 B2 | 9/2015 | Hanna et al. |
| 9,193,481 B2 | 11/2015 | McGeer et al. |
| 9,266,609 B1 | 2/2016 | Kunz |
| 9,290,269 B2 | 3/2016 | Walker et al. |
| 9,340,301 B2 | 5/2016 | Dickson et al. |
| 9,359,075 B1 | 6/2016 | von Flotow et al. |
| 9,434,481 B2 | 9/2016 | McGeer |
| 9,456,185 B2 | 9/2016 | Oakley et al. |
| 9,656,765 B2 | 5/2017 | von Flotow et al. |
| 9,685,091 B2 | 6/2017 | Hayes |
| 9,816,816 B2 | 11/2017 | Hayes |
| 9,856,036 B2 | 1/2018 | Dickson et al. |
| 9,896,222 B2 | 2/2018 | Kunz et al. |
| 2002/0100838 A1 | 8/2002 | McGeer et al. |
| 2003/0222173 A1 | 12/2003 | McGeer et al. |
| 2004/0256519 A1 | 12/2004 | Ellis et al. |
| 2005/0017129 A1 | 1/2005 | McDonnell |
| 2005/0178894 A1 | 8/2005 | McGeer et al. |
| 2010/0025528 A1 | 2/2010 | Jackson |
| 2010/0038477 A1 | 2/2010 | Kutzmann et al. |

(56) References Cited

U.S. PATENT DOCUMENTS

| | | | |
|---|---|---|---|
| 2012/0223182 | A1 | 9/2012 | Gilchrist et al. |
| 2013/0161447 | A1 | 6/2013 | McGeer et al. |
| 2014/0263852 | A1 | 9/2014 | Walker et al. |
| 2015/0129716 | A1 | 5/2015 | Yoffe |
| 2015/0314871 | A1 | 11/2015 | von Flotow |
| 2016/0023760 | A1 | 1/2016 | Goodrich |
| 2016/0114906 | A1 | 4/2016 | McGeer et al. |
| 2016/0221683 | A1 | 8/2016 | Roberts et al. |
| 2016/0327945 | A1 | 11/2016 | Davidson |
| 2016/0375981 | A1* | 12/2016 | McDonnell ........... B64F 1/0299 244/13 |
| 2017/0036762 | A1 | 2/2017 | Gamble et al. |
| 2017/0072812 | A1 | 3/2017 | Von Novak et al. |
| 2017/0158318 | A1 | 6/2017 | Von Flotow et al. |
| 2017/0225784 | A1 | 8/2017 | Hayes et al. |
| 2017/0274997 | A1 | 9/2017 | von Flotow et al. |
| 2017/0297738 | A1 | 10/2017 | von Flotow et al. |
| 2017/0369185 | A1 | 12/2017 | Grubb |
| 2018/0050823 | A1 | 2/2018 | McGeer |
| 2018/0327093 | A1 | 11/2018 | von Flotow et al. |
| 2018/0327113 | A1 | 11/2018 | von Flotow et al. |

FOREIGN PATENT DOCUMENTS

| | | |
|---|---|---|
| CN | 204822072 | 12/2015 |
| EP | 0 472 613 | 4/1992 |
| EP | 0786403 A1 | 7/1997 |
| EP | 2 186 728 | 5/2010 |
| GB | 2 071 031 | 9/1981 |
| WO | WO 01/07318 | 2/2001 |
| WO | 02076826 A1 | 10/2002 |
| WO | WO 2008/015663 | 2/2008 |
| WO | WO 2013/171735 | 11/2013 |
| WO | WO 2014/0204550 | 12/2014 |
| WO | 2015160394 A2 | 10/2015 |
| WO | WO 2016/167849 | 10/2016 |
| WO | 2018189324 A1 | 10/2018 |

OTHER PUBLICATIONS

Aerosonde hazard estimation, T. McGeer, 1994, (7 pp).
Aerosonde Pacific reconnaissance: ready when you are!, T. McGeer, Pacific Northwest Weather Workshop, Mar. 2005, (15 pp).
An Airspeed Vector Sensor for V/STOL Aircraft, E. J. Durbin and T. McGeer, Journal of Aircraft, vol. 19 No. 6, Jun. 1982, (7 pp).
Automated Launch, Recovery, and Refueling for Small Unmanned Aerial Vehicles, K. Mullens et al., 2004 (11 pp).
Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).
AVIASTAR, "Bell QTR Quad Tiltrotor", Jul. 27, 2015 (3 pages).
Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).
Laima: The First Atlantic Crossing by Unmanned Aircraft, T. McGeer, Feb. 1999, (25 pp).
Mini-RPV Recovery System Conceptual Study, Prepared for Eustis Directorate U.S. Army Air Mobility Research and Development Laboratory, Aug. 1977 (322 pages).
Quantitative Risk Management as a Regulatory Approach to Civil UAVs, T. McGeer, L. Newcombe, and J. Vagners, International Workshop on UAV Certification, Jun. 1999, (11 pp).
Regulatory Issues Involving Long-Range Weather Observation by Aerosonde Autonomous Aircraft, T. McGeer, Oct. 1998, (8 pp).
Rotary Action, description of scene of License to Kill, available at http://www.rotaryaction.com/pages/licetkil.html (2 pp).
Safety, Economy, Reliability and Regulatory Policy of Unmanned Aircraft, T. McGeer, Mar. 2007, (9 pp).
Skyhook (Harrier handling system); Harpoon Head Quarters; available at http://www.harpoondatabases.com/encyclopedia/Entry2979.aspx; printed Jun. 21, 2013 (3 pages).
The Beartrap—A Canadian Invention, Crowsnest Magazine, vol. 17, No. 3 and 4 [online], Mar.-Apr. 1965, [retrieved on Sep. 14, 2007], Retrieved from the Internet at http://www.readyayeready.com/timeline/1960s/beartrap/index.htm>. (4 pp).
"Trapeze" Wikipedia, Aug. 4, 2006, available at http://en.wikipedia.org/w/index.php?title=Trapeze&oldid=67584367.
Wide-Scale Use of Long-Range Miniature Aerosondes Over the World's Oceans, T. McGeer and J. Vagners, 1999, (25 pp).
"PCT International Search Report and Written Opinion", corresponding PCT Application No. PCT/US2020/056773 (11 pages), dated Jan. 29, 2021.
Screen captures from YouTube video clip entitled "Rc glider launched," 20 pages, uploaded on Sep. 11, 2016 by user "carrier drone". Retrieved from Internet: https://www.youtube.com/watch?v_cAyDJBosNuI&feature=youtu.be.

* cited by examiner

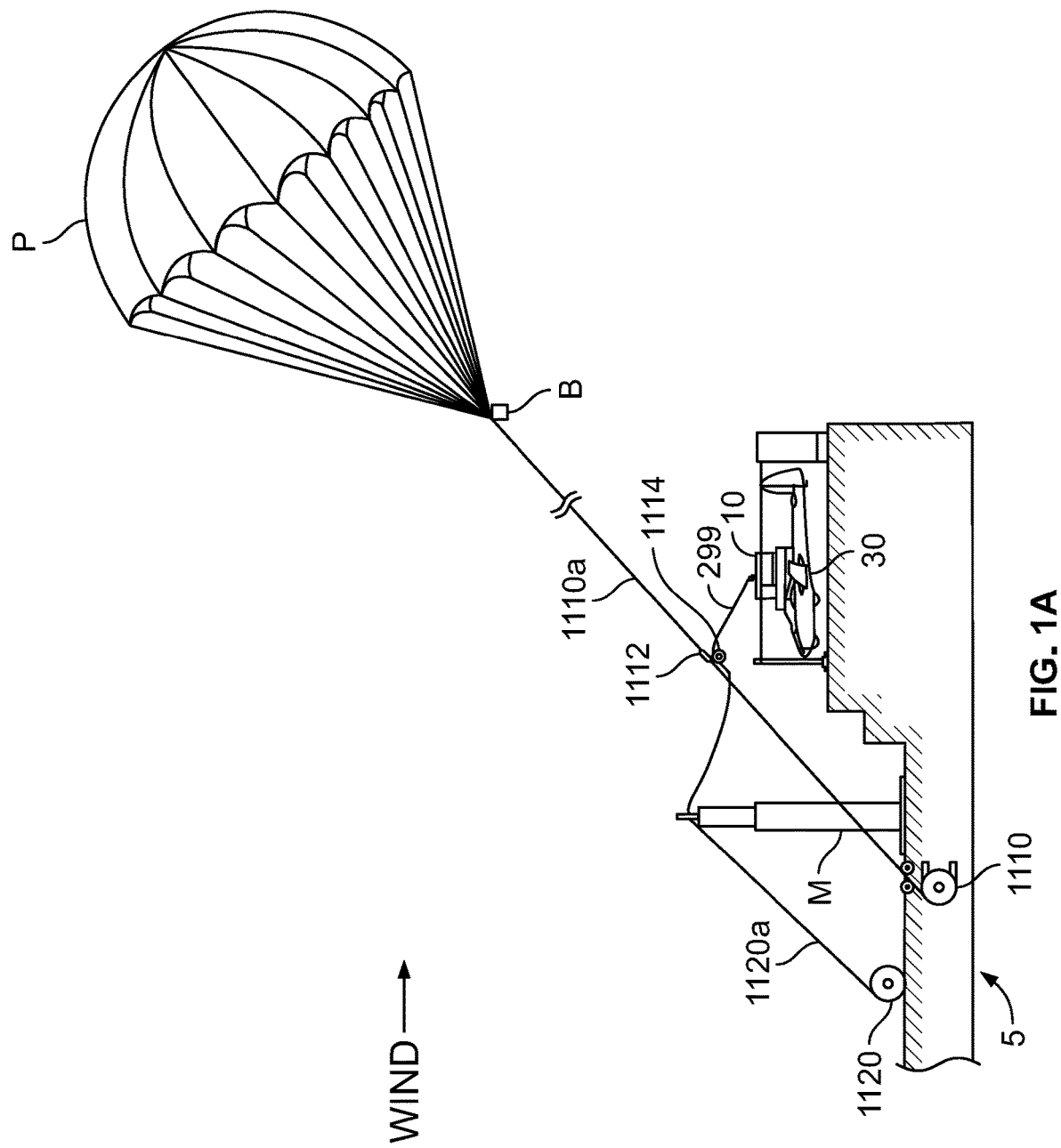

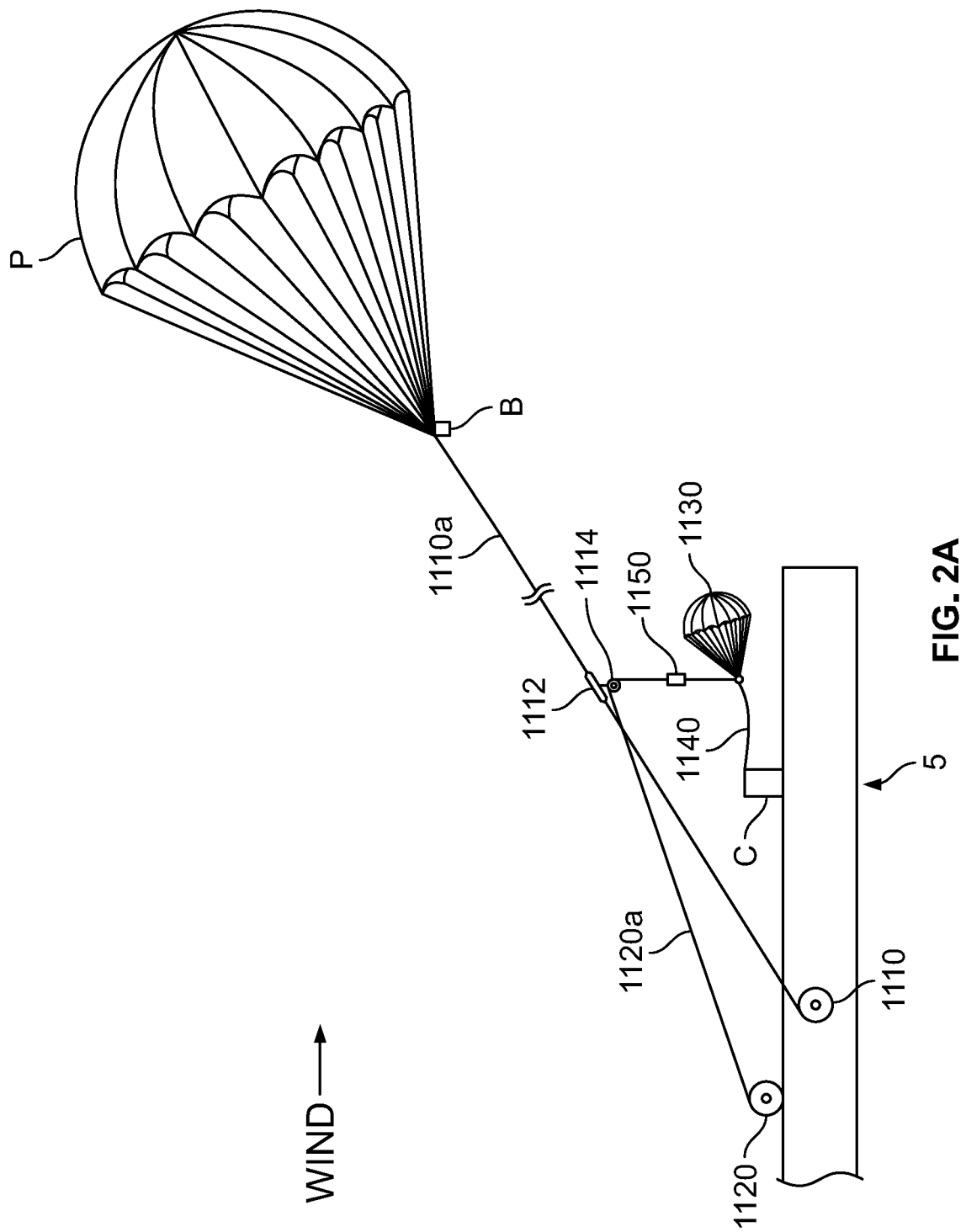

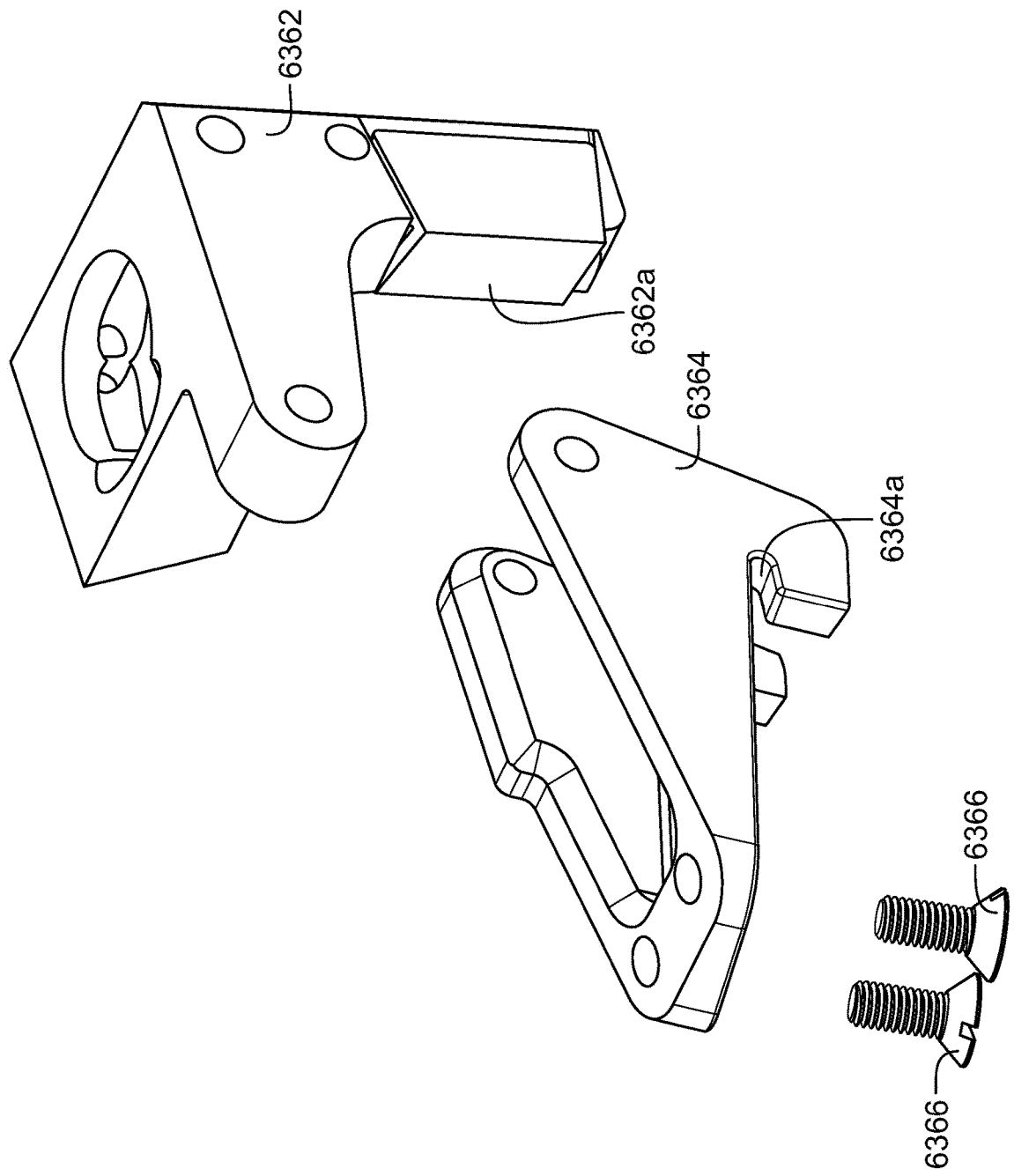

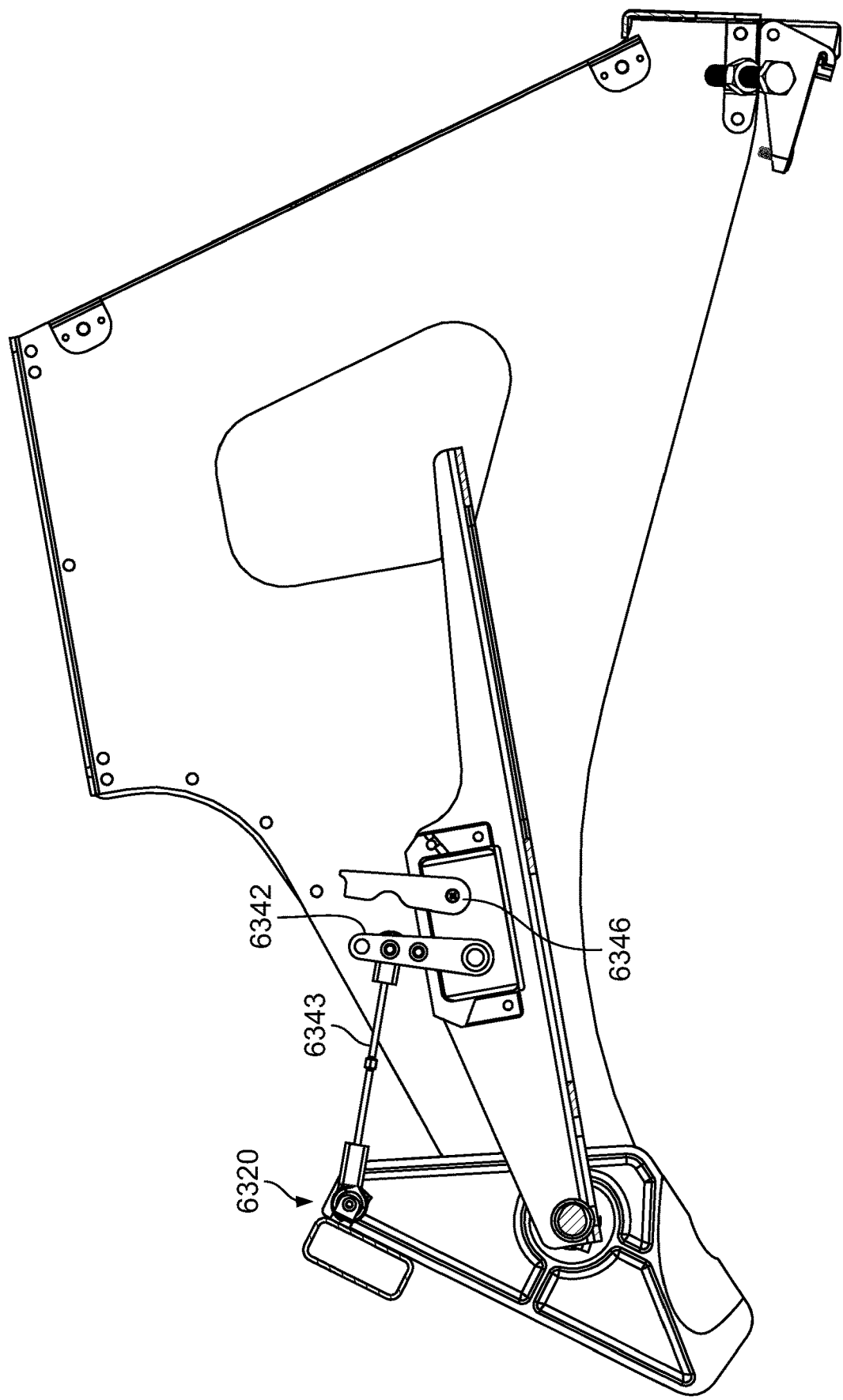

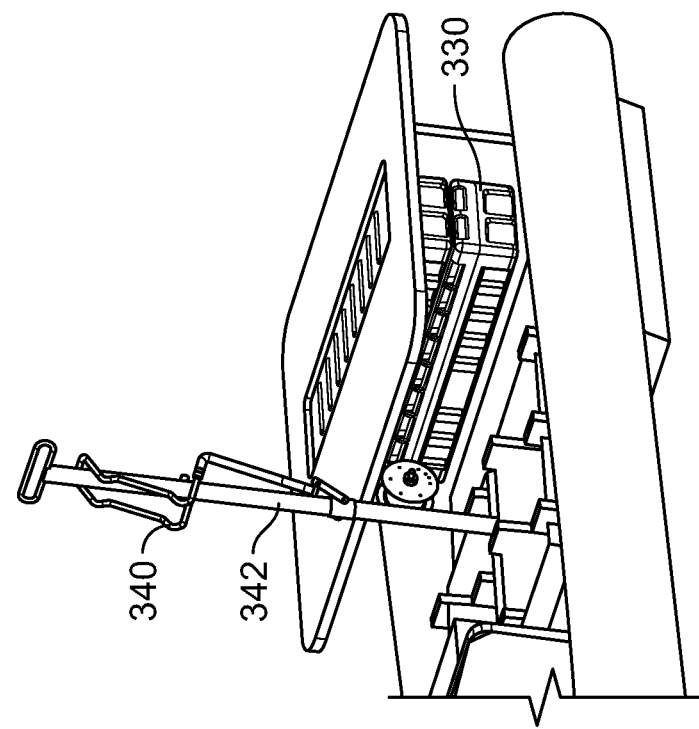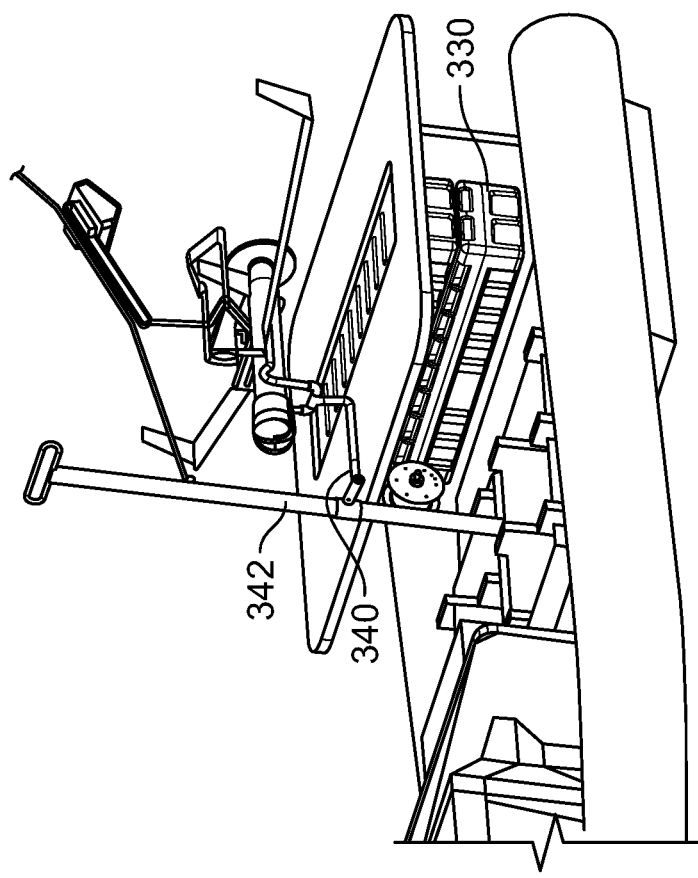
FIG. 3BB

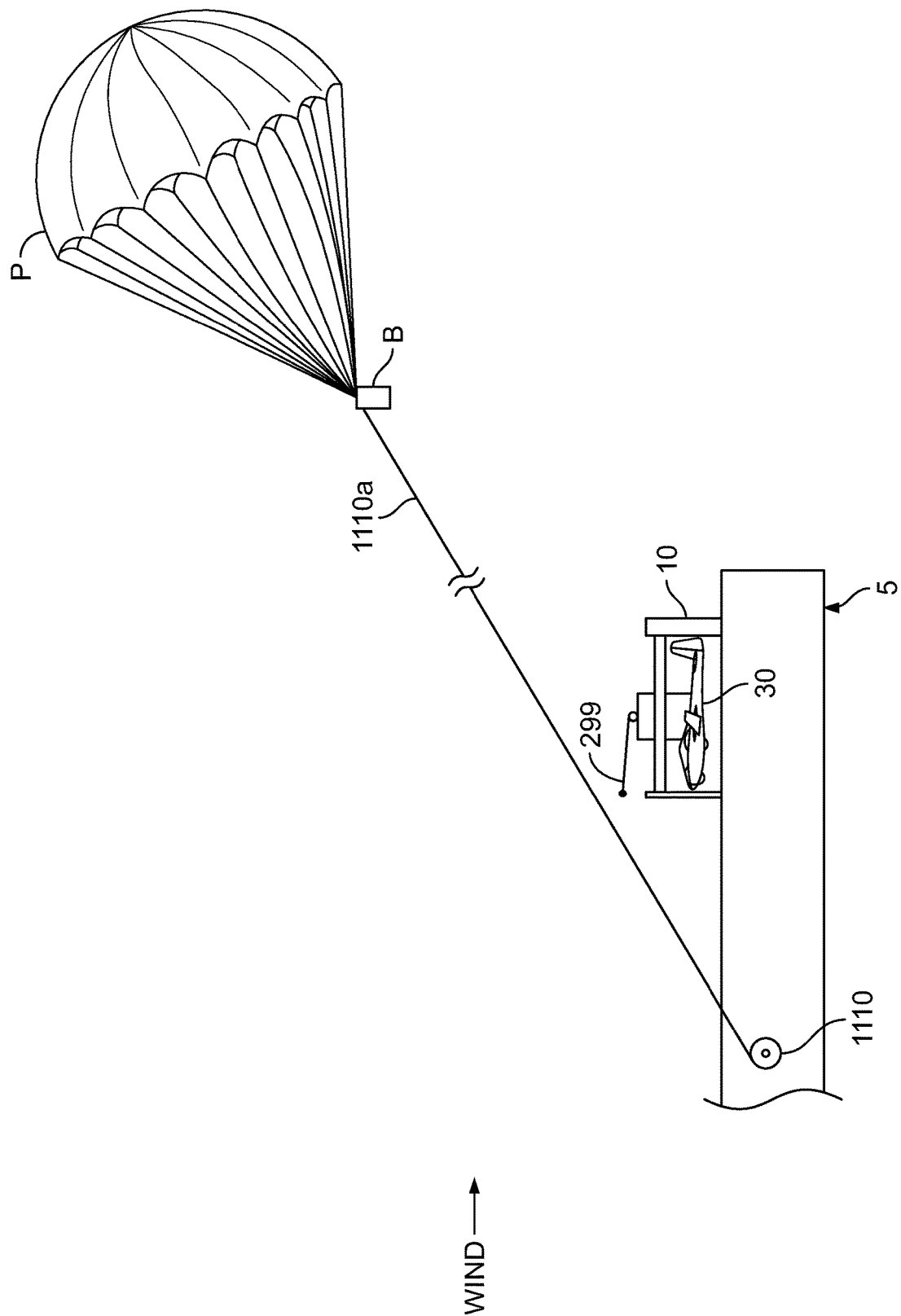

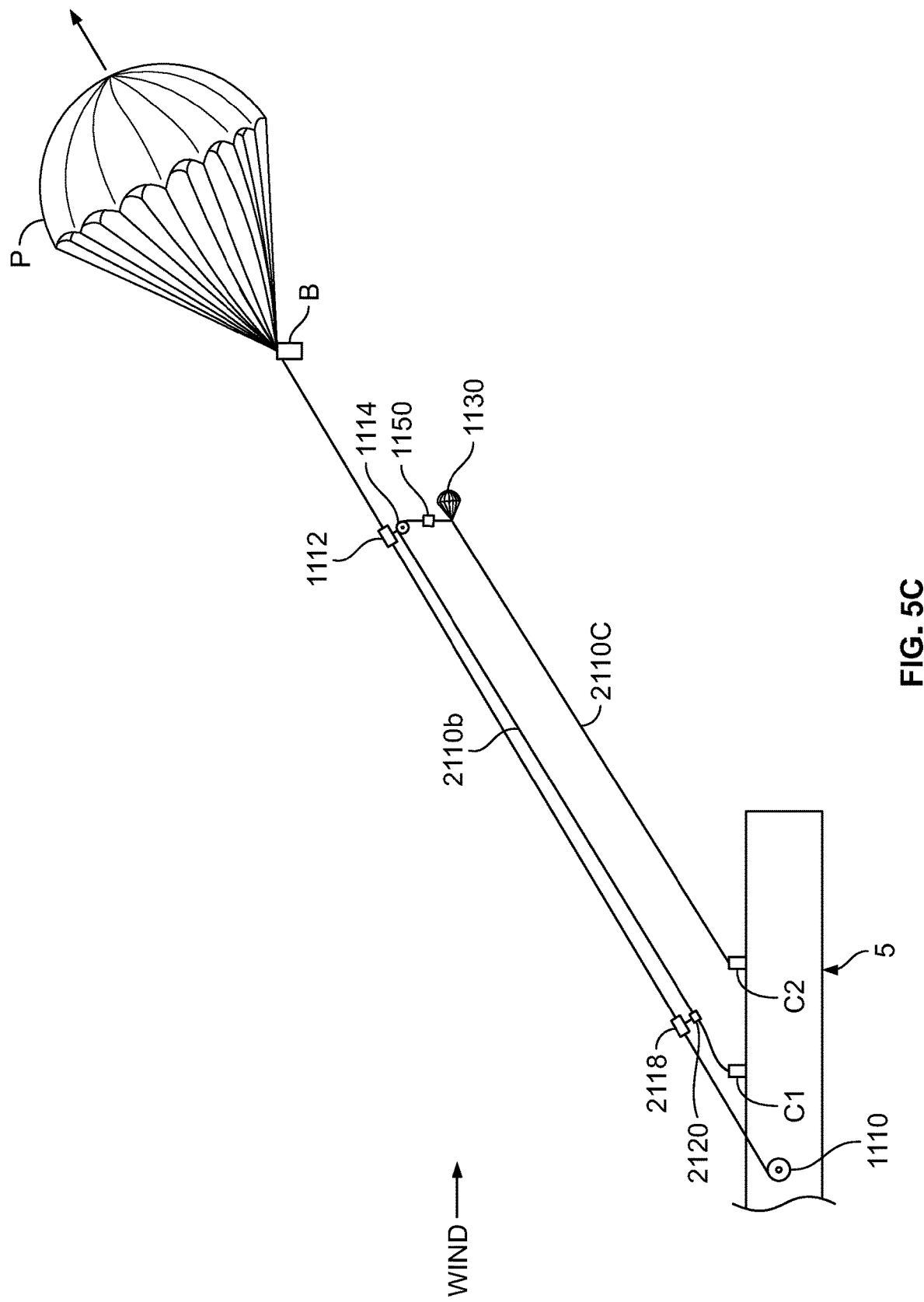

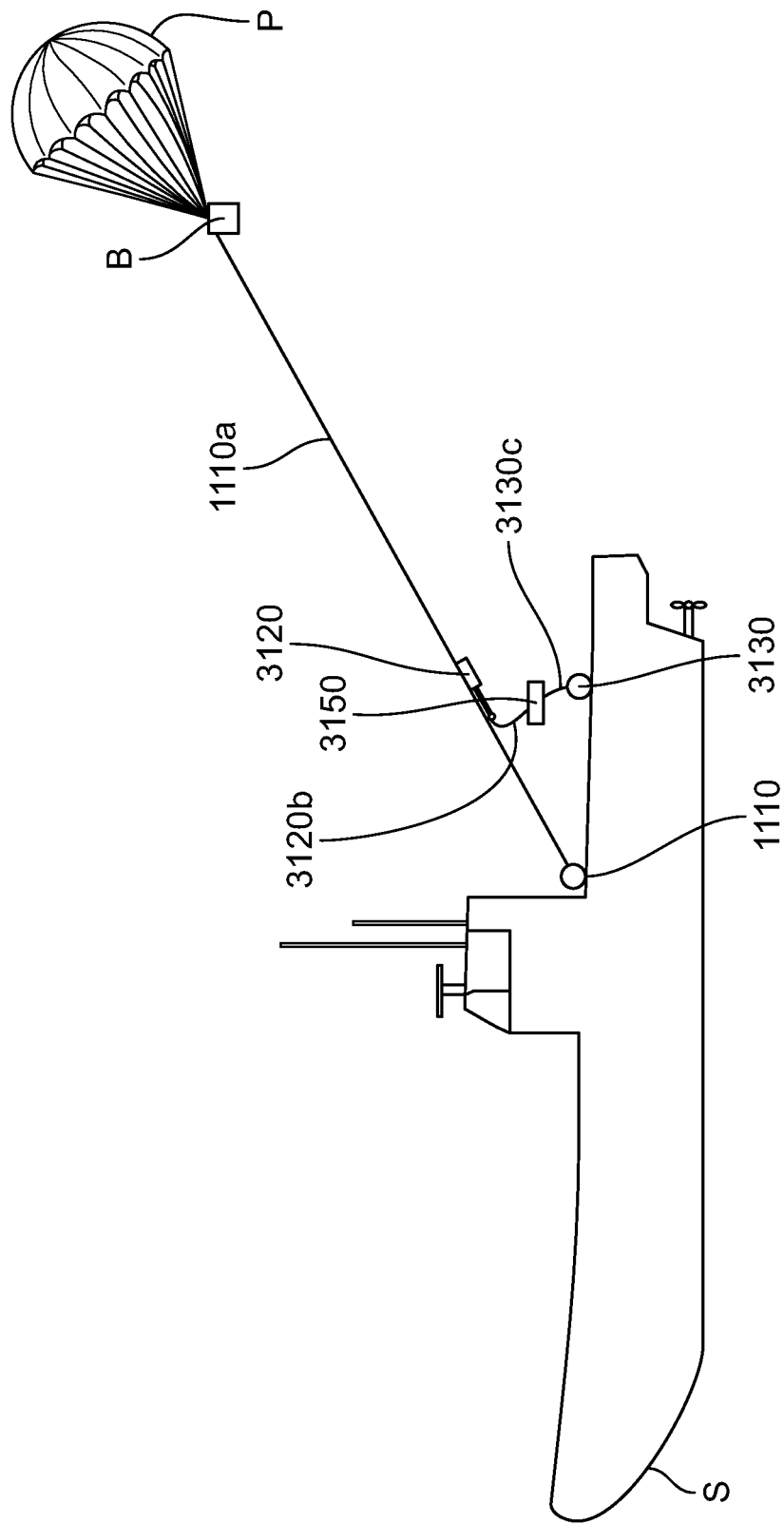

PARASAIL-ASSISTED SYSTEMS AND METHODS FOR LAUNCHING AND RETRIEVING A FIXED-WING AIRCRAFT INTO AND FROM FREE FLIGHT

PRIORITY CLAIM

This application claims priority to and the benefit of U.S. Provisional Patent Application No. 62/554,901, which was filed on Sep. 6, 2017, and U.S. Provisional Patent Application No. 62/657,104, which was filed on Apr. 13, 2018, the entire contents of each of which are incorporated herein by reference.

FIELD

The present disclosure generally relates to systems and methods for launching fixed-wing aircraft into free, wing-borne flight and for retrieving fixed-wing aircraft from free, wing-borne flight. More specifically, the present disclosure relates to systems and methods for launching fixed-wing aircraft into free, wing-borne flight using a parasail and for retrieving fixed-wing aircraft from free, wing-borne flight using a parasail.

BACKGROUND

Aircraft capable of long-distance, efficient cruising flight typically require long runways for take-off and landing. This limits the locations from which the aircraft can take-off and at which the aircraft can land, since many locations—such as ships at sea—don't have sufficient space for a runway. Hovering aircraft are also proposed for use where space is limited. However, hovering aircraft tend to be more wind susceptible and the relatively large spinning blades that hovering aircraft typically employ make them unwelcome on small ship decks. There is a need for new systems and methods that eliminate the need for these aircraft to use long runways to take-off and land.

BRIEF DESCRIPTION OF THE FIGURES

FIGS. 1A-1D are diagrammatic views showing one example parasail-assisted method of launching a fixed-wing aircraft into free, wing-borne flight using an aircraft launch system including two winches.

FIGS. 2A-2D are diagrammatic views showing one example parasail-assisted method of retrieving a fixed-wing aircraft from free, wing-borne flight using an aircraft retrieval system including two winches.

FIG. 3I is a perspective view of the fixed-wing aircraft of FIG. 3A attached to the saddle of the hub module of FIG. 3E.

FIGS. 3L and 3M are, respectively, assembled and exploded top perspective views of a rear engager of the saddle of FIG. 3I.

FIGS. 3O-3Q are cross-sectional side elevational views of the part of the saddle of FIG. 3I showing different configurations of the lock arm and the front engager arm taken substantially along the line 4G-4G of FIG. 3J.

FIG. 3AA is a perspective view of the launch apparatus of FIGS. 3Y and 3Z having an aircraft coupled via a release mechanism.

FIG. 3BB is perspective views of a launch cradle in an operating position and a stowed position, showing how the launch cradle may be pivotably mounted to a parasail mast, to maintain azimuth alignment of the launch cradle and the hoisting device.

FIGS. 3CC and 3DD are perspective views of a release mechanism according to certain embodiments of the present disclosure.

FIGS. 4A-4E are diagrammatic views showing another example parasail-assisted method of launching a fixed-wing aircraft into free, wing-borne flight using an aircraft launch system including a single winch.

FIGS. 5A-5E are diagrammatic views showing another example parasail-assisted method of retrieving a fixed-wing aircraft from free, wing-borne flight using an aircraft retrieval system including a single winch.

FIGS. 6D-6G are diagrammatic views showing another example parasail-assisted method of retrieving a fixed-wing aircraft from free, wing-borne flight using an aircraft launch system including a winch and a hoist, wherein the hoist is supported by the parasail tow line.

DETAILED DESCRIPTION

Figure 1B:
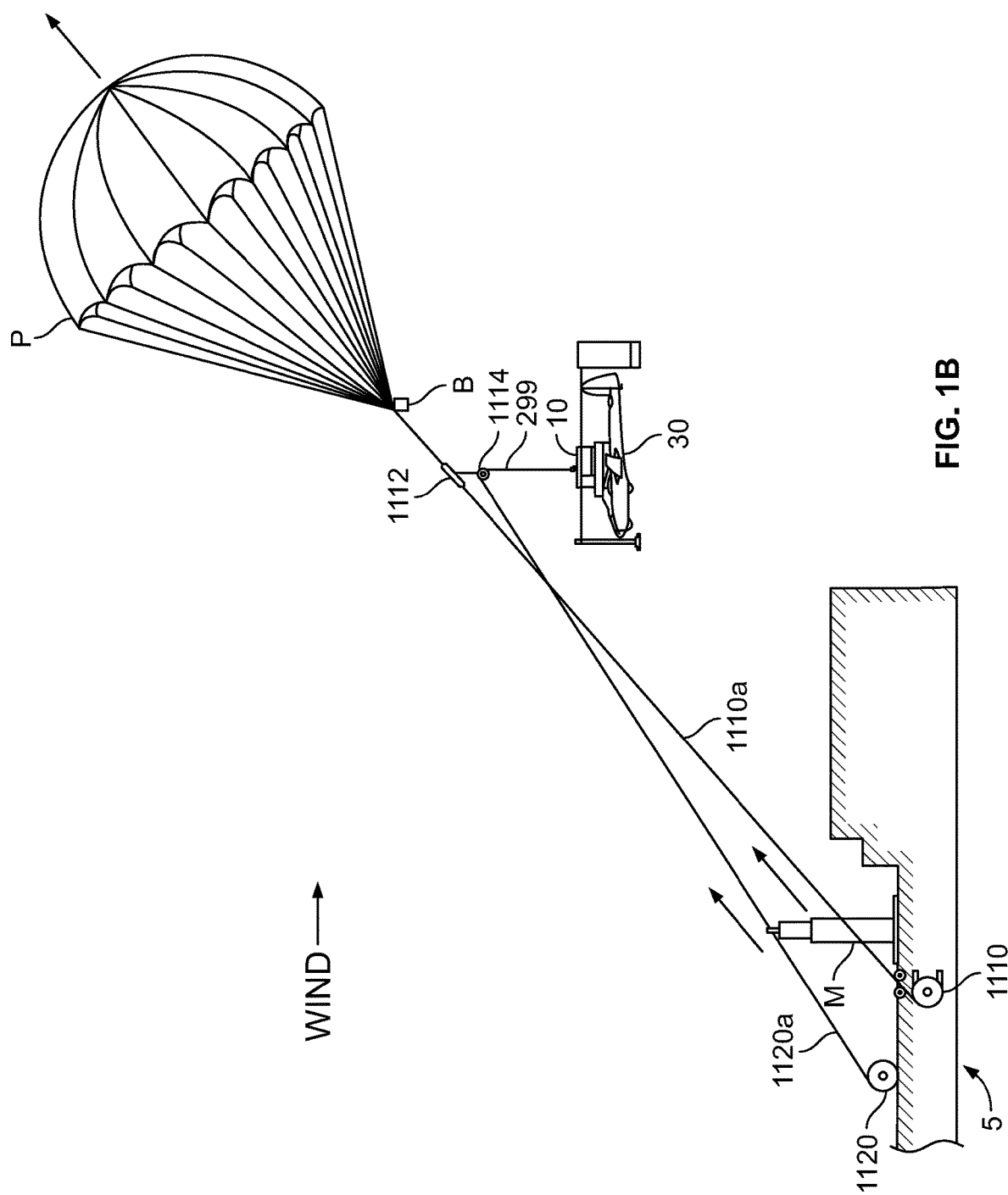

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art. The drawings are not to scale unless noted otherwise.

The parasail-assisted fixed-wing aircraft launch and retrieval systems (sometimes called the "launch system(s)" and the "retrieval system(s)" for brevity) of various embodiments of the present disclosure are usable to launch a fixed-wing aircraft 30 from a moving object into free, wing-borne flight and to retrieve the fixed-wing aircraft 30 from free, wing-borne flight back onto the moving object. The fixed-wing aircraft 30 may be any suitable fixed-wing aircraft, such as (but not limited to) the INTEGRATOR unmanned aerial vehicle (INTEGRATOR is a registered trademark of Insitu, Inc.), the SCANEAGLE unmanned aerial vehicle (SCANEAGLE is a registered trademark of the Boeing Company), or X400 (X400 is a registered trademark of Insitu, Inc.). The moving object is a ship in the example embodiments described below, but may be any other suitable moving object in other embodiments (such as a truck or a railcar).

1. Two-Winch Embodiment
1.1 Parasail-Assisted Fixed-Wing Aircraft Launch System and Method FIGS. 1A-1D are diagrammatic views showing one example parasail-assisted fixed-wing aircraft launch system and method of the present disclosure. In this example embodiment, the aircraft launch system includes a parasail P, a ballast B, a fixed-wing aircraft-launch apparatus 10 (sometimes called the "aircraft-launch apparatus" for brevity), a first winch 1110, a first flexible member 1110a, a first flexible member attachment device 1112, a pulley 1114, a second winch 1120, and a second flexible member 1120a.

The parasail P may be any suitable parasail including a kite, left and right bridle sets attached to the kite, and suitable rigging connecting the left and right bridle sets to the first flexible member 1110a (described below). The parasail P is rated such that it is strong enough to carry the aircraft-launch apparatus 10 together with the fixed-wing aircraft 30 without breaking.

The ballast B may be any suitable container filled with any suitable material (such as water, rock, or sand), and is attached to the left and right bridle sets such that the mass of the ballast B is generally evenly distributed between the left and right bridle sets. The mass of the ballast B is large enough to stabilize the parasail P when the parasail P is flying. In this example embodiment, the mass of the ballast B is between 30-150 pounds, though it may have any other suitable mass required to stabilize the parasail P when open.

The first winch 1110 is any suitable reversible, non-backdriveable winch (though it may be any other suitable type of winch in other embodiments) that includes a shaft, a drum fixedly mounted to the shaft, and a motor operably connected to the shaft to rotate the shaft (and therefore the drum). In this example embodiment, the first winch 1110 is a 2-10 horsepower worm gear winch. The second winch 1120 is a suitable reversible, backdriveable winch (though it may be any other suitable type of winch in other embodiments) that includes a shaft, a drum fixedly mounted to the shaft, and a motor operably connected to the shaft to rotate the shaft (and therefore the drum). In this example embodiment, the second winch 1120 is a 1 horsepower winch backdriveable at 200 pounds of tension. As described below, the first and second winches 1110 and 1120 are independently controllable to payout and retract the first and second flexible members 1110a and 1120a, respectively, as described below.

The first and second flexible members 1110a and 1120a are suitable ropes or other similar flexible elements.

The first flexible member attachment device 1112 is a suitable device configured to removably attach to the first flexible member 1110a. In this example embodiment, the first flexible member attachment device 1112 is an ascender that, once attached to the first flexible member attachment device, can move along the first flexible member in one direction but not the other. In other embodiments, the first flexible member attachment device is not configured to move relative to the first flexible member once attached to the first flexible member. A rope grab is one example of such a device.

The pulley 1114 is attached to the first flexible member attachment device 1112 and includes a wheel (not labeled) rotatably mounted on a shaft (not labeled). The pulley 1114 may be configured as a one way pulley, which includes a suitable component or suitable components, that enable the wheel to rotate around the shaft in one rotational direction—here, counter-clockwise—and that prevent the wheel from rotating around the shaft in the other rotational direction—here, clockwise.

Figure 3A:
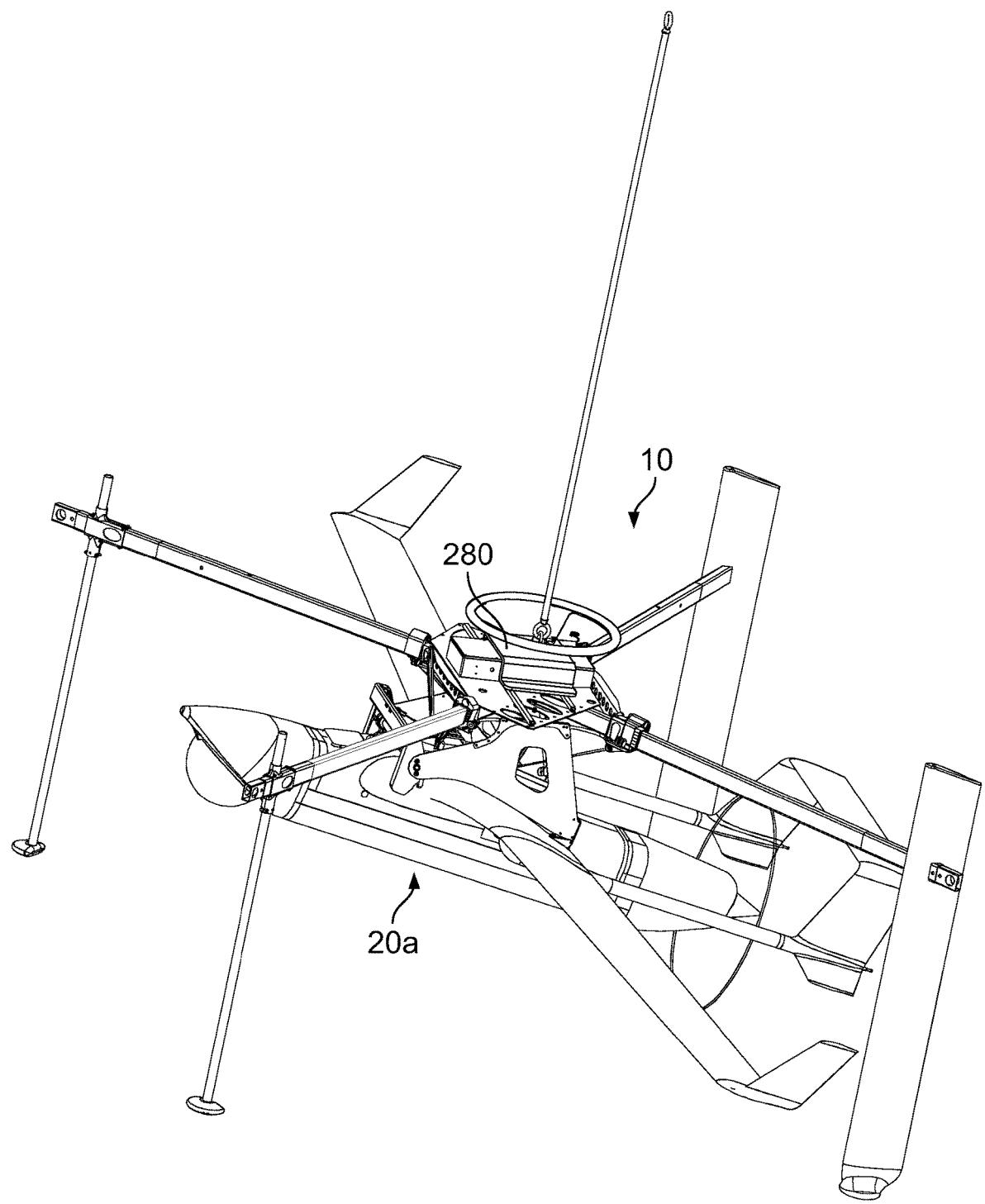
FIG. 3A is a perspective view of one example embodiment of the aircraft-launch apparatus of the present disclosure attached to a fixed-wing aircraft.
Figure 3B:
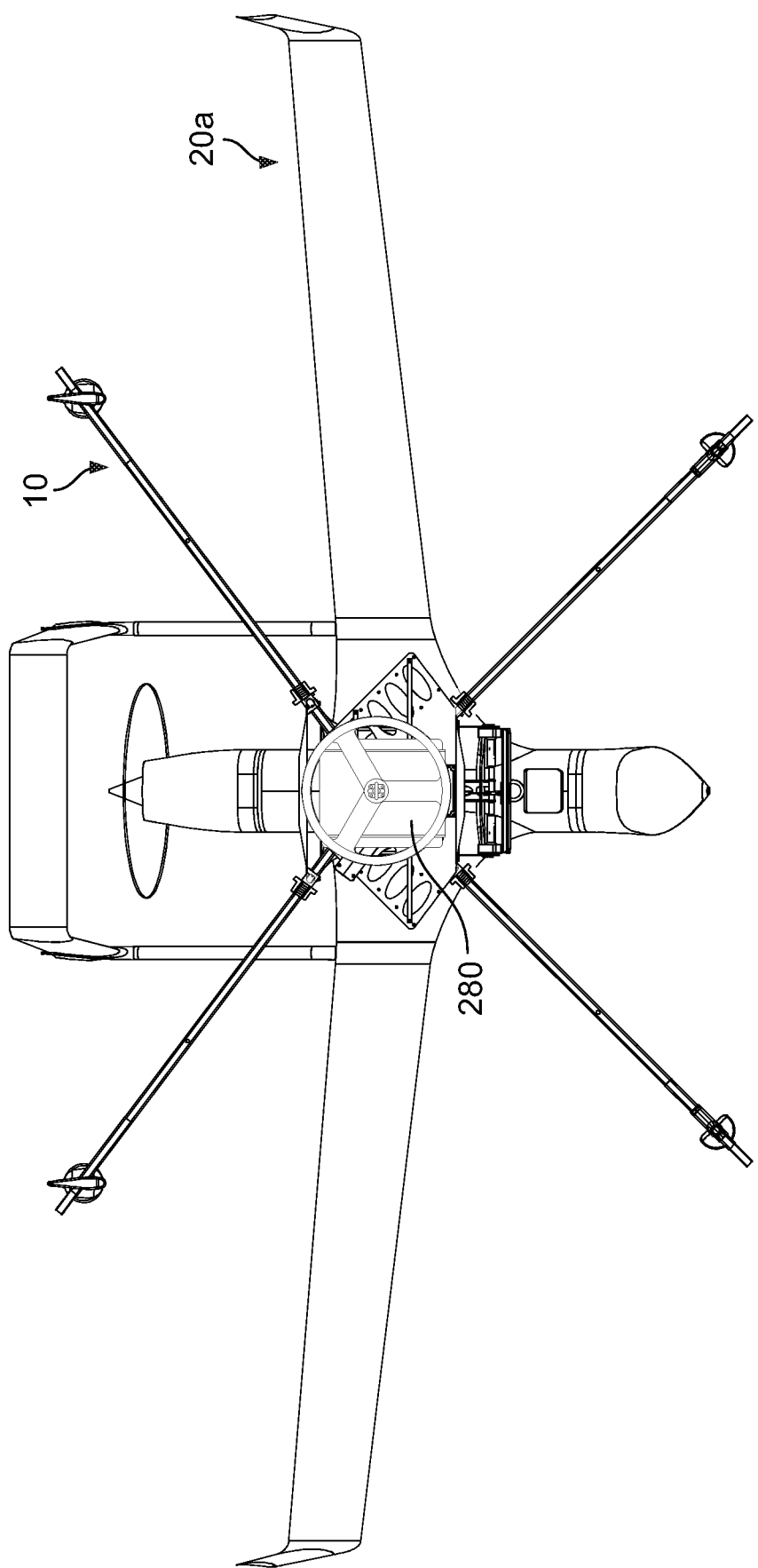
FIG. 3B is a top plan view of the aircraft-launch apparatus and the fixed-wing aircraft of FIG. 3A.
Figure 3C:
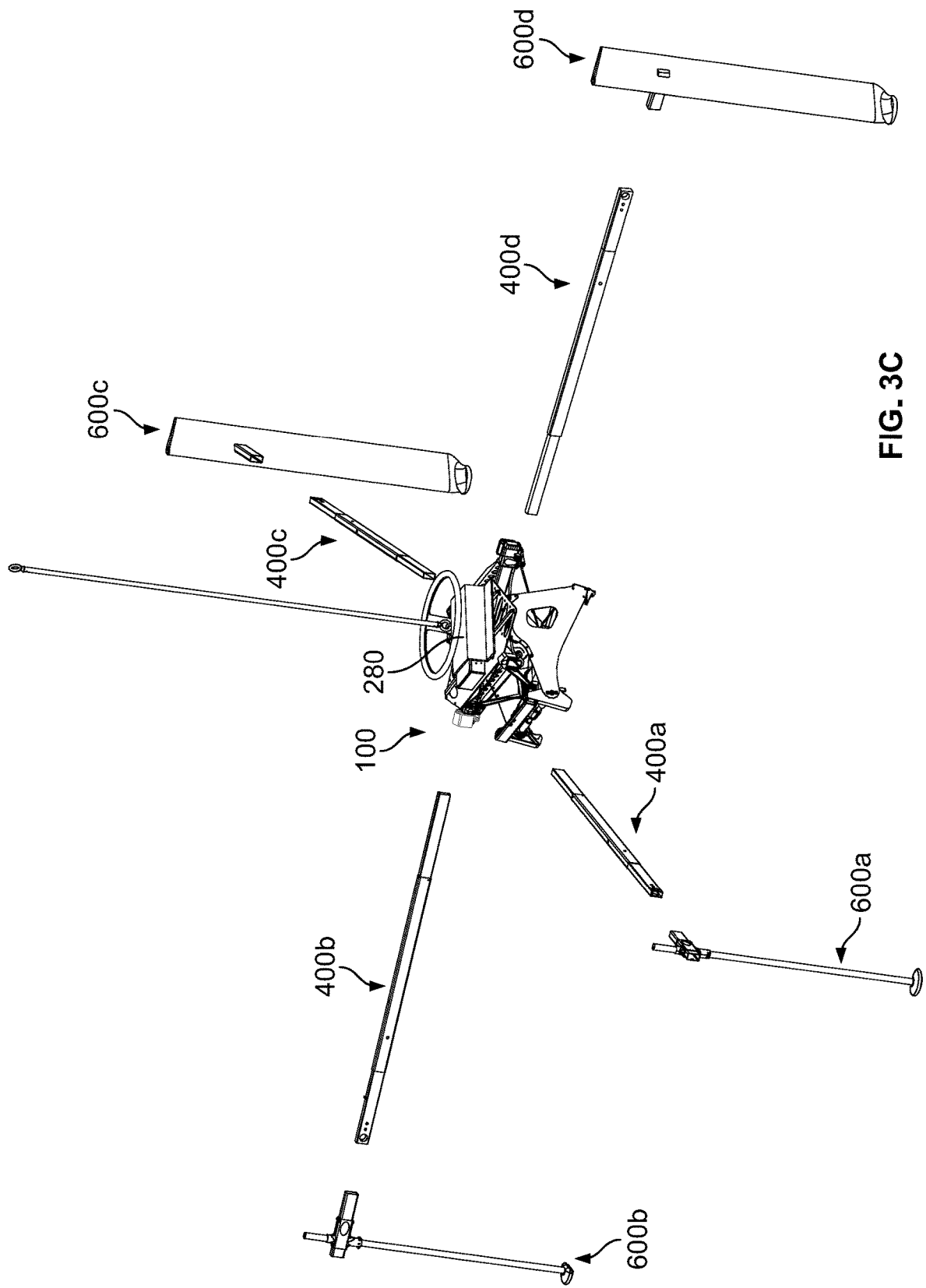
FIG. 3C is a partially-exploded perspective view of the aircraft-launch apparatus of FIG. 3A.

FIGS. 3A, 3B, and 3C show the aircraft-launch apparatus 10. The aircraft-launch apparatus 10 is modular in that it is assembled from (and can be disassembled into) a plurality of different modules or subassemblies. The aircraft-launch apparatus 10 is removably attachable to the fixed-wing aircraft 30 to facilitate launching the fixed-wing aircraft 30 into free, wing-borne flight (as described below).

As best shown in FIG. 3C, the aircraft-launch apparatus 10 includes the following nine modules or subassemblies: a hub module 100; first, second, third, and fourth arm modules 400a, 400b, 400c, and 400d; first and second front landing gear modules 600a and 600b; and first and second rear landing gear modules 600c and 600d.

As described in detail below, to assemble the aircraft-launch apparatus 10 from these nine modules or subassemblies, an operator: (1) attaches the first, second, third, and fourth arm modules 400a, 400b, 400c, and 400d to the hub module 100; (2) attaches the first and second front landing gear module 600a and 600b to the first and second arm modules 400a and 400b, respectively; and (3) attaches the first and second rear landing gear modules 600c and 600d to the third and fourth arm modules 400c and 400d, respectively.

The modularity of this aircraft-launch apparatus 10 is beneficial compared to non-modular or unitary construction. First, the modularity of this aircraft-launch apparatus 10 enables an operator to quickly and easily disassemble this relatively large apparatus into nine smaller modules or subassemblies. The operator can compactly store these modules or subassemblies into a single container, which makes the disassembled aircraft-launch apparatus 10 easy to store and transport compared to when it is assembled. Second, if a part of this aircraft-launch apparatus 10 breaks, its modularity enables the operator to quickly and easily replace the module(s) or subassembly(ies) including the broken part with a properly-functioning replacement module(s) or subassembly(ies) rather than waste time repairing the broken component(s).

Other embodiments of the aircraft-launch apparatus may include more or fewer modules.

Figure 3D:
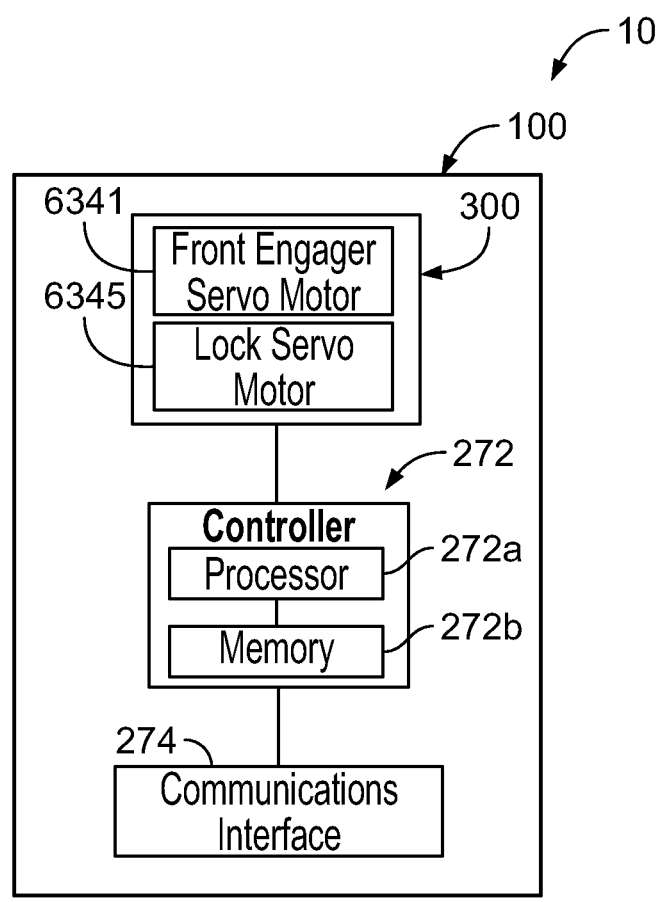
FIG. 3D is a block diagram showing certain electrically-controlled components of the aircraft-launch apparatus of FIG. 3A.

FIG. 3D is a block diagram of certain electrically-controlled components of the aircraft-launch apparatus 10. In this embodiment, although not shown in FIG. 3D, a lithium-ion battery (or any other suitable power source(s)) powers these components. For a given component, the power source may be directly electrically connected to that component to power that component or indirectly electrically connected to that component (e.g., via another component) to power that component.

The hub module 100 includes a hub base 200 and a saddle 300. The hub base 200 includes a controller 272 and a communications interface 274 electrically and communicatively connected to the controller 272. The saddle 300 includes a front engager servo motor 6341 and a lock servo motor 6345 both electrically and communicatively connected to the controller 272. This is merely one example configuration, and these components may be located on any suitable part of the aircraft-launch apparatus in other embodiments.

The controller 272 includes a processor 272a and a memory 272b. The processor 272a is configured to execute program code or instructions stored in the memory 272b to control operation of the aircraft-launch apparatus 10, as described herein. The processor 272a may be one or more of: a general-purpose processor; a content-addressable memory; a digital-signal processor; an application-specific integrated circuit; a field-programmable gate array; any suitable programmable logic device, discrete gate, or transistor logic; discrete hardware components; and any other suitable processing device.

The memory 272b is configured to store, maintain, and provide data as needed to support the functionality of the aircraft-launch apparatus 10. For instance, in various embodiments, the memory 272b stores program code or instructions executable by the processor 272a to control the aircraft-launch apparatus 10. The memory 272b may be any suitable data storage device, such as one or more of: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and read-only memory.

The communications interface 274 is a suitable wireless communication interface, such as a transceiver like an MM2 900 MHz Embedded Radio by Freewave Technologies, configured to establish and facilitate communication between the controller 272 and: (1) a computing device (such as a laptop computer, a tablet computer, or a mobile phone, not shown); and (2) an R/C controller (not shown) that the operator of the aircraft-launch apparatus 10 controls. In operation, once the communications interface 274 establishes communication with the computing device, the controller 272 can send data (via the communications interface 274) associated with the operation of the aircraft-launch apparatus 10 to the computing device. Once the communications interface 274 establishes communication with the R/C controller, the controller 272 can receive signals (via the communications interface 274) from the R/C controller. More specifically, upon receipt of these signals from the R/C controller, the communications interface 274 converts these signals into a format readable by the controller 272 and sends the converted signals to the controller 272 for processing.

The above-described communication may be bidirectional or unidirectional. In some embodiments, the communications interface 274 enables the controller 272 to send data to the computing device but not receive data from the computing device. In other embodiments, the communications interface 274 enables the controller 272 to send data to the computing device and to receive data from the computing device. In some embodiments, the communications interface 274 enables the controller 272 to receive signals from the R/C controller but not send signals to the R/C controller. In other embodiments, the communications interface 274 enables the controller 272 to receive signals from the R/C controller and send signals to the R/C controller.

In certain embodiments, the communications interface 274 includes separate components for communicating with the computing device (such as a telemetry link) and the R/C controller (such as an R/C receiver).

Figure 3E:
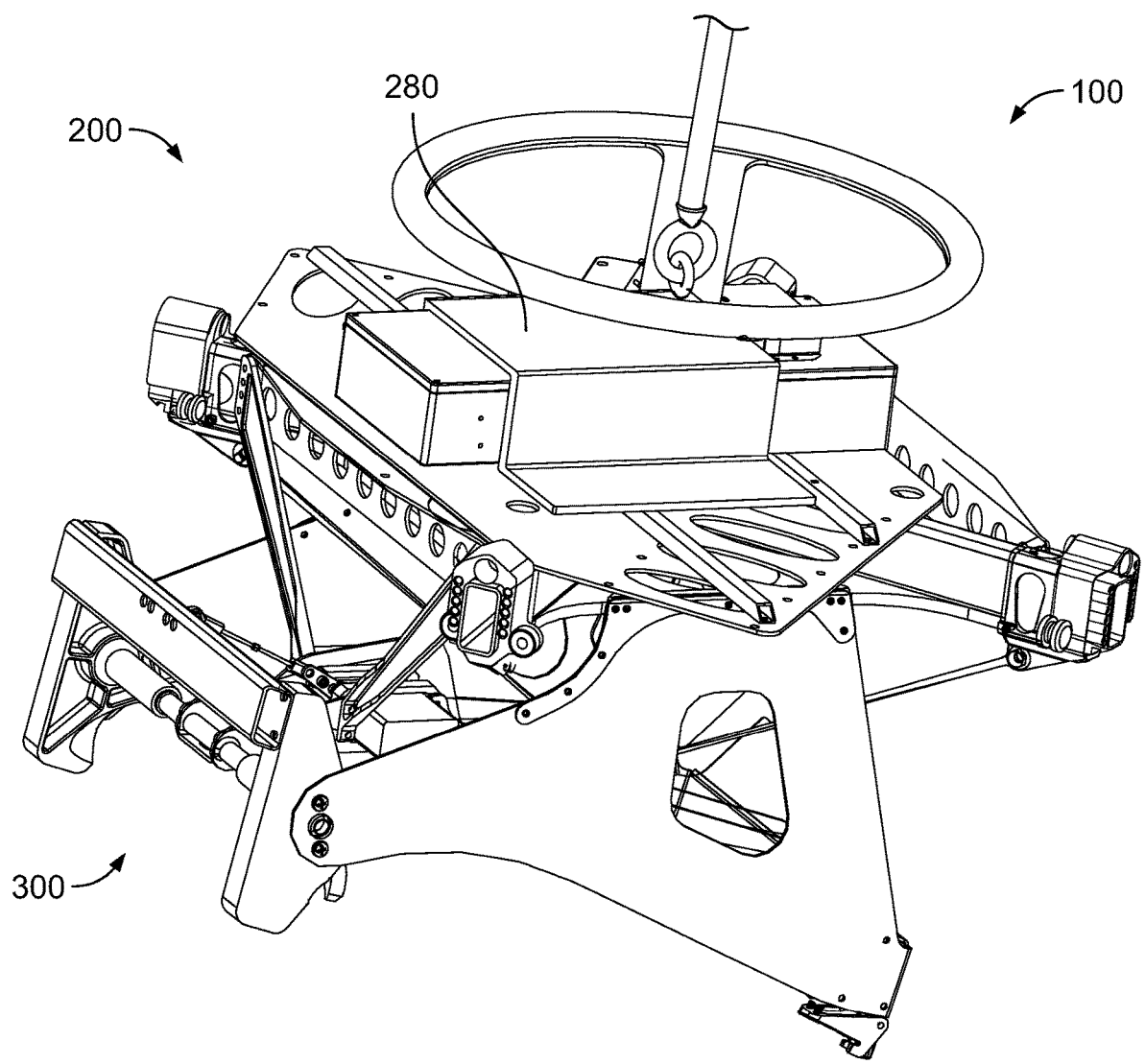
FIG. 3E is a perspective view of the hub module of the aircraft-launch apparatus of FIG. 3A.

FIG. 3E shows the hub module 100. The hub module 100: (1) serves as the attachment point for the arm modules 400a to 400d; (2) is the portion of the aircraft-launch apparatus 10 to which the fixed-wing aircraft 30 is attached for launch; (3) includes the power source for the aircraft-launch apparatus 10; and (4) includes certain components used to control operation of the aircraft-launch apparatus 10.

The hub module 100 includes a hub base 200 and a saddle 300. The saddle 300 is attached to the underside of the hub base 200 via various brackets and fasteners (not labeled). This is merely one example of how the saddle can be attached to the hub base, and in other embodiments the saddle may be attached to the hub base in any suitable manner.

Figure 3F:
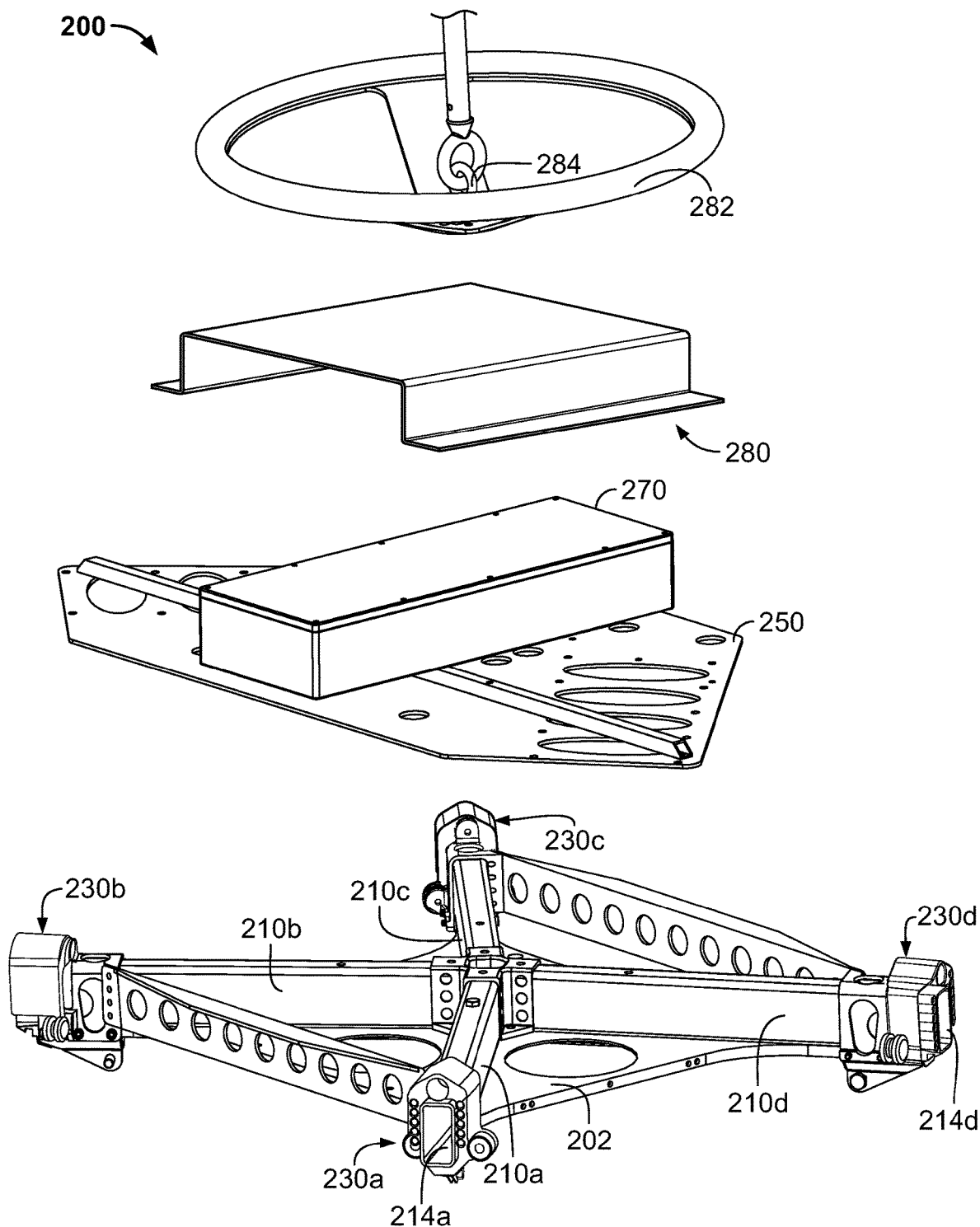
FIG. 3F is a partially exploded perspective view of the hub base of the hub module of FIG. 3E.
Figure 3G:
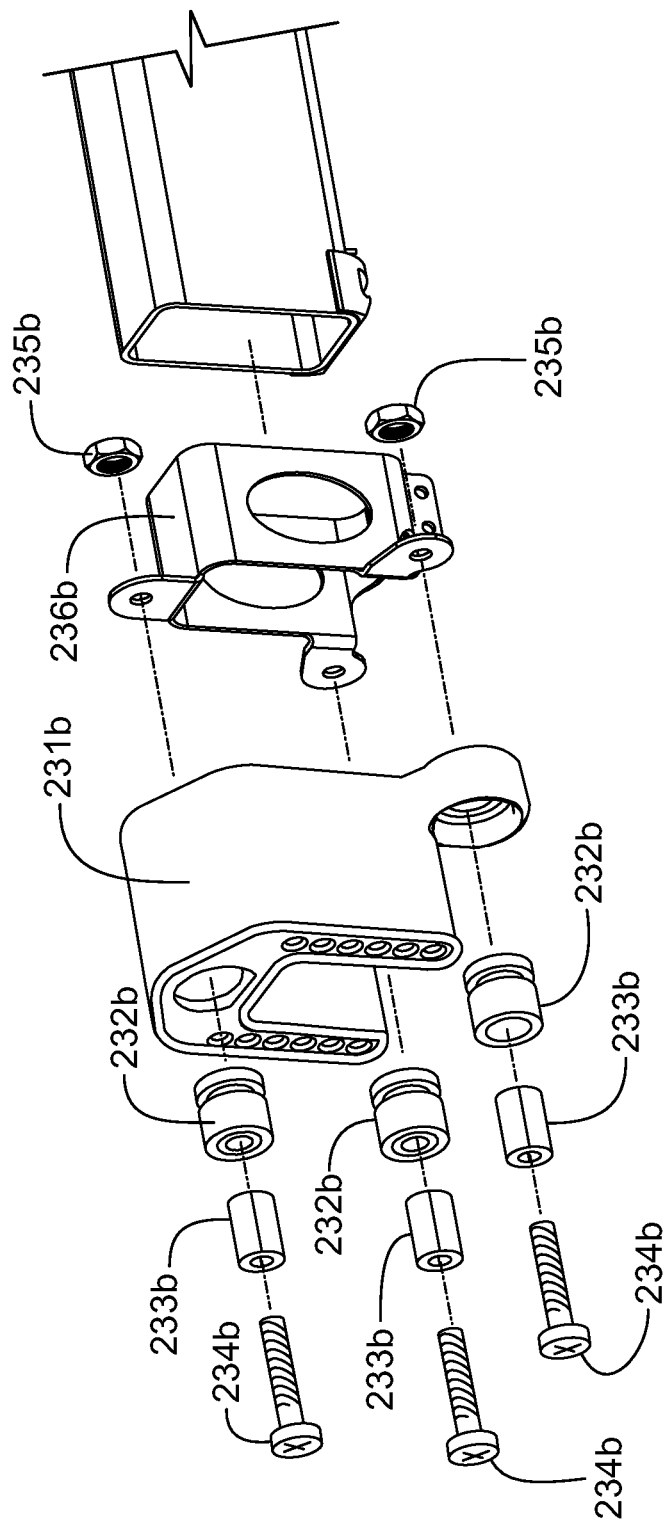
FIG. 3G is a partially exploded perspective view of one of the female blind mate assemblies of the hub base of FIG. 3F.
Figure 3H:
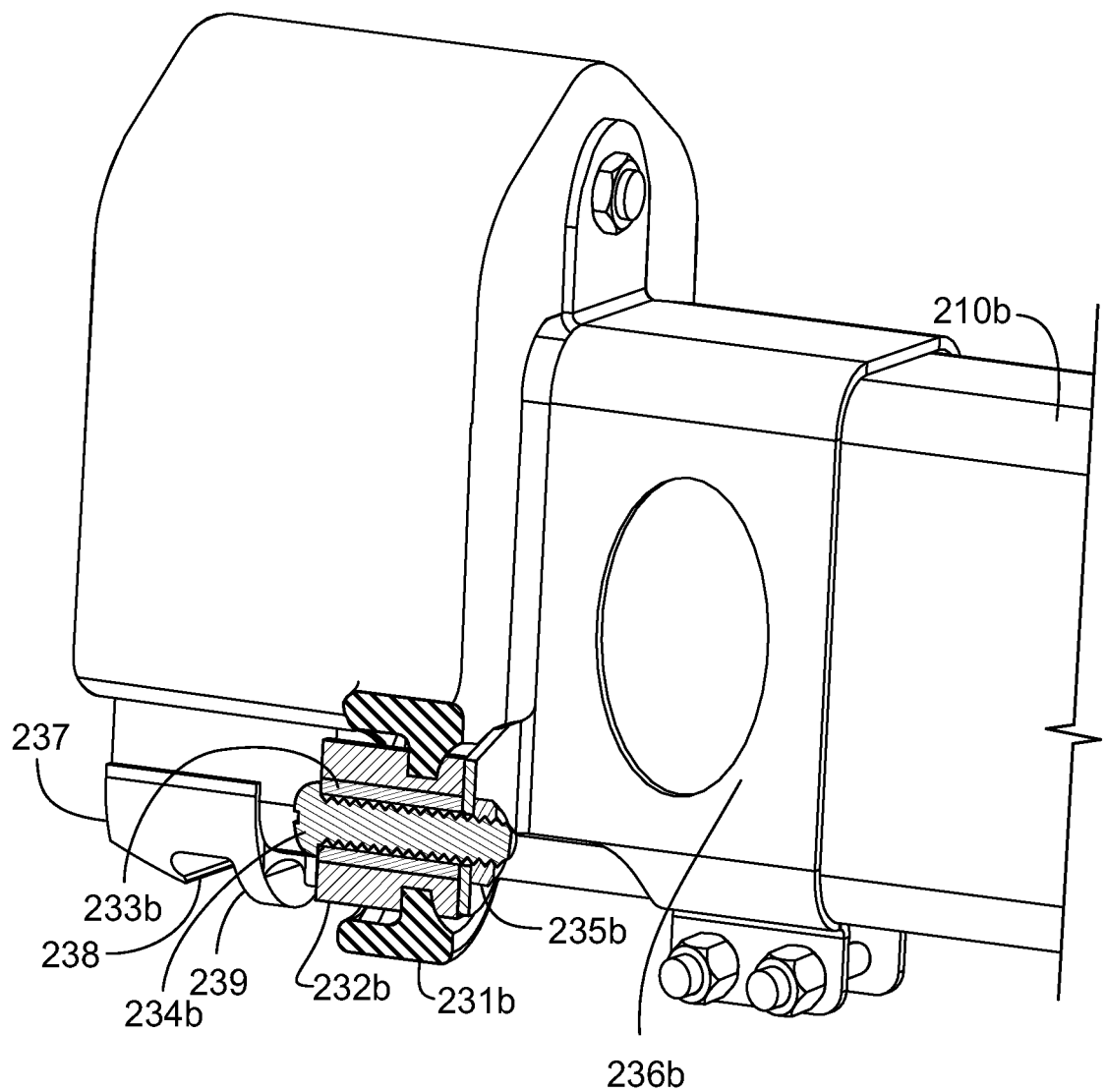
FIG. 3H is a partial cross-sectional view of one of the flexural mounts of the female blind mate assembly of FIG. 3G.
Figure 31:
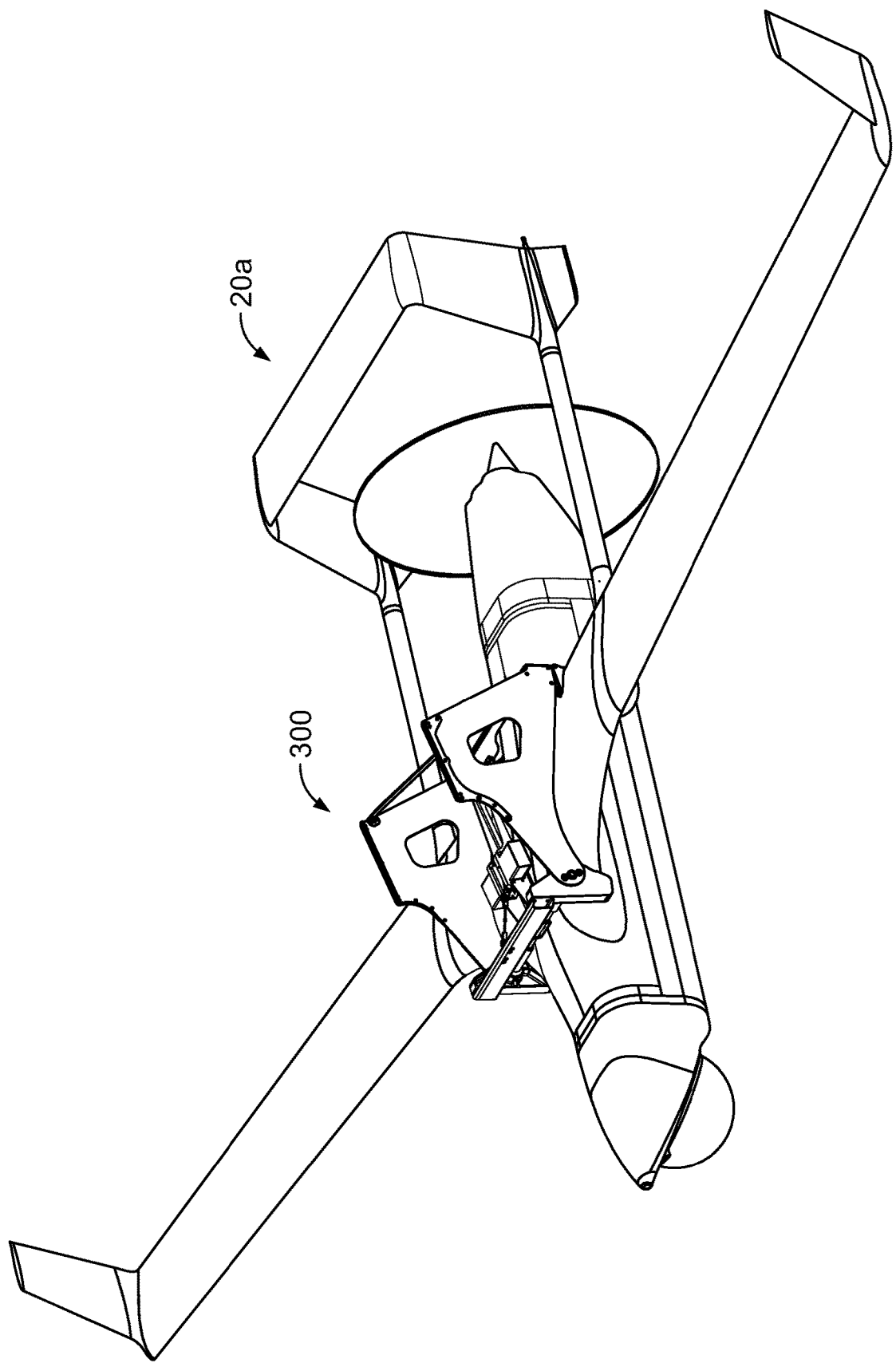

FIGS. 3F, 3G, and 3H show the hub base 200 or components thereof. The hub base 200 is the portion of the hub module 100 that: (1) serves as the attachment point for the arm modules 400a to 400d; (2) includes the power source for the aircraft-launch apparatus 10; and (3) includes certain components used to control operation of the aircraft-launch apparatus 10.

As best shown in FIG. 3F, the hub base 200 includes four elongated tubular rectangular supports 210a, 210b, 210c, and 210d attached to a first mounting plate 202 with suitable brackets and fasteners. Stabilizing brackets (not labeled) extend between and connect the free ends of the supports 210a and 210b and the supports 210c and 210d. A second mounting plate 250b is attached to the supports 210a, 210b, 210c, and 210d such that the supports are sandwiched between the first and second mounting plates 202 and 250. A housing 270 is mounted to the second mounting plate 250. The housing 270 encloses various electrical components, such as the power source, the controller 272, and the communications interface 274.

A guard 282 is attached to a guard mounting bracket 280 (via suitable fasteners) that is attached to the second mounting plate 250 (via suitable fasteners). A snag-prevention member attachment device 284 is attached to the guard 282 near the center of the guard 282 (when viewed from the top). As described in detail below, a snag-prevention member 299 is attachable to the snag-prevention member attachment device 284 (such as a universal joint) such that the snag-prevention member 299 can rotate 360 degrees (or less in other embodiments) relative to the guard 282 and the aircraft-launch apparatus 10 and pivot relative to a vertical axis between an angle defined by the geometry of the guard 282 and the geometry of the snag-prevention member 299. In this embodiment, the snag-prevention member 299 includes a flexible rod (such as a carbon-fiber rod) that has a normal shape to which it is biased to return once flexed. The snag-prevention member 299 may attach to the snag-prevention member attachment device 284 in any suitable manner, such as via a carabiner or other hook-type manner of attachment.

The open free ends of the tubular supports 210a-210d form arm module receiving sockets that can receive one of the arm modules 400a to 400d. Specifically, the support 210a forms a first arm module receiving socket 214a sized to receive the first arm module 400a, the support 210b forms a second arm module receiving socket (not shown) sized to receive the second arm module 400b, the support 210c forms a third arm module receiving socket (not shown) sized to receive the third arm module 400c, and the support 210d forms a fourth arm module receiving socket 214d sized to receive the fourth arm module 400d.

The connectors shown in FIGS. 3F, 3G, and 3H illustrate example arrangements of connecting components for connecting one or more arms to the hub module. It should be noted that some embodiments may not include arms or connectors (blind or otherwise). Further, in some embodiments the connectors may be used only for transmission of power to arm-mounted motors and not for connecting one or more arms to the hub module.

As best shown in FIG. 3F, female blind mate assemblies are attached to the free ends of the hollow supports 210a-210d. Specifically, a first female blind mate assembly 230a is attached to the free end of the support 210a near the first arm module receiving socket 214a, a second female blind mate assembly 230b is attached to the free end of the support 210b near the second arm module receiving socket, a third female blind mate assembly 230c is attached to the free end of the support 210c near the third arm module receiving socket, and a fourth female blind mate assembly 230d is attached to the free end of the support 210d near the fourth arm module receiving socket 214d.

The female blind mate assemblies 230 (along with the corresponding male blind mate connectors described below with respect to the arm modules) facilitate mechanical attachment of the arm modules 400a, 400b, 400c, and 400d to the hub module 100.

FIGS. 3G and 3H show the second female blind mate assembly 230b. The female blind mate assemblies 230a, 230c, and 230d are similar to the second female blind mate assembly 230b and are therefore not separately shown or described.

The second female blind mate assembly 230b includes: (1) a female blind mate connector 231b including a plurality of pin receptacles (not labeled); (2) three elastomeric grommets 232b; (3) three rigid, hollow cylindrical spacers 233b; (4) three fasteners 234b; (5) three nuts 235b; (6) a mounting bracket 236b; and (7) mounting bracket fasteners (not labeled).

The mounting bracket 236b is positioned at a desired location along the hollow support 210b, and the mounting bracket fasteners are tightened to clamp the mounting bracket 236b in place relative to the hollow support 210b.

The female blind mate connector 231b is flexurally mounted to the mounting bracket 236b via the elastomeric grommets 232b, the spacers 233b, the fasteners 234b, and the nuts 235b. Specifically, the elastomeric grommets 232b are fitted into corresponding cavities in the female blind mate connector 231b. As best shown in FIG. 3H, each cavity includes an inwardly-projecting annular rib that fits into a corresponding annular cutout of the corresponding elastomeric grommet 232b. The spacers 233b are disposed within longitudinal bores defined through the elastomeric grommets 232b. The fasteners 234b extend through the hollow spacers 233b and through corresponding fastener receiving openings defined through the mounting bracket 236b into their corresponding nuts 235b. This secures the female blind mate connector 231b to the mounting bracket 236b.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached arm module during flight. Because the female blind mate connector is not rigidly attached to the corresponding mounting bracket, it is less likely that the pins of the male blind mate connector (described below) received by the pin receptacles of the female blind mate connector will break when loads are applied to the female blind mate connector.

As best shown in FIG. 3H, a latch plate 237 is attached to the underside of each hollow support 210a and 210b below each female blind mate connector 231 attached thereto. The latch plate 237 includes a claw engager 238 and a backstop 239. The latch plate 237 is described below with respect to the locking assemblies 420 of the arm modules 400a to 400d.

FIGS. 3I-3Q show the saddle 300 or components thereof. The saddle 300 is the portion of the hub module 100: (1) to which the fixed-wing aircraft 30 is attached for launch; (2) from which the fixed-wing aircraft 30 is released for launch.

This embodiment of the saddle 300 is sized, shaped, arranged, and otherwise configured to attach to and release the fixed-wing aircraft 30 without requiring any modification to the fixed-wing aircraft 30. The size, shape, arrangement, and configuration of the components of the saddle 300 may be modified such that the saddle 300 can attach to and release other fixed-wing aircraft (such as the fixed-wing aircraft 30).

The saddle 300 includes a saddle base bracket 6310 and first and second saddle side brackets 6312 and 6314 straddling the saddle base bracket 6310. A cross-brace 6318 is connected to and extends between the first and second saddle side brackets 6312 and 6314 near their back ends. As described in more detail below, the front ends of the first saddle side bracket 6312, the second saddle side bracket 6314, and the saddle base bracket 6310 are connected or otherwise mounted to a front engager 6320 such that the front engager 6320 can rotate relative to the first saddle side bracket 6312, the second saddle side bracket 6314, and the saddle base bracket 6310. Although not shown for clarity, the saddle base bracket 6310 is fixedly connected to the hub base via suitable mounting brackets, and the first and second saddle side brackets 6312 and 6314 are fixedly connected to the hub base via suitable fasteners.

Figure 3J:
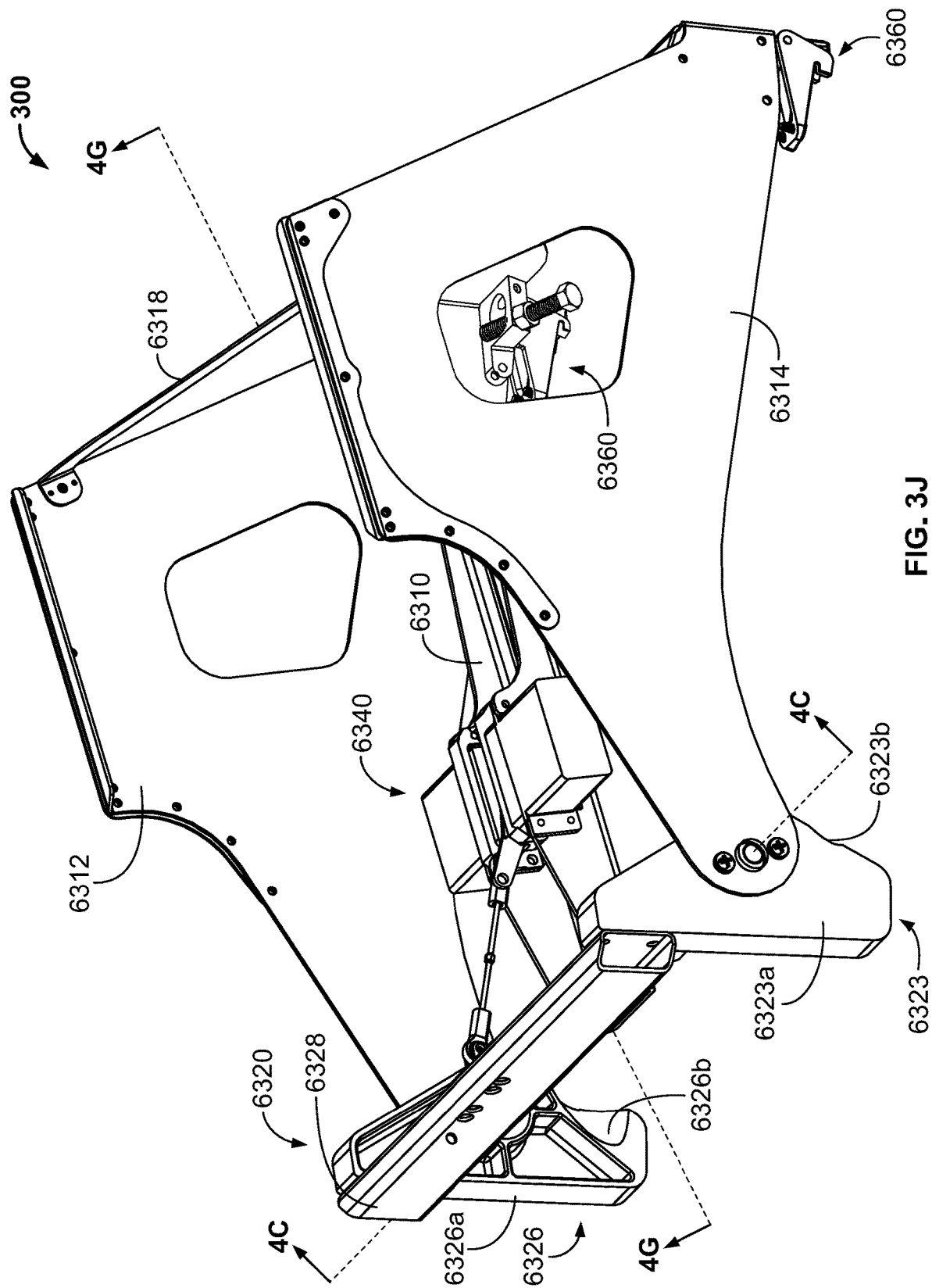
FIG. 3J is top perspective view of the saddle of FIG. 3I.
Figure 3K:
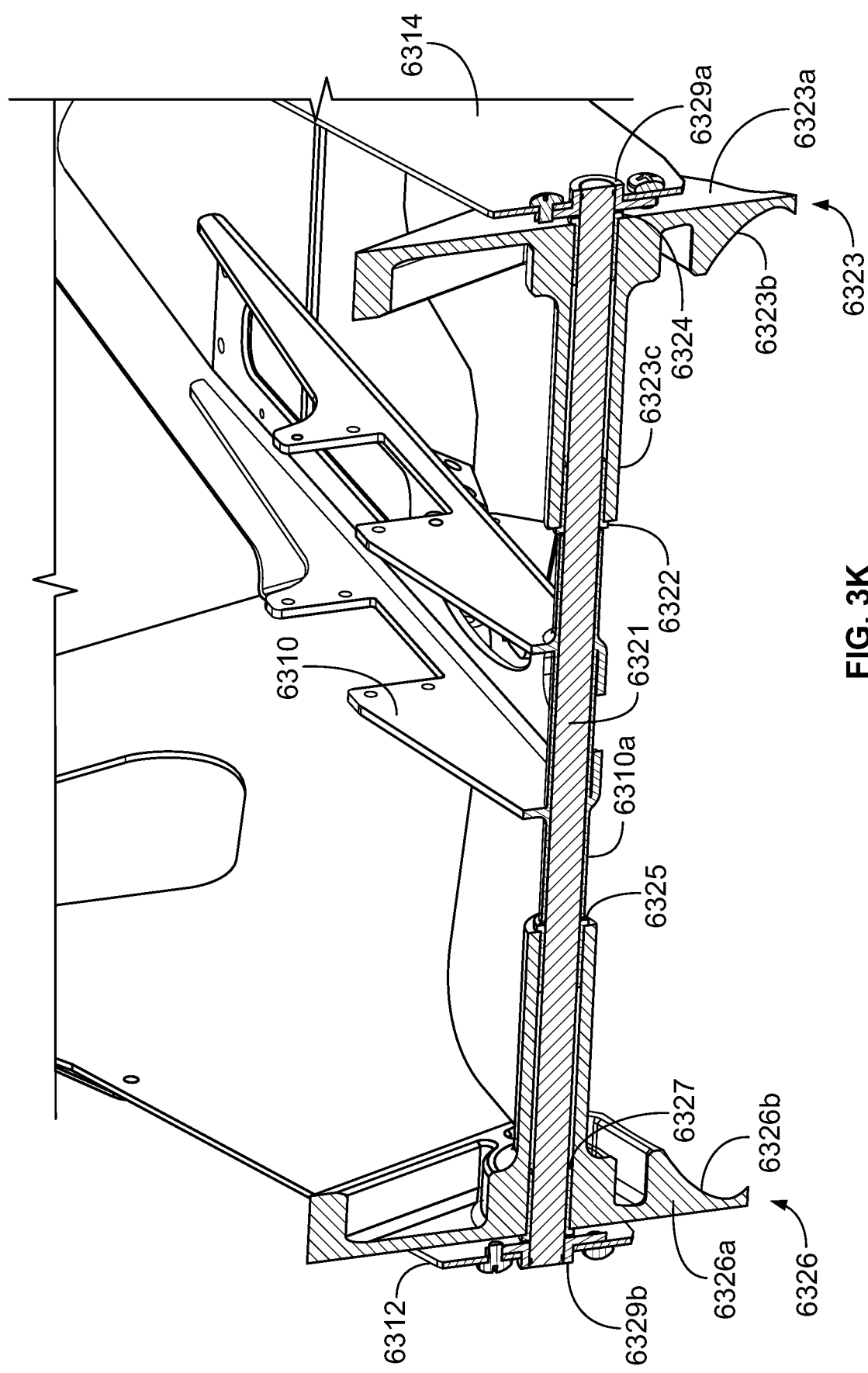
FIG. 3K is a cross-sectional view of the saddle of FIG. 3I taken substantially along line 4C-4C of FIG. 3J and with certain elements removed.

As best shown in FIGS. 3J and 3K, the front engager 6320 includes: a shaft 6321; first and second leading-edge engagers 6323 and 6326; sleeve bearings 6322, 6324, 6325, and 6327; and a stabilizer 6328.

The first leading-edge engager 6323 includes a generally triangular base 6323a having a tube 6323c extending therefrom. A shaft-receiving bore (not labeled) extends through the base 6323*a* and the tube 6323*c*. The base 6323*a* defines a contoured leading edge engaging surface 6323*b* that is shaped to receive and engage the portion of the leading edge of the wing of the fixed-wing aircraft 30 to which the saddle 300 will attach, as described below. The base 6323*a* includes a plurality of strengthening ribs extending outward from the tube 6323*c*. Similarly, the second leading-edge engager 6326 includes a generally triangular base 6326*a* having a tube 6326*c* extending therefrom. A shaft-receiving bore (not labeled) extends through the base 6326*a* and the tube 6326*c*. The base 6326*a* defines a contoured leading edge engaging surface 6326*b* that is shaped to receive and engage the portion of the leading edge of the wing of the fixed-wing aircraft 30 to which the saddle 300 will attach, as described below. The base 6326*a* includes a plurality of strengthening ribs extending outward from the tube 6326*c*.

As noted above, the front engager 6230 is connected or otherwise mounted to the saddle base bracket 6310 and the first and second saddle side brackets 6312 and 6314 such that the front engager 6320 is rotatable relative to those components. The saddle base bracket 6310 includes a tubular mounting portion 6310*a* that defines a shaft-receiving bore therethrough. Part of the shaft 6321 is received in the shaft-receiving bore of the tubular mounting portion 6310*a* such that first and second free ends of the shaft are positioned on opposing sides of the tubular mounting portion 6310*a*. The shaft 6321 is rotatably fixed relative to the saddle base bracket 6310, though in other embodiments the shaft 6321 may rotate relative to the saddle base bracket 6310. Suitable bearings may be incorporated at the interfaces between the saddle base bracket and the shaft to facilitate rotation of the shaft relative to the saddle base bracket.

The first and second leading-edge engagers 6323 and 6326 are rotatably mounted to the shaft 6321 on opposite sides of the tubular mounting portion 6310*a* of the saddle base bracket 6310 via the sleeve bearings 6322, 6324, 6325, and 6327. Specifically, the sleeve bearings 6322 and 6324 are press fit into the opposing ends of the shaft-receiving bore through the first leading-edge engager 6323 such that the sleeve bearings 6322 and 6324 cannot rotate relative to the first leading-edge engager 6323. Part of the shaft 6321 is received in the sleeve bearings 6322 and 6324 and the shaft-receiving bore of the first leading-edge engager 6323 such that the first end of the shaft 6321 protrudes from the sleeve bearing 6324. The first end of the shaft 6321 is received in a first retaining element 6329*a* fixedly attached to the second saddle side bracket 6314. The first retaining element 6329*a* prevents substantial axial movement of the shaft 6321 relative to the first retaining nub 6329*a*, and retains the first leading-edge engager 6323 on the shaft 6321. At this point, the first leading-edge engager 6323 is mounted to the shaft 6321 via the sleeve bearings 6322 and 6324 such that the first leading-edge engager 6323 is rotatable about the longitudinal axis of the shaft 6321 relative to the saddle base bracket 6310. The longitudinal axis of the shaft 6321 is above the leading edges of the wings of the fixed-wing aircraft 30.

Similarly, the sleeve bearings 6325 and 6327 are press fit into the opposing ends of the shaft-receiving bore through the second leading-edge engager 6326 such that the sleeve bearings 6325 and 6327 cannot rotate relative to the second leading-edge engager 6326. Part of the shaft 6321 is received in the sleeve bearings 6325 and 6327 and the shaft-receiving bore of the second leading-edge engager 6326 such that the second end of the shaft 6321 protrudes from the sleeve bearing 6325. The second end of the shaft 6321 is received in a second retaining element 6329*b* fixedly attached to the first saddle side bracket 6312. The second retaining element 6329*b* prevents substantial axial movement of the shaft 6321 relative to the second retaining element 6329*a*, and retains the second leading-edge engager 6326 on the shaft 6321. At this point, the second leading-edge engager 6326 is mounted to the shaft 6321 via the sleeve bearings 6325 and 6327 such that the second leading-edge engager 6326 is rotatable about the longitudinal axis of the shaft 6321 relative to the saddle base bracket 6310.

The stabilizer 6328 is attached to the base 6323*a* of the first leading-edge engager 6323 and to the base 6326*a* of the second leading-edge engager 6326 such that the stabilizer 6328 extends between and connects the first and second leading-edge engagers 6323 and 6326. The stabilizer 6328 ensures the first and second leading-edge engagers 6323 and 6326 rotate relative to the saddle base bracket 6310 and the first and second saddle side brackets 6312 and 6314 substantially simultaneously rather than independently of one another.

Figure 3L:
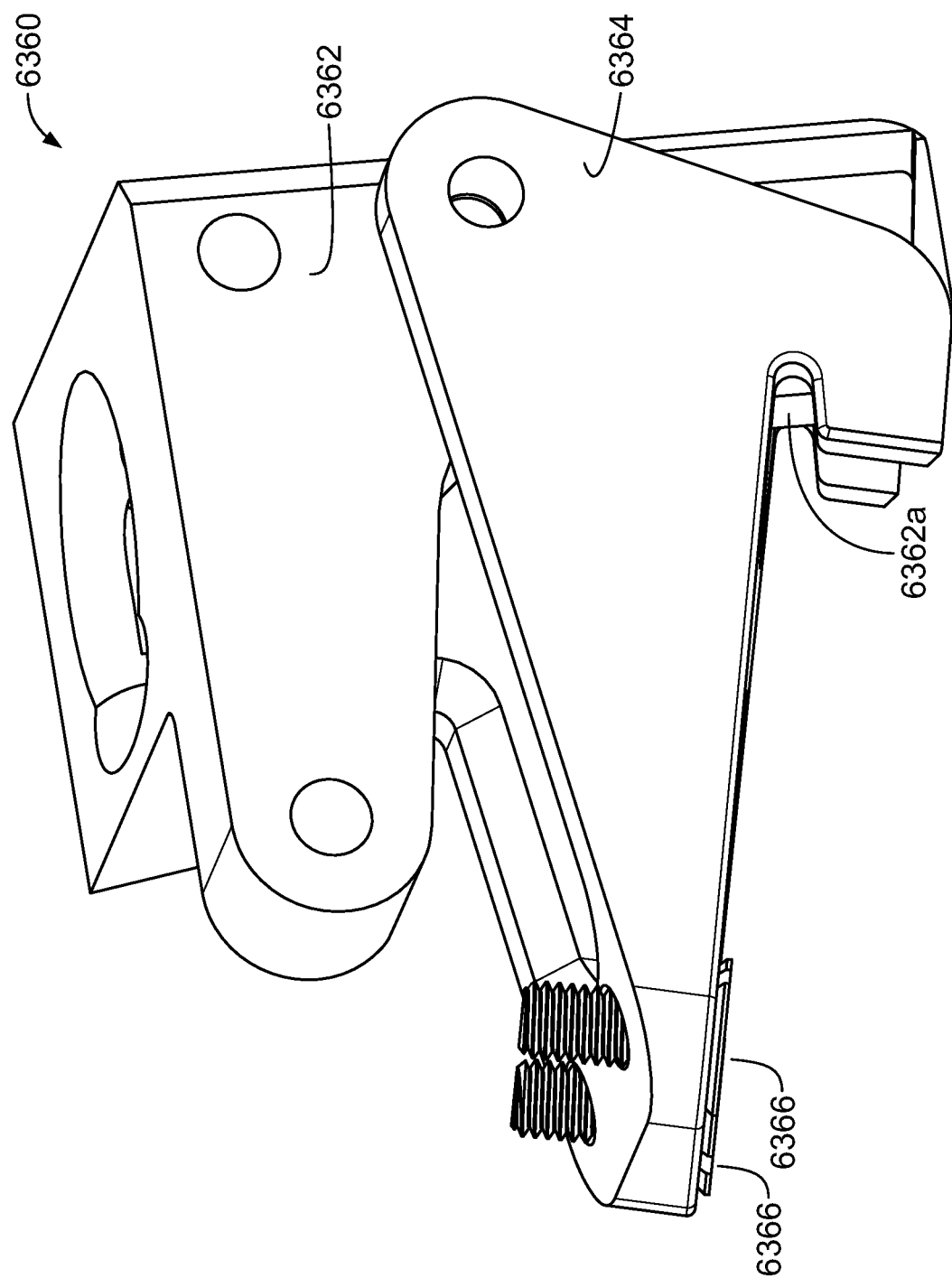
Figure 3N:
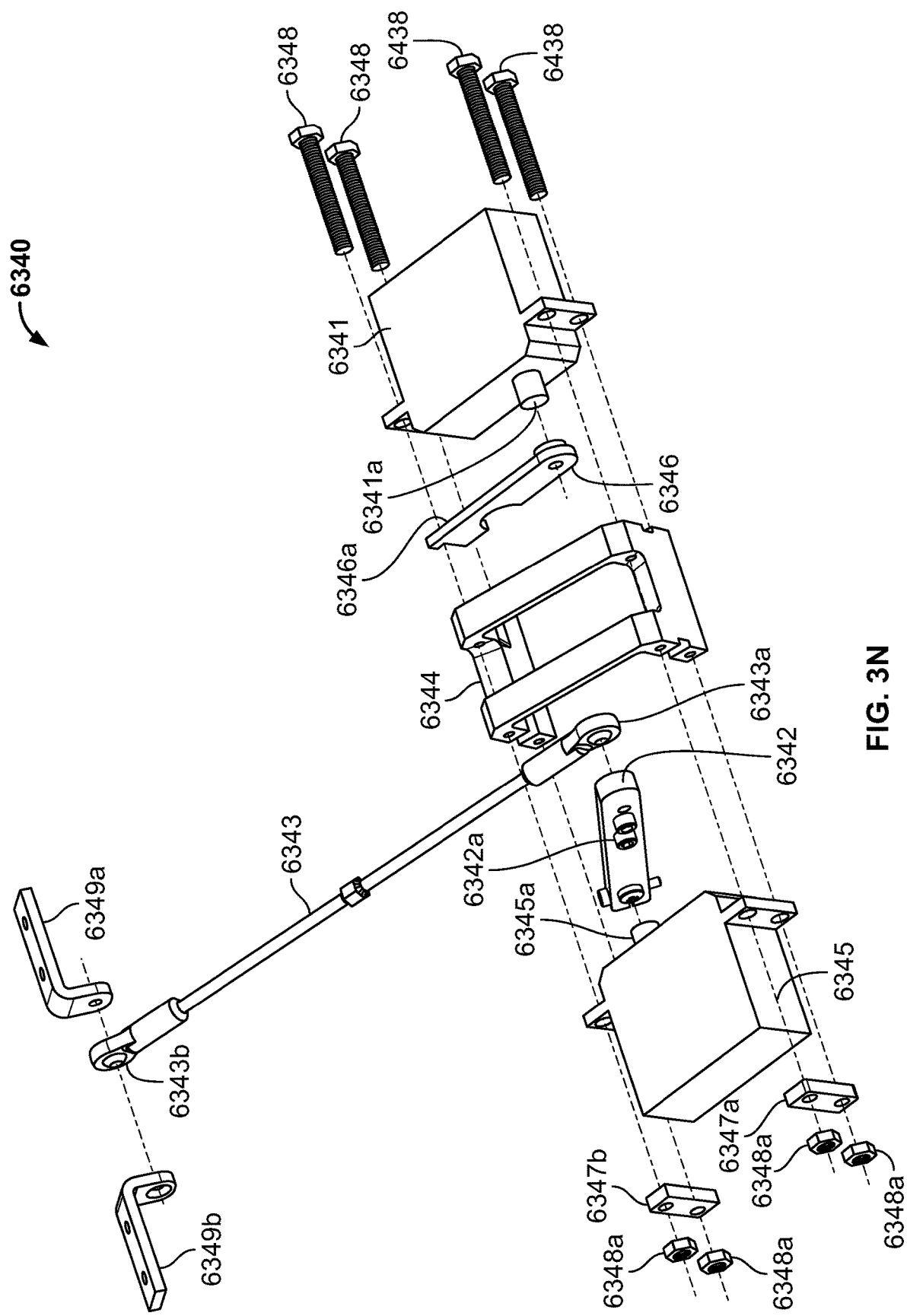
FIG. 3N is an exploded top perspective view of the attachment/release device of the part of the saddle of FIG. 3I.

As best shown in FIGS. 3J and 3M, an aircraft attaching/releasing assembly 6340 is attached to the saddle base bracket 6310 and to the front engager 6320 and controls rotation of the first engager 6320 about the longitudinal axis of the shaft 6321 relative to the saddle base bracket 6310. As best shown in FIG. 3N, the aircraft attaching/releasing assembly 6340 includes: a front engager servo motor 6345 having a front engager servo motor shaft 6345*a*, a front engager arm 6342, a front engager arm lock device 6342*a*, a servo spacer 6344, first and second nut plates 6347*a* and 6347*b*, fasteners 6348 and corresponding nuts 6348*a*, a front engager rotation control link 6343 having connectors 6343*a* and 6343*b* at opposite ends, a lock servo motor 6341 having a lock servo motor shaft 6341*a*, a lock arm 6346 terminating at one end in a locking extension 6346*a*, and first and second front engager attachment brackets 6349*a* and 6349*b*.

The front engager servo motor 6345 and the lock servo motor 6341 are attached to one another and to the saddle base bracket 6310 via the fasteners 6348, the servo spacer 6344, the first and second nut plates 6347*a* and 6347*b*, and the nuts 6348*a*.

The front engager arm 6342 is attached near one end to the front engager servo motor shaft 6345*a* and near the other end to the connector 6343*a*. The connector 6343*b* is attached to the stabilizer 6328 of the front engager 6320 via the first and second front engager attachment brackets 6349*a* and 6349*b* (such as via suitable fasteners, not shown). This operatively links the front engager servo motor shaft 6345*a* to the front engager 6320. The front engager arm lock device 6342*a* is attached to the front engager arm 6342 between the connector 6343*a* and the front engager servo motor shaft 6345*a*.

The lock arm 6346 is attached to the lock servo motor shaft 6341*a* near one end. The free end of the lock arm 6346 terminates in the locking extension 6346*a*, which is engageable to the front engager arm lock device 6342*a* in certain instances to prevent clockwise (from the viewpoint shown in FIGS. 3O-3Q) rotation of the front engager arm 6342.

The front engager servo motor 6345 controls rotation of the front engager 6320 (and, specifically, the first and second leading-edge engagers 6323 and 6326) about the longitudinal axis of the shaft 6321 relative to the saddle base bracket 6310. To rotate the front engager 6320, the front engager servo motor 6345 rotates the front engager servo motor shaft 6345*a*, which rotates the attached front engager arm 6342, which in turn rotates the front engager 6320 via the front engager rotation control link 6343. The front engager servo motor 6345 can rotate the front engager 6320 between an attached rotational position—shown in FIGS. 3O and 3P—and a release rotational position—shown in FIG. 3Q.

Figure 2B:
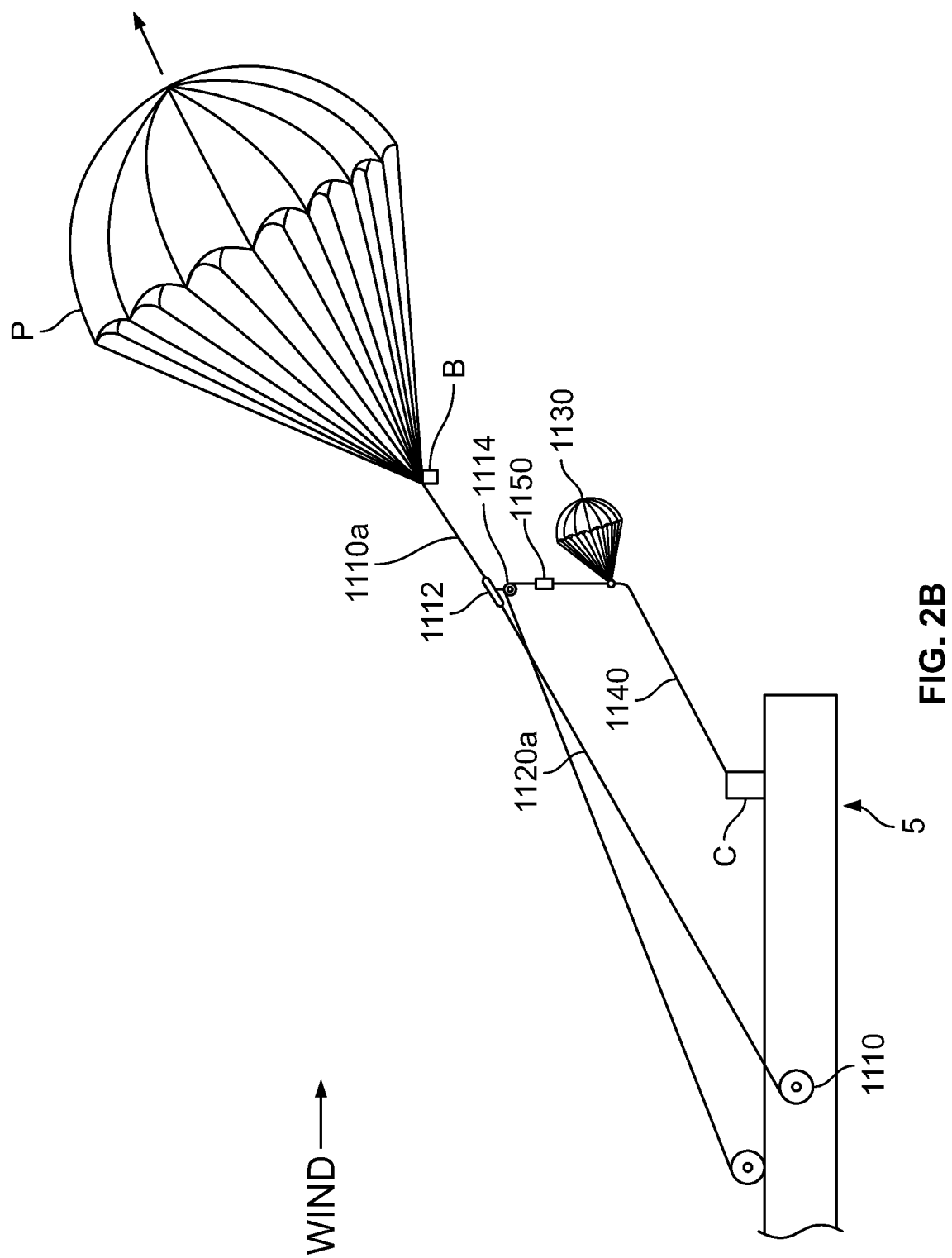
Figure 3O:
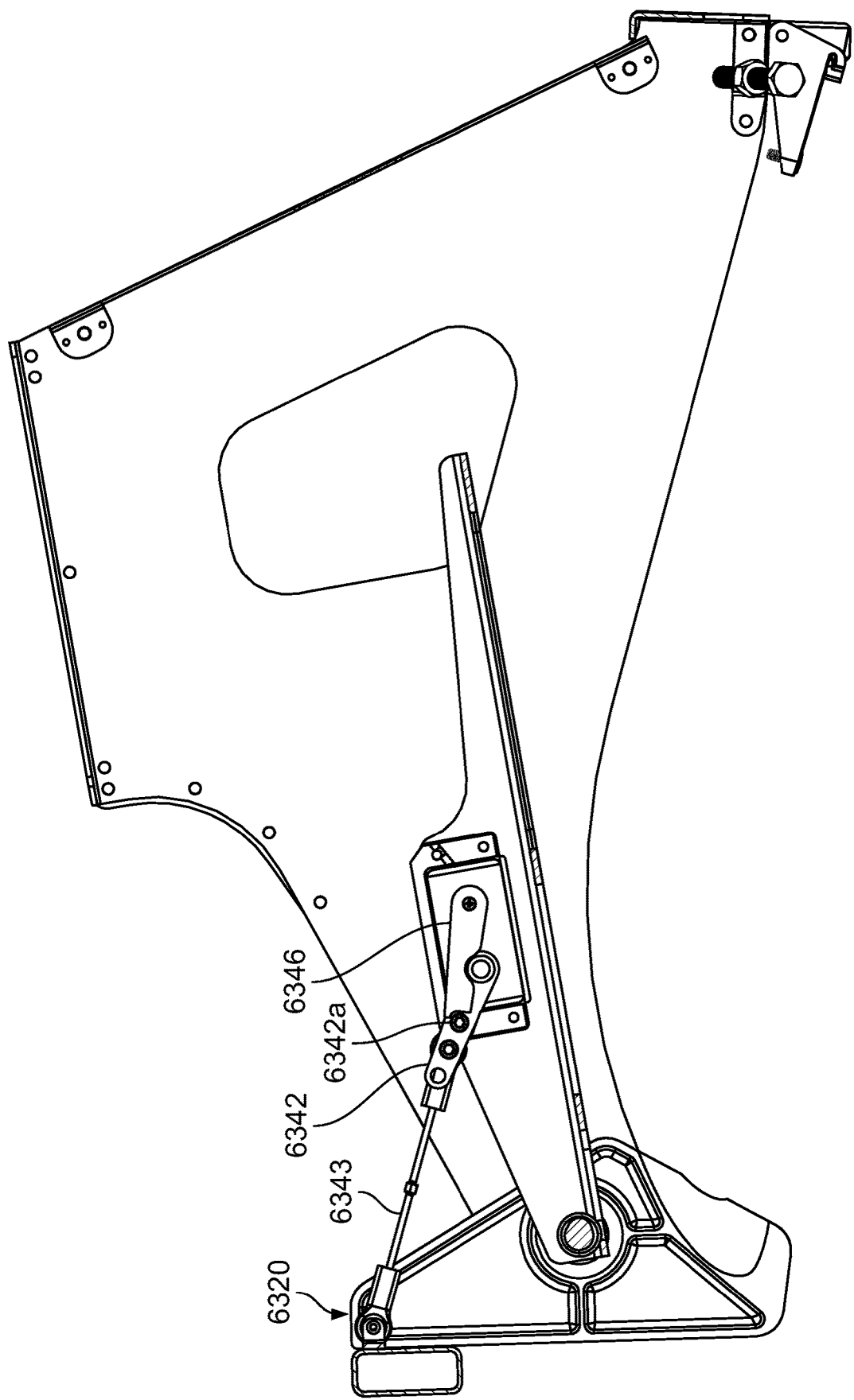
Figure 3P:
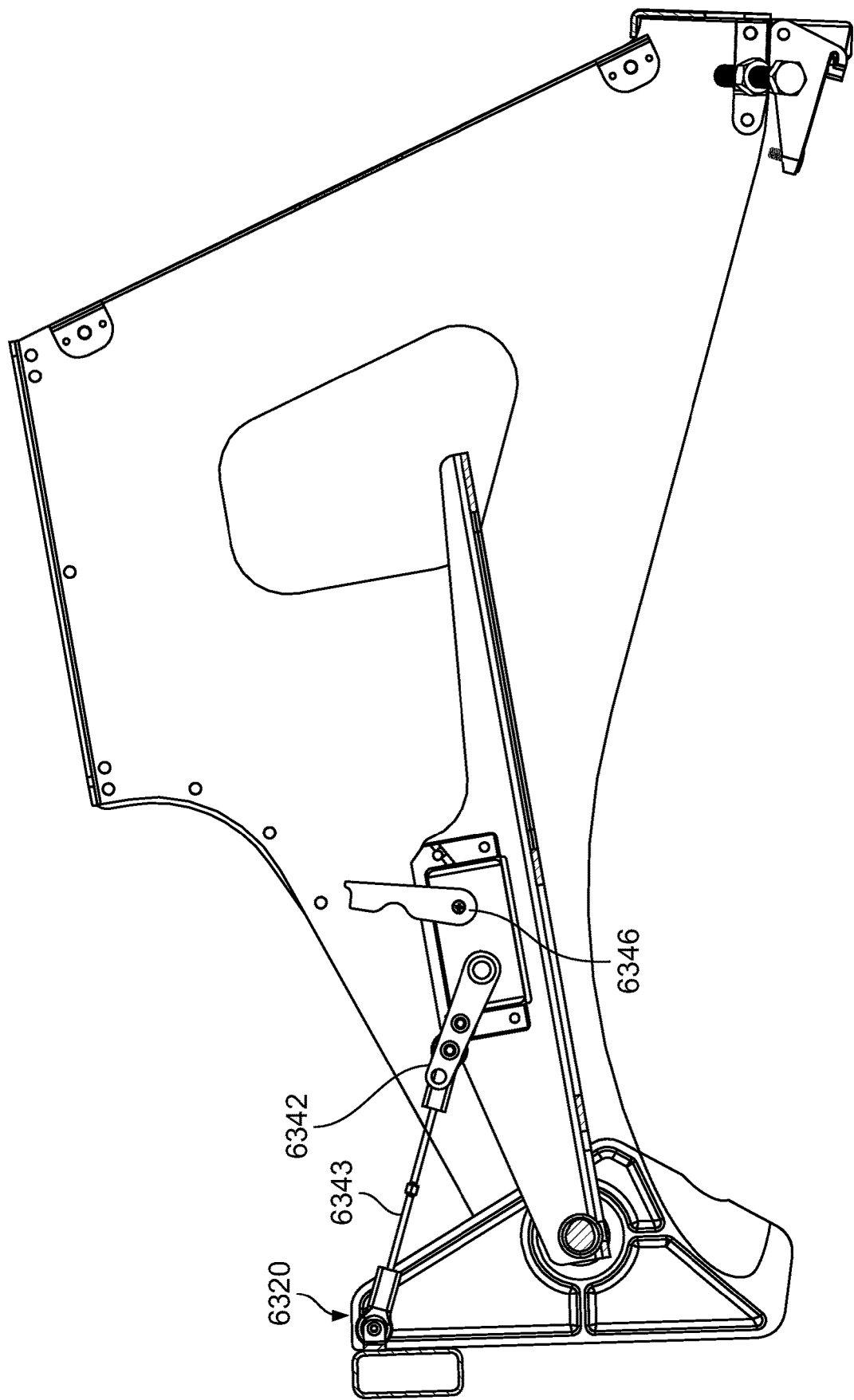

The lock servo motor 6341 controls rotation of the lock arm 6346 between a front engager rotation-preventing rotational position—shown in FIG. 3O—and a front engager rotation-enabling rotational position—shown in FIGS. 3P and 3Q. When the front engager 6320 is in the attached rotational position and the lock arm 6346 is in the front engager rotation-preventing rotational position, the locking extension 6346a engages the front engager arm lock device 6342a of the front engager arm 6342. This prevents the front engager servo motor 6345 from rotating the front engager 6320 clockwise (from the viewpoint shown in FIGS. 3O-3Q) from the attached rotational position to the release rotational position. As best shown in FIG. 2O, the servo spacer 6344 prevents counter-clockwise rotation (from the viewpoint shown in FIGS. 3O-3Q) of the front engager arm 6342.

FIGS. 3O-3Q show how the front engager servo motor 6345 and the lock servo motor 6341 cooperate to rotate the front engager 6320 from the attached rotational position to the release rotational position. Initially, the front engager arm 6342 is in the attached rotational position and the lock arm 6346 is in the front engager rotation-preventing rotational position. Here, the locking extension 6346a on the end of the lock arm 6346 engages the front engager arm lock device 6342a of the front engager arm 6342.

Since the locking extension 6346a engages the front engager lock device 6342a of the front engager arm 6342, the front engager servo motor 6345 cannot rotate the front engager 6320 from the attached rotational position to the release rotational position (clockwise from this viewpoint). And as indicated above, the servo spacer 6344b prevents counter-clockwise rotation of the front engager arm 6342 (from this viewpoint).

Rotating the front engager 6320 from the attached rotational position to the release rotational position is a two-step process. As shown in FIG. 3P, the operator first operates the lock servo motor 6341 to rotate the lock arm 6346 into the front engager rotation-enabling rotational position (clockwise from this viewpoint). Second, as shown in FIG. 3Q, the operator operates the front engager servo motor 6345 to rotate the front engager 6320 from the attached rotational position to the release rotational position (clockwise from this viewpoint).

As shown in FIG. 3J, separate (but in this embodiment, identical) rear engagers 6360 (here, trailing-edge engagers) are attached to the first and second saddle side brackets 6312 and 6314. As best shown in FIGS. 3L and 3M, the rear engager 6360 includes a body 6362 and a pivotable portion 6364 pivotably connected to the body 6362 via a suitable pivot shaft (not shown). The body 6362 includes a trailing edge engaging surface 6362a. The pivotable portion 6364 includes multiple surfaces that define a trailing edge receiving channel 6364a sized and shaped to receive the trailing edge of a wing of the fixed-wing aircraft 30. Fasteners 6366 are threadably received in the pivotable portion 6364. The fasteners 6366 engage the top surface of the wing of the fixed-wing aircraft 30, and can be threaded further into or further out of the pivotable portion 6364 as desired to adjust clearance between the pivotable portion 6364 and the exterior upper surface of the wing. In one embodiment, the fasteners are formed from a relatively soft material, such as Teflon, and the pivotable portion is formed from a relatively harder material, such as aluminum.

The body 6362 is fixedly attached to the appropriate saddle side bracket via suitable fasteners (not shown for clarity) such that the trailing edge engaging surface 6362a and the pivotable portion 6364 extend below the body 6362.

In operation, the operator attaches the hub module 100 to the fixed-wing aircraft 30 by: (1) operating the front engager servo motor 6345 (either manually or remotely via the R/C controller) to rotate the front engager 6320 to the release rotational position; (2) inserting the trailing edges of the wings of the fixed-wing aircraft 30 into the trailing edge receiving channels 6364a of the pivotable portions 6364 of the rear engagers 6360; (3) positioning the saddle 300 relative to the fixed-wing aircraft 30 such that the leading edge engaging surfaces 6323b and 6326b of the front engager 6320 are adjacent the leading edges of the wings of the fixed-wing aircraft 30; (4) operating the front engager servo motor 6345 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 30; and (5) operating the lock servo motor 6341 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

At this point the fixed-wing aircraft 30 is attached to the saddle 300 (and the aircraft-launch apparatus 10) because the front engager 6320 and the rear engagers 6360 engage the wings of the fixed-wing aircraft 30 therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6345 cannot rotate the front engager 6320 from the attached rotational position to the release rotational position. This prevents undesired release of the fixed-wing aircraft 30 from the saddle 300 (and the aircraft-launch apparatus 10).

Releasing the fixed-wing aircraft 30 from the saddle 300 while the aircraft-launch apparatus 10 is airborne is a two-step process shown in FIGS. 3P and 3Q. To release the fixed-wing aircraft 30 from the saddle 300 (and the aircraft-launch apparatus 10), the operator first remotely controls the lock servo motor 6341 (via the R/C controller) to rotate the lock arm 6346 into the front engager rotation-enabling rotational position, as shown in FIG. 3P. Second, the operator remotely controls the front engager servo motor 6345 (via the R/C controller) to rotate the front engager 6320 from the attached rotational position to the release rotational position, as shown in FIG. 3Q. As the front engager servo motor 6345 rotates the front engager 6320 from the attached rotational position to the release rotational position, the first and second leading edge engaging surfaces 6323b and 6326b of the front engager 6320 rotate away from and begin to lose contact with the leading edge of the wing of the fixed-wing aircraft 30. As the front engager 6320 continues to rotate clear of the wings of the fixed-wing aircraft 30, the pivotable portions 6364 of the rear engagers 6360 enable the fixed-wing aircraft 30 to freely pivot relative to the saddle base bracket 6310, the first and second saddle side brackets 6312 and 6314, and the bodies 6362 of the rear engagers 6360 as gravity pulls the fixed-wing aircraft 30 downward.

The center of gravity of the fixed-wing aircraft 30 is positioned forward of the rear engagers. As this occurs, the trailing edge engaging surfaces 6362a of the bodies 6362 of the rear engagers 6360 gradually enter the trailing-edge receiving channels of the pivotable portions 6364. As this occurs, the trailing-edge engaging surfaces 6362a contact the trailing edge of the wings and force them out of the trailing edge receiving channels, thus releasing the fixed-wing aircraft 30 from the saddle 300 (and the aircraft-launch apparatus 10) into free flight.

As the fixed-wing aircraft 30 rotates downward, its empennage rises relative to the aircraft-launch apparatus 10 as the nose of the fixed-wing aircraft 30 drops. The rear engagers are configured such that the trailing edges of the wings of the fixed-wing aircraft 30 are forced out of the trailing edge receiving channels before the empennage of the fixed-wing aircraft 30 contacts the aircraft-launch apparatus 10.

As noted above, this embodiment of the saddle 300 may be sized, shaped, arranged, and otherwise configured to attach to and release any suitable fixed-wing aircraft by clamping its wings between front and rear engagers. An operator could—without changing any other components of the aircraft-launch apparatus 10—swap out one saddle base bracket, front engager, and rear engager combination (or the entire saddle including those components) configured for one type of aircraft with another saddle base bracket, front engager, and rear engager combination (or the entire saddle including those components) configured for a different type of aircraft. This adds yet another layer of modularity to the aircraft-launch apparatus 10 and enables it to carry many different types of fixed-wing aircraft without requiring any modification of those fixed-wing aircraft.

In other embodiments, the saddle may be the saddle described in U.S. Patent Application Publication No. 2017/0158318, the entire contents of which are incorporated herein by reference. That saddle is configured to attach to the fixed-wing aircraft 30 via a hook of the fixed-wing aircraft 30 (or any other fixed-wing aircraft including a suitable hook).

The arm modules 400a to 400d are mechanically attachable to and mechanically lockable to the hub module 200 and include locking assemblies that lock the arm modules 400a to 400d to the hub module 100. FIGS. 3R-3V show the first arm module 400a and components thereof. The other arm modules 400b, 400c, and 400d are similar to the first arm module 400a and are therefore not separately shown or described.

Figure 3R:
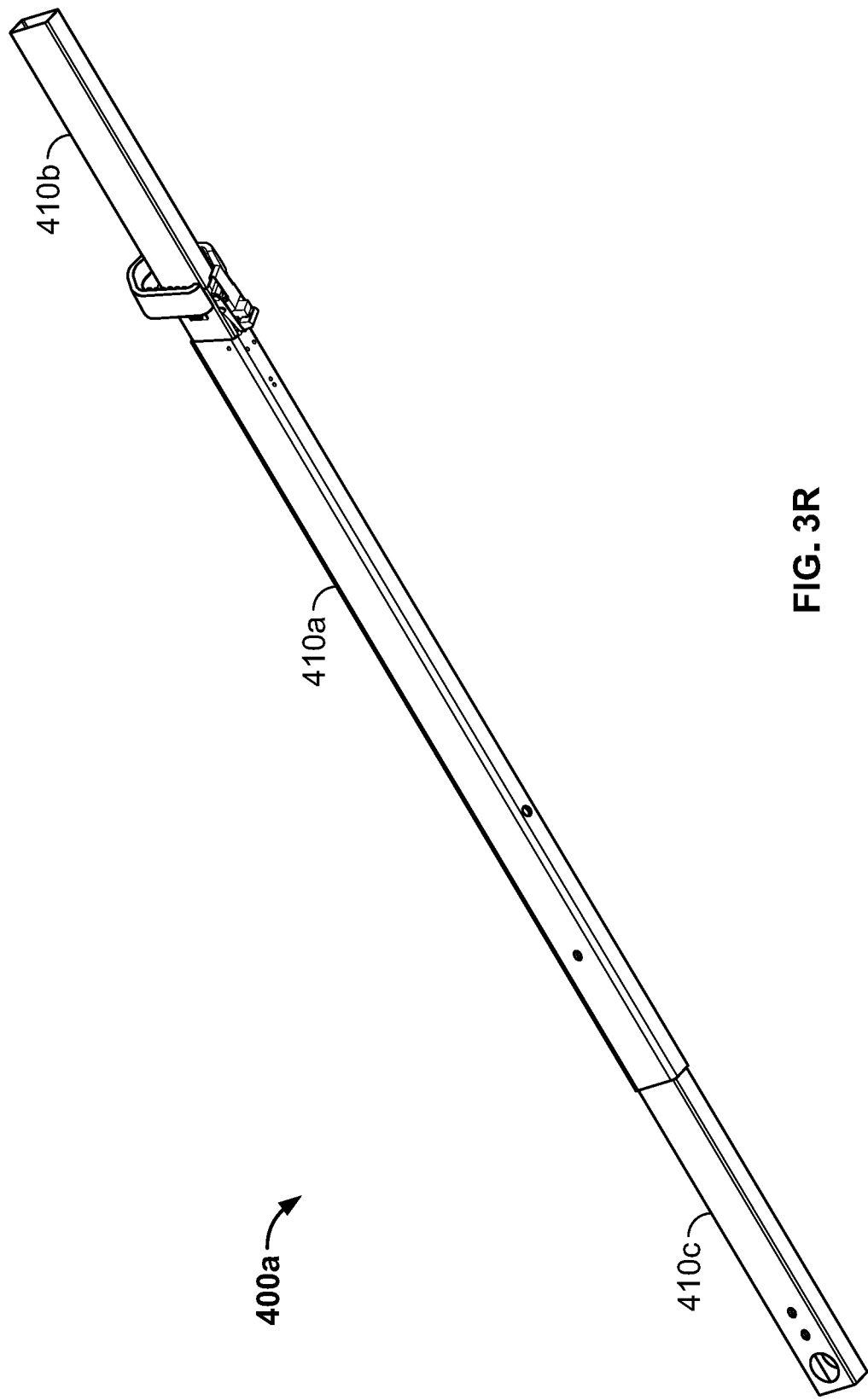
FIG. 3R is a perspective view of one of the arm modules of the aircraft-launch apparatus of FIG. 3A.

As best shown in FIG. 3R, the first arm module 400a includes a generally rectangular elongated tubular arm 410a, a generally rectangular tubular first arm extension 410b, a generally rectangular second arm extension 410c, a locking assembly 420, and a male blind mate connector 431.

The first arm extension 410b is attached to the arm 410a such that part of the first arm extension 410b is disposed within the arm 410a and the remainder of the first arm extension 410b extends from the arm 410a. Similarly, the second arm extension 410c is attached to the arm 410a such that part of the second arm extension 410c is disposed within the arm 410a and the remainder of the arm extension 410c extends from the arm 410a. The locking assembly 420 is attached to the underside of the arm 410a near the end of the arm 410a from which the first arm extension 410b extends. The male blind mate connector 431 is attached to the end of the arm 410a from which the arm extension 410b extends.

Figure 3S:
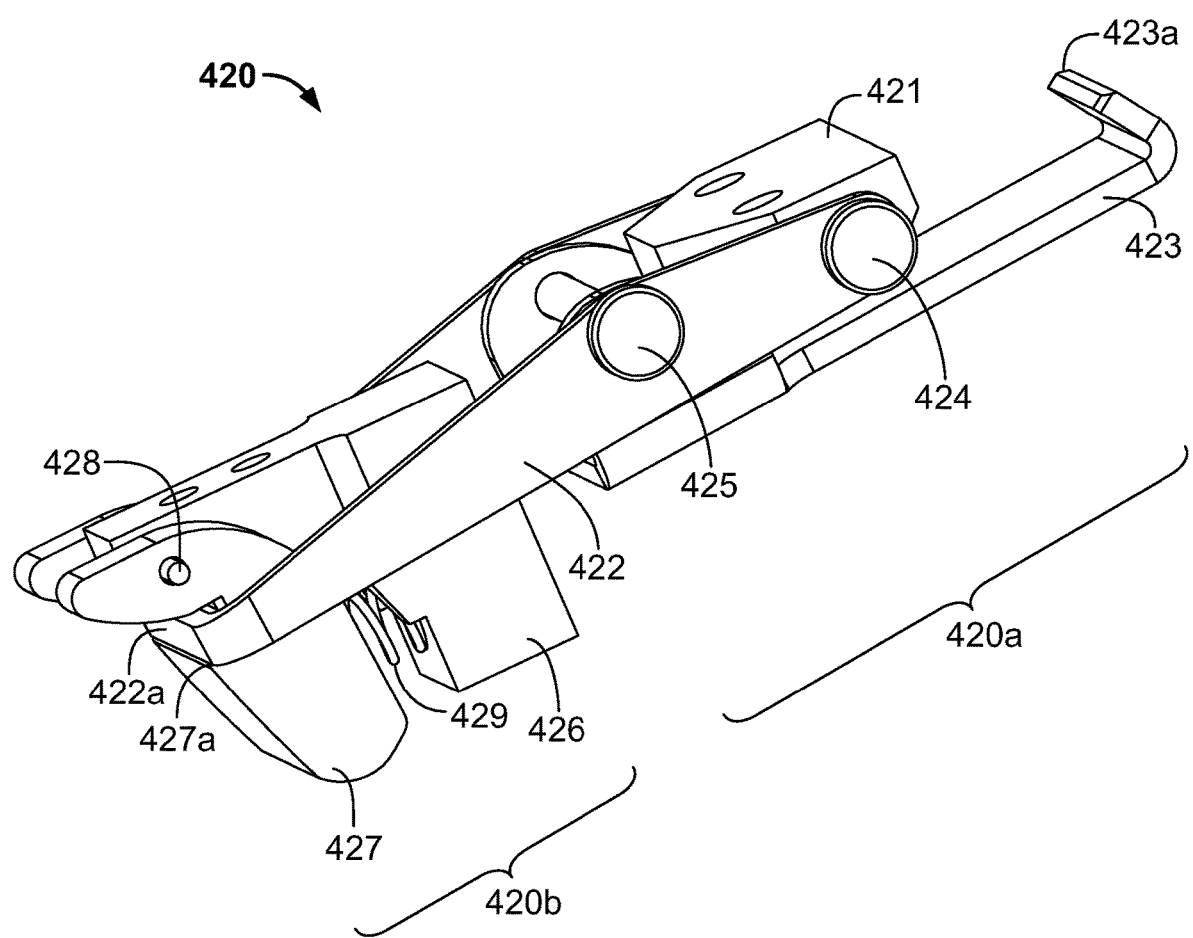
FIG. 3S is perspective view of the locking assembly of the arm module of FIG. 3R.
Figure 3T:
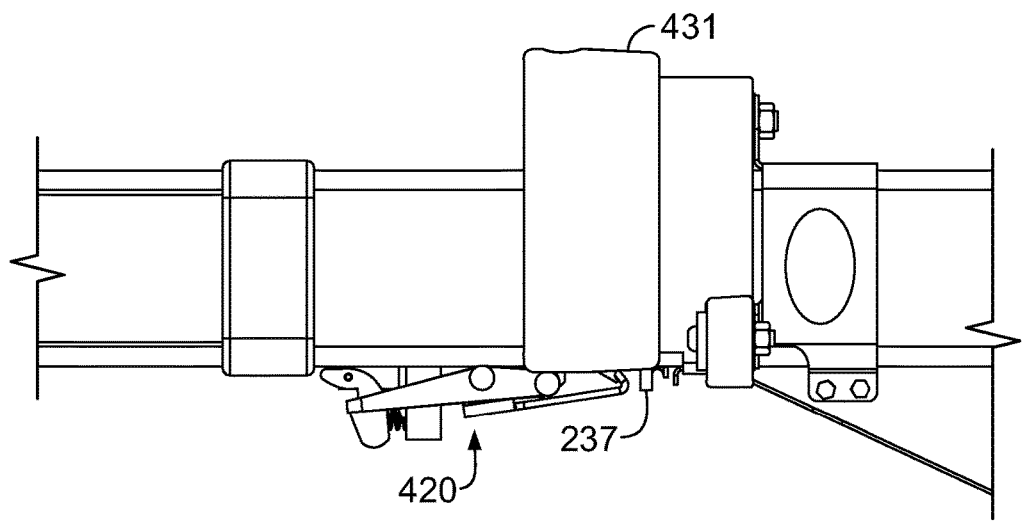
FIGS. 3T, 3U, and 3V are side elevational views of the arm module of FIG. 3R detaching from the hub module of FIG. 3E via the locking assembly of FIG. 3S.
Figure 3U:
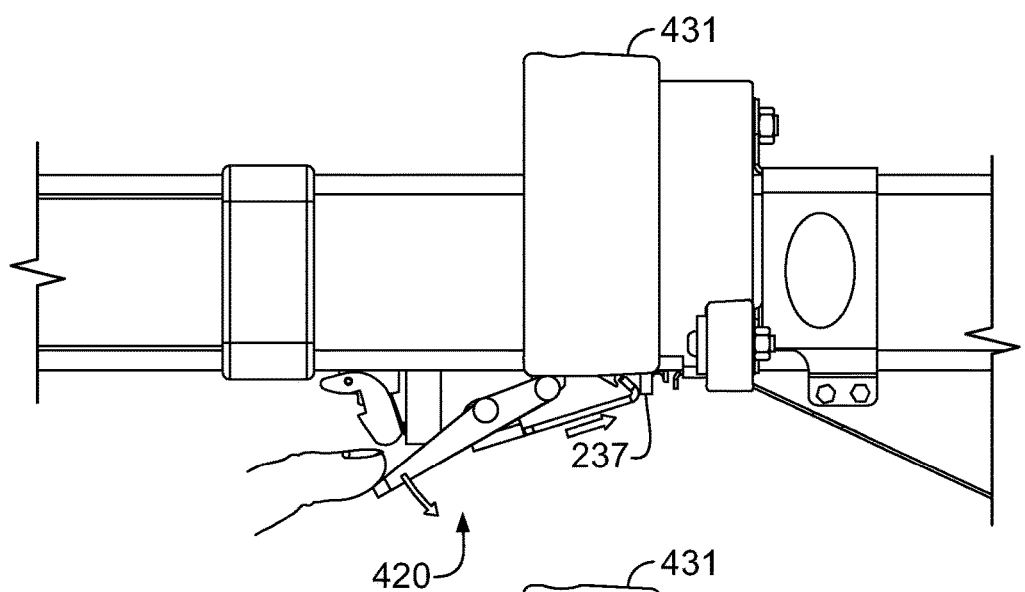
Figure 3V:
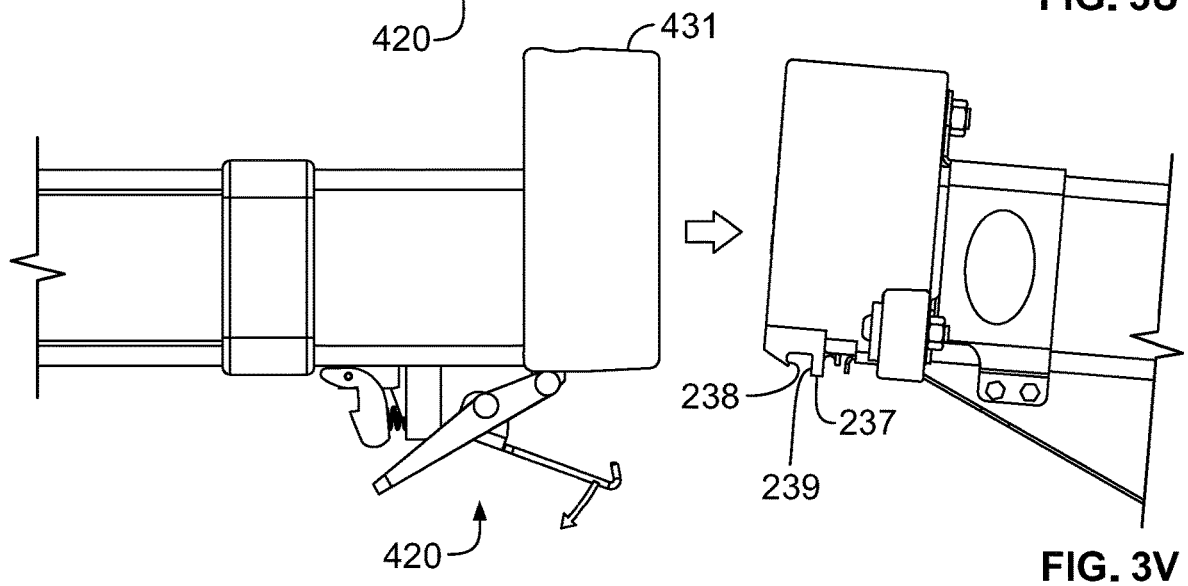

As best shown in FIGS. 3T-3V, the male blind mate connector 431—along with its counterpart female blind mate connector 231a of the hub module 100—facilitate mechanical attachment of the first arm module 400a to the hub module 100. The male blind mate connector 431 includes a plurality of pins 431a configured to mate with the pin receptacles of the female blind mate connector 231a.

To attach the first arm module 400a to the hub module 100, an operator inserts the arm extension 410b into the first arm module receiving socket 214a of the hub module 100 and slides the first arm module 400a toward the hub module 100 with enough force to mate the pins of the male blind mate connector 431 with the pin receptacles of the female blind mate connector 231a of the hub module 100.

As best shown in FIGS. 3S-3V, the locking assembly 420 includes a drawcatch 420a and a drawcatch lock 420b that facilitate attaching the first arm module 400a to the hub module 100, lock the first arm module 400a to the hub module 100, and facilitate detaching the first arm module 400a from the hub module 100.

As best shown in FIG. 3S, the drawcatch 420a includes a base 421, a lever 422, a claw 423, a first fastener 424 (such as a clevis pin or other suitable fastener), and a second fastener 425 (such as a clevis pin or other suitable fastener). The drawcatch lock 420b includes a base 426, a lock/release device 427 having a locking shelf 427a, a pin 428 (or other suitable connector), and a compression spring 429 (or other suitable biasing element).

The base 421 is attached to the underside of the arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first arm module 400a and the hub module 100 are locked together.

As shown in FIGS. 3T-3V, the operator reverses this process to unlock the first arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

At this point, the operator can either physically pull the first arm module 400a and the hub module 100 apart to separate the male and female blind mate connectors 431 and 231a or use the locking assembly 420 to aid in detachment. When using the locking assembly 420 to aid in detachment, as shown in FIG. 3U, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first arm module 400a and the hub module 100 apart.

Figure 3W:
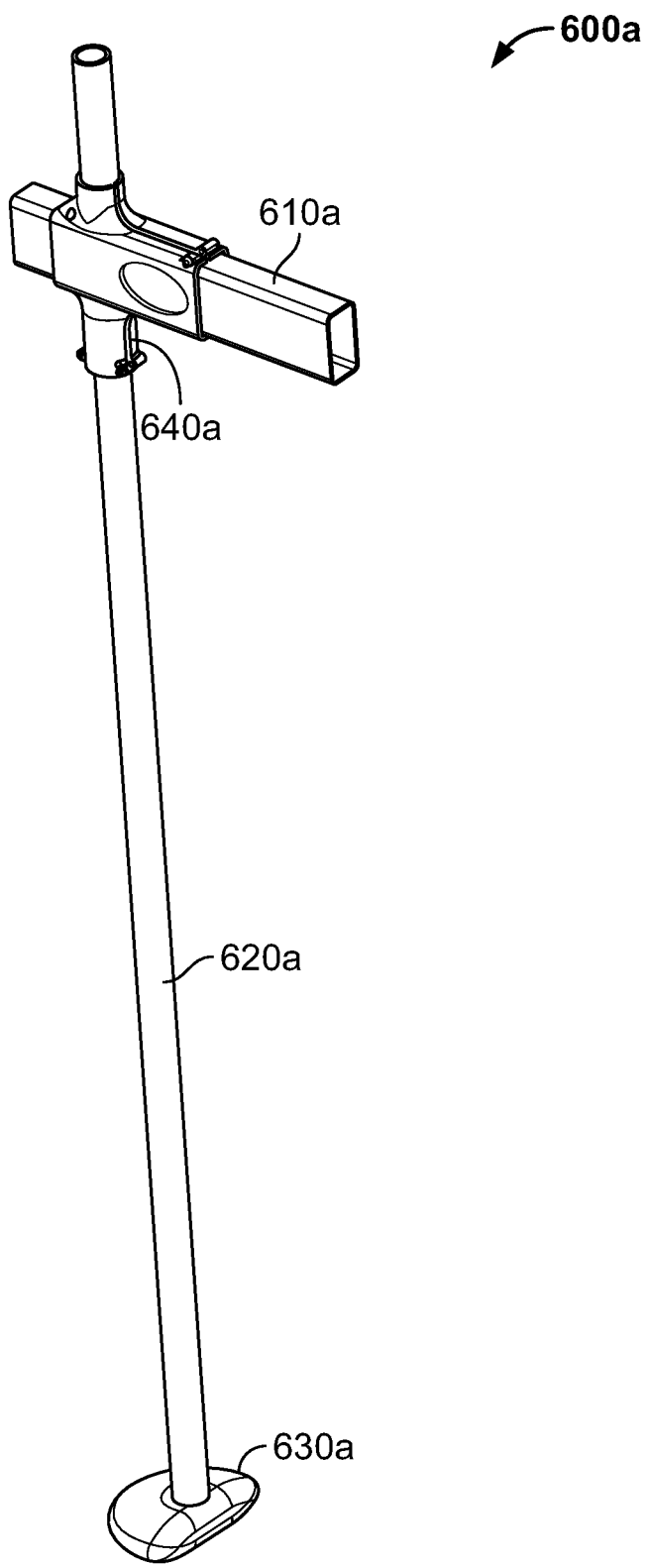
FIG. 3W is a perspective view of one of the front landing gear modules of the aircraft-launch apparatus of FIG. 3A.

FIG. 3W shows the first front landing gear module 600a. The front landing gear modules (along with the rear landing gear modules, described below) support the aircraft-launch apparatus 10 when assembled but not flying, and facilitate launch and landing of the aircraft-launch apparatus 10 without damaging the aircraft-launch apparatus 10. The second front landing gear module 600b is similar to the first front landing gear module 600a and is therefore not separately shown or described.

The first front landing gear module 600a includes a base 640a, a generally cylindrical leg 620a attached to and extending from the base 640a, and a generally rectangular tubular arm module receiving arm 610a attached to and extending from the base 640a. The leg 620a terminates in a generally semicircular foot 630a. The arm module receiving arm 610a defines an arm module receiving socket (not labeled) sized to receive the first arm module 400a.

The operator attaches the first front landing gear module 600a to the first arm module 400a by inserting the free end of the second arm extension 410c into the arm module receiving socket of the arm module receiving arm 610a of the first front landing gear module 600a. The operator then locks these two modules together, such as via suitable fasteners.

Figure 3X:
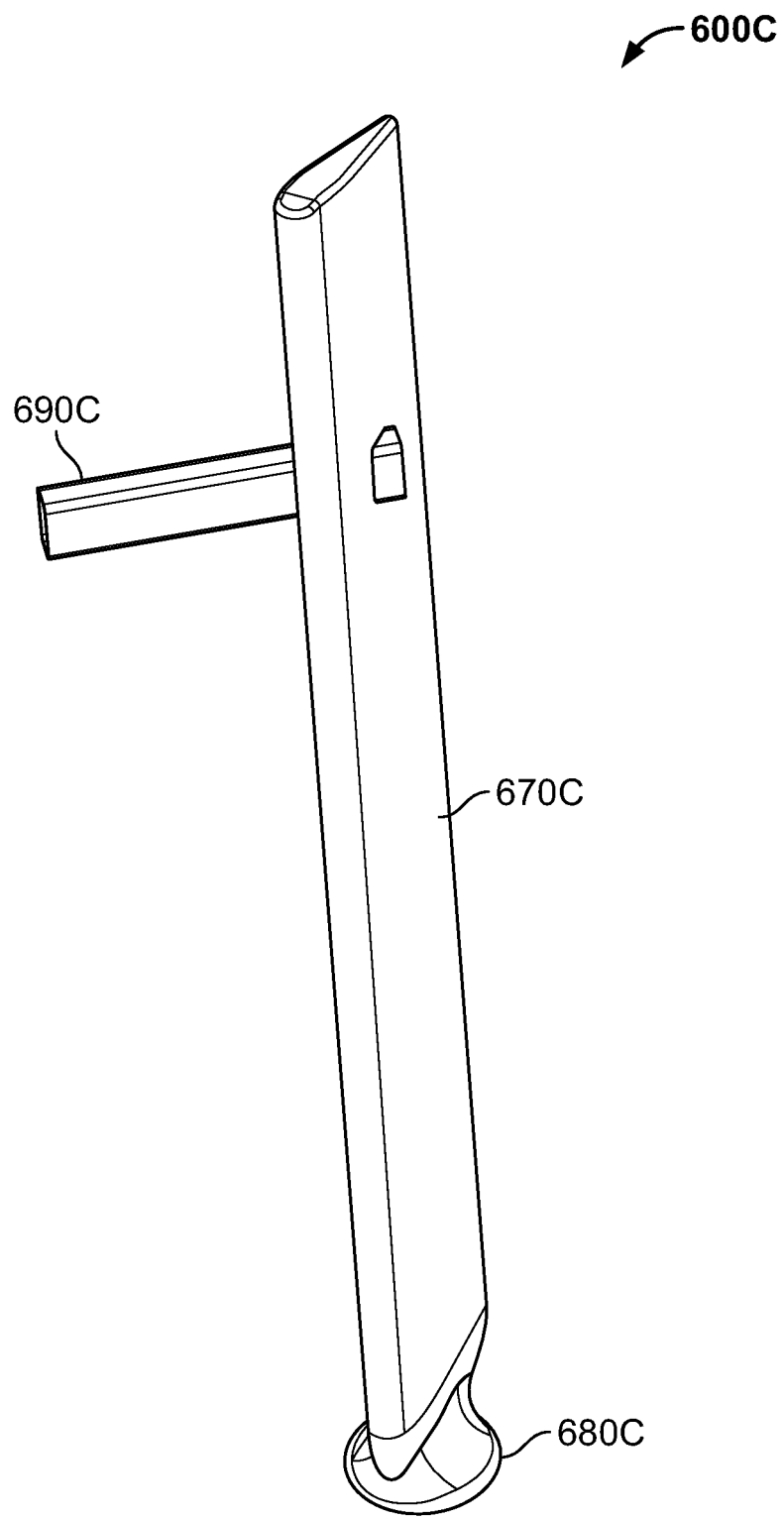
FIG. 3X is a perspective view of one of the rear landing gear modules of the aircraft-launch apparatus of FIG. 3A.

FIG. 3X shows the first rear landing gear module 600c. The rear landing gear modules (along with the front landing gear modules, described above) support the aircraft-launch apparatus 10 when assembled but not flying, and facilitate launch and landing of the aircraft-launch apparatus 10 without damaging the aircraft-launch apparatus 10. The rear landing gear modules are shaped such that they act as vertical stabilizers (or fins) during flight, ensuring that the front of the aircraft-launch apparatus 10 (and the nose of the fixed-wing aircraft 30, if attached thereto) points generally into the airflow when in flight. The second rear landing gear module 600d is similar to the first rear landing gear module 600c and is therefore not separately shown or described.

The first rear landing gear module 600c includes a body 670c having a generally triangular cross-section that tapers from front to back. The body 670c transitions at its bottom into a generally circular foot 680c. A generally rectangular tubular arm module receiving arm 690c is attached to and extends through the body 670c.

The operator attaches the first rear landing gear module 600c to the third arm module 400c by inserting the free end of the third arm extension into the arm module receiving socket of the arm module receiving arm 690a of the first rear landing gear module 600c. The operator then locks these two modules together, such as via suitable fasteners.

Once attached, the rear landing gear modules are oriented such that the side surfaces of the bodies of the rear landing gear modules are substantially aligned with the saddle side brackets 612 and 614 of the saddle 300. When the fixed-wing aircraft 30 is attached to the aircraft-launch apparatus 10, these side surfaces of the rear landing gear modules are substantially parallel to a plane containing the roll axis of the fuselage of the fixed-wing aircraft 30. The relatively long length of these side surfaces of the rear landing gear modules cause the rear landing gear module to act as fins in flight. This weather vane effect ensures that the nose of the fixed-wing aircraft 30 is oriented into the airflow when airborne.

One or more operators may use the components of the aircraft launch system to launch the fixed-wing aircraft 30 into free, wing-borne flight. A single operator is referred to below for brevity and clarity.

To prepare for launch, the operator attaches the first and second winches 1110 and 1120 to suitable areas of the ship S in a suitable manner. In this example embodiment, the first winch 1110 is attached below the deck of the ship S while the second winch 1120 is attached to the deck of the ship S via mounting brackets and fasteners (not shown). The operator attaches one end of the first flexible member 1110a to the drum of the first winch 1110 and controls the first winch 1110 to retract most of the first flexible member 1110a. Similarly, the operator attaches one end of the second flexible member 1120a to the drum of the second winch 1120 and controls the second winch 1120 to retract most of the second flexible member 1120a.

The operator attaches the free end of the first flexible member 1110a to the left and right bridle sets of the parasail P. This attaches the parasail P to the first winch 1110. The operator also attaches the ballast B to the left and right bridle sets of the parasail P such that the mass of the ballast B is distributed between the left and right bridle sets of the parasail P. The operator may decide to bias the ballast to force the parasail to fly off to the left or right side of the ship.

In certain situations, the ship S may already be equipped with the first winch, the first flexible member, the parasail, and/or the ballast. In these situations, the operator need not take the above-described steps, and instead leverages the equipment already on the moving object (along with the additional components described above) to launch the fixed-wing aircraft into free, wing-borne flight.

The operator positions the fixed-wing aircraft 30 on the deck, such as on a launch-assist structure that can be removably attached to the deck and that retains the fixed-wing aircraft in a desired orientation. The operator attaches the hub module 100 of the aircraft-launch apparatus 10 to the fixed-wing aircraft 30 by: (1) operating the front engager servo motor 6341 (either manually or remotely via the R/C controller) to rotate the front engager 6320 to the release rotational position; (2) inserting the trailing edges of the wings of the fixed-wing aircraft 30 into the trailing edge receiving channels 6364a of the pivotable portions 6364 of the rear engagers 6360; (3) positioning the saddle 300 relative to the fixed-wing aircraft 30 such that the leading edge engaging surfaces 6323b and 6326b of the front engager 6320 are adjacent the leading edges of the wings of the fixed-wing aircraft 30; (4) operating the front engager servo motor 6341 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 30; and (5) operating the lock servo motor 6345 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

In some example embodiments, the rear engager may be linked to the front engager, such that the rear engager disengages the trailing edge wing root as the front engager releases the leading edge wing root. This is illustrated in FIGS. 3CC and 3DD. The rear engager 350 is linked to the front engager 352 by a linking mechanism 354, such that when the front engager 352 releases, the rear engager 350 also releases. The release process is shown in FIG. 3DD.

The use of the linking mechanism may allow both the front engager 352 and rear engager 350 to be actuated, causing an engaged aircraft to have no more coupling to the hub. Other embodiments may include a "center of gravity hook" or other component of the aircraft that is used to couple the aircraft to the hub. However by using the linking mechanism to control both the front engager and rear engager, the hook is no longer needed. Removal of the hook can remove drag and weight from the aircraft, and allow any fixed-wing aircraft of suitable size to be coupled to the hub and released.

In some examples, the front engager may be actuated and thereby cause the rear engager to actuate via the linking mechanism. In this case, the aircraft may only actuate the front engager, and may not have a separate actuator for the rear engager. In other examples, both the front engager and the rear engager may have separate actuators configured to move them individually. Still further, in some examples the rear engager may be coupled to an actuator that causes it to move, and via the linking mechanism, may cause the front engager to move as well.

At this point the fixed-wing aircraft 30 is attached to the saddle 300 because the front engager 6320 and the rear engagers 6360 engage the wings of the fixed-wing aircraft 30 therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6341 cannot rotate the front engager 6320 from the attached rotational position to the release rotational position. This prevents undesired release of the fixed-wing aircraft 30 from the saddle 300 (and the aircraft-launch apparatus 10).

After the hub module 100 is attached to the fixed-wing aircraft 30, the operator attaches the front and rear landing gear modules 600a to 600d to their respective arm modules 400a to 400d and attaches and locks the arm modules 400a to 400d to the hub module 100 to complete assembly of the aircraft-launch apparatus 10.

The operator starts up the engine of the fixed-wing aircraft 30, and controls the ship S to head into the wind and maintain this course throughout the launch process.

The operator opens the parasail P and controls the first winch 1110 to payout the first flexible member 1110a until the parasail P reaches a stable flying height. At this point in this example embodiment, about 50-100 feet of the first flexible member 1110a extend between the first winch 1110 and the parasail P. As shown in FIG. 1A, the operator attaches the first flexible member attachment device 1112 (and its attached one-way pulley 1114) to the first flexible member 1110 a first distance from the parasail P. In this example embodiment, the first distance is about 50-100 feet, though it may be any suitable distance in other embodiments. After attachment, the first flexible member attachment device 1112 is movable along the first flexible member 1110 toward the parasail P but not in the opposite direction.

The operator feeds the free end of the second flexible member 1120a through a guide loop (not labeled) on a mast M of the ship S, wraps the second flexible member 1120a around the wheel of the pulley 1114, and attaches the free end of the second flexible member 1120a to the snag-prevention member 299 of the aircraft-launch apparatus 10. This attaches the aircraft-launch apparatus 10 to the second winch 1120 and the first flexible member 1110a to the second flexible member 1120a. The operator controls the second winch 1120 to retract the second flexible member 1120a and remove any slack in the second flexible member 1120a, which draws the pulley 1114 and the snag-prevention member 299 together. Once the slack is removed and the snag-prevention member 299 is at or near the pulley 1114, the operator controls the second winch 1120 to maintain enough tension in the second flexible member 1120a to retain the snag-prevention member 299 (and therefore the aircraft-launch apparatus 10) at or near the pulley 1114.

As shown in FIG. 1B, the operator controls the first and second winches 1110 and 1120 such that the first and second flexible members 1110a and 1120a are respectively paid out from the first and second winches 1110 and 1120. More specifically, in this example embodiment, the operator controls: (1) the first winch 1110 to actively payout the first flexible member 1110a; and (2) the second winch 1120 to maintain sufficient tension in the second flexible member 1120a to retain the aircraft-launch apparatus 10 at or near the pulley 1114. As the first winch 1110 pays out the first flexible member 1110a, it causes the second winch 1120 to backdrive and payout the second flexible member 1120a (since they're connected via the first flexible capture member attachment device 1112) while retaining the aircraft-launch apparatus 10 at or near the pulley 1114 (since the second winch 1120 maintains sufficient tension in the second flexible member 1120a and the wheel of the pulley 1114 resists lowering of the aircraft-launch apparatus 10). In other embodiments, the operator simultaneously controls the first and second winches to actively payout the first and second flexible members, respectively, rather than relying on the first winch causing the second winch to backdrive to payout the second flexible member.

As the first and second flexible members 1110a and 1120b are paid out from the respective first and second winches 1110 and 1120, the parasail P ascends via the wind and the continued motion of the ship S and lifts the aircraft-launch apparatus 10 and the attached fixed-wing aircraft 30 off of the deck of the ship S. Once the aircraft-launch apparatus 10 and the attached fixed-wing aircraft 30 are airborne, as the ship S travels into the wind, the rear landing gear of the aircraft-launch apparatus 10 act as vertical stabilizers (or fins) that ensure that the front of the aircraft-launch apparatus 10 and the nose of the attached fixed-wing aircraft 30 point generally into the wind.

The operator controls the first and second winches 1110 and 1120 to stop paying out the first and second flexible members 1110a and 1120a, respectively, once about 700 feet (or any other suitable amount) of the first flexible member 1110a extend between the first winch 1110 and the parasail P. More specifically, in this example embodiment, the operator controls the first winch 1110 to stop actively paying out the first flexible member 1110a once about 700 feet of the first flexible member 1110a extend between the first winch and the parasail P. This stops the first flexible member 1110a from causing the second winch 1120 to backdrive to pay out the second flexible member 1120a.

Figure 1C:
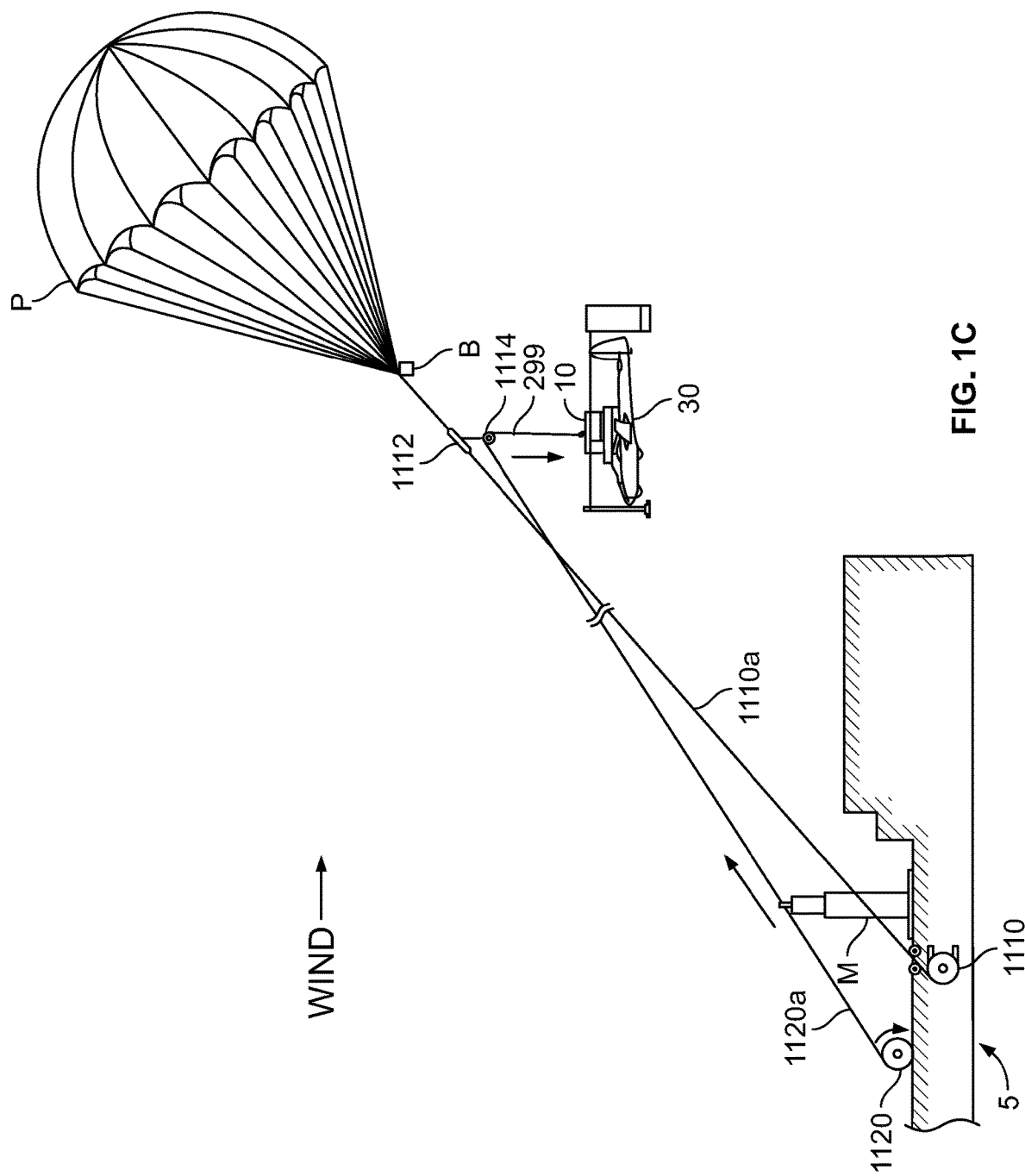

As shown in FIG. 1C, at this point the operator controls the second winch 1120 to payout the second flexible member 1120a such that gravity pulls the aircraft-launch apparatus 10 and attached fixed-wing aircraft 30 downward relative to the first flexible member 1110a, the first flexible member attachment device 1112, and the pulley 1114. While the pulley 1114 resists descent of the aircraft-launch apparatus 10 relative to the pulley 1114 (e.g., where pulley 1114 is a one-way pulley), the aircraft-launch apparatus 10 is heavy enough such that gravity overcomes this resistive force. The operator controls the second winch 1120 to stop paying out the second flexible member 1120a once about 100 feet (or any suitable amount) of the second flexible member extends between the pulley 1114 and the aircraft-launch apparatus 10. This provides a buffer area between the fixed-wing aircraft 30 and the first flexible member 1110a that reduces the likelihood of the fixed-wing aircraft 30 contacting the first flexible member 1110a after release.

If the aircraft is not heavy enough to overcome sliding friction of the pulley 1114 where pulley 1114 is a one-way pulley, a two way pulley may be used in its place.

Figure 1D:
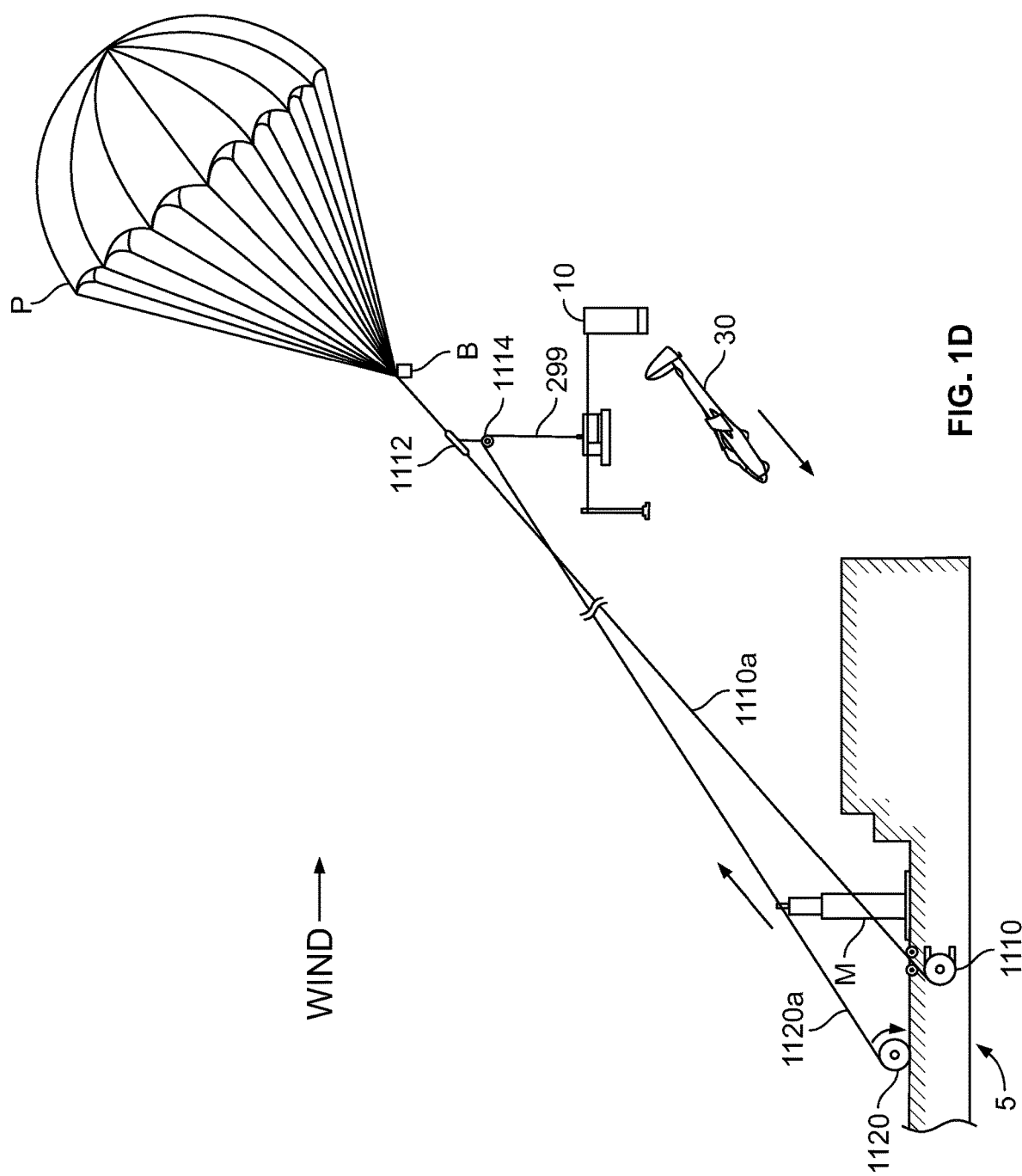

The operator then controls the aircraft-launch apparatus 10 to release the fixed-wing aircraft 30 from the saddle 300, as shown in FIG. 1D. Releasing the fixed-wing aircraft 30 from the saddle 300 is a two-step process. To release the fixed-wing aircraft 30 from the saddle 300 (and the aircraft-launch apparatus 10), the operator first remotely controls the lock servo motor 6345 (via the R/C controller) to rotate the lock arm 6346 into the front engager rotation-enabling rotational position. Second, the operator remotely controls the front engager servo motor 6341 (via the R/C controller) to rotate the front engager 6320 from the attached rotational position to the release rotational position. As the front engager servo motor 6341 rotates the front engager 6320 from the attached rotational position to the release rotational position, the first and second leading edge engaging surfaces 6323b and 6326b of the front engager 6320 rotate away from and begin to lose contact with the leading edge of the wing of the fixed-wing aircraft 30. As the front engager 6320 continues to rotate clear of the wings of the fixed-wing aircraft 30, the pivotable portions 6364 of the rear engagers 6360 enable the fixed-wing aircraft 30 to freely pivot relative to the saddle base bracket 6310, the first and second saddle side brackets 6312 and 6314, and the bodies 6362 of the rear engagers 6360 as gravity pulls the nose of the fixed-wing aircraft 30 downward. As this occurs, the trailing edge engaging surfaces 6362a of the bodies 6362 of the rear engagers 6360 gradually enter the trailing-edge receiving channels of the pivotable portions 6364. As this occurs, the trailing-edge engaging surfaces 6362a contact the trailing edge of the wings and force them out of the trailing edge receiving channels, thus releasing the fixed-wing aircraft 30 from the saddle 300 (and the aircraft-launch apparatus) into free, wing-borne flight.

After the fixed-wing aircraft 30 is released into free, wing-borne flight, the operator controls the second winch 1120 to retract the second flexible member 1120a such that the aircraft-launch apparatus 10 (and attached fixed-wing aircraft 30) ascends back toward the first flexible member 1110a, the first flexible member attachment device 1112, and the one-way pulley 1114. The operator controls the second winch 1120 such that the second flexible member 1120a stops retracting once the aircraft-launch apparatus 10 reaches the pulley 1114, yet maintains enough tension in the second flexible member 1120a to retain the aircraft-launch apparatus 10 at or near the pulley 1114.

The operator then controls the first and second winches 1110 and 1120 to respectively retract the first and second flexible members 1110a and 1120a until the aircraft-launch apparatus 10 reaches the deck of the ship S, at which point the operator controls the winches to stop retracting. At this point, deck hands secure the aircraft-launch apparatus 10 and detach the first flexible member attachment device 1112 from the first flexible member 1110a, which disconnects the first flexible member 1110a from the second flexible member 1120a. The deck hands disassemble and stow the aircraft-launch apparatus 10. The operator controls the first winch 1110 to retract the remainder of the first flexible member 1110a such that the deck hands can collapse and stow the parasail P and the ballast B.

In certain embodiments, the launch system includes a compliant structure, such as a trampoline, to aid in the launch process. In these embodiments, the compliant structure is erected over part of the deck of the ship (or other moving object), and the fixed-wing aircraft 30 is positioned on the compliant structure before (or after) the aircraft-launch apparatus 10 is attached to the fixed-wing aircraft 30. The compliant structure acts as a damper that dampens forces that would otherwise be exerted on the aircraft-launch apparatus 10 and the fixed-wing aircraft 30 to be damaged as the ship S moves (especially in rough seas), which reduces the potential for damage to these apparatuses.

In other embodiments in which the saddle is that described in U.S. Patent Application Publication No. 2017/0158318, the fixed-wing aircraft launch method incorporates the procedure for releasing the fixed-wing aircraft from the saddle described in U.S. Patent Application Publication No. 2017/0158318.

Figure 3Y:
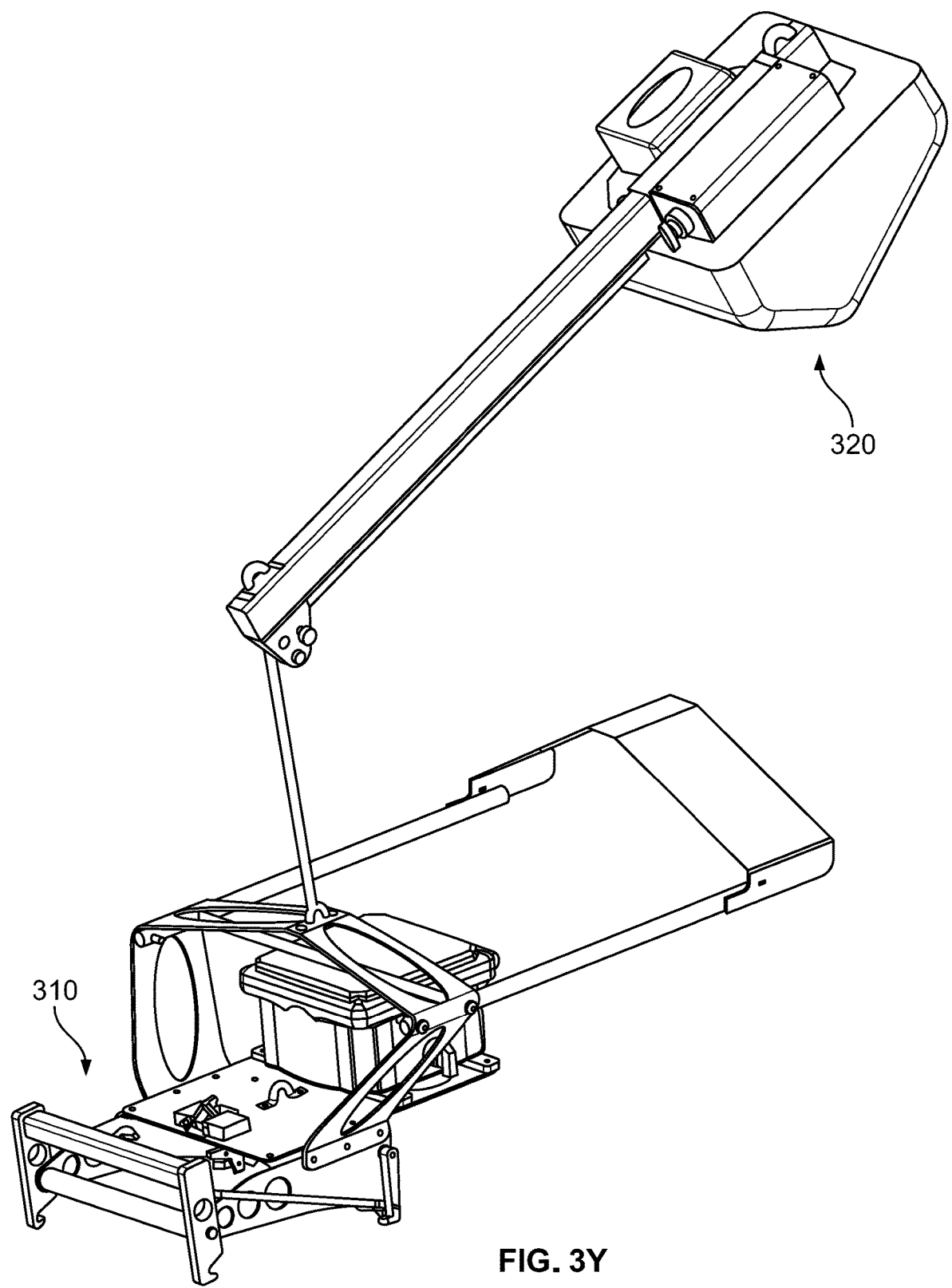
FIG. 3Y is a perspective view of an example aircraft-launch apparatus and hoisting device.
Figure 3Z:
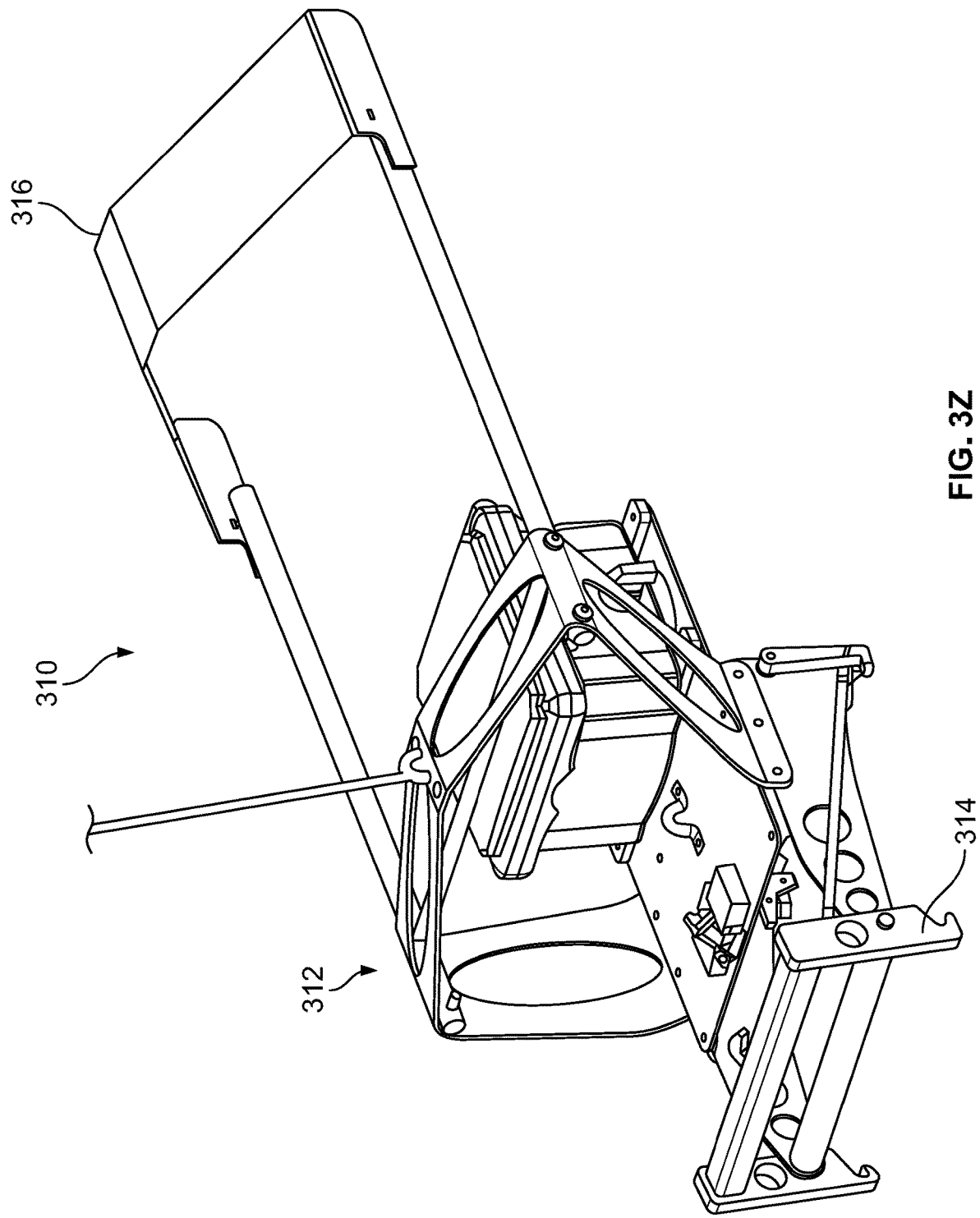
FIG. 3Z is an enlarged perspective view of the aircraft-launch apparatus of FIG. 3Y.
Figure 3A:
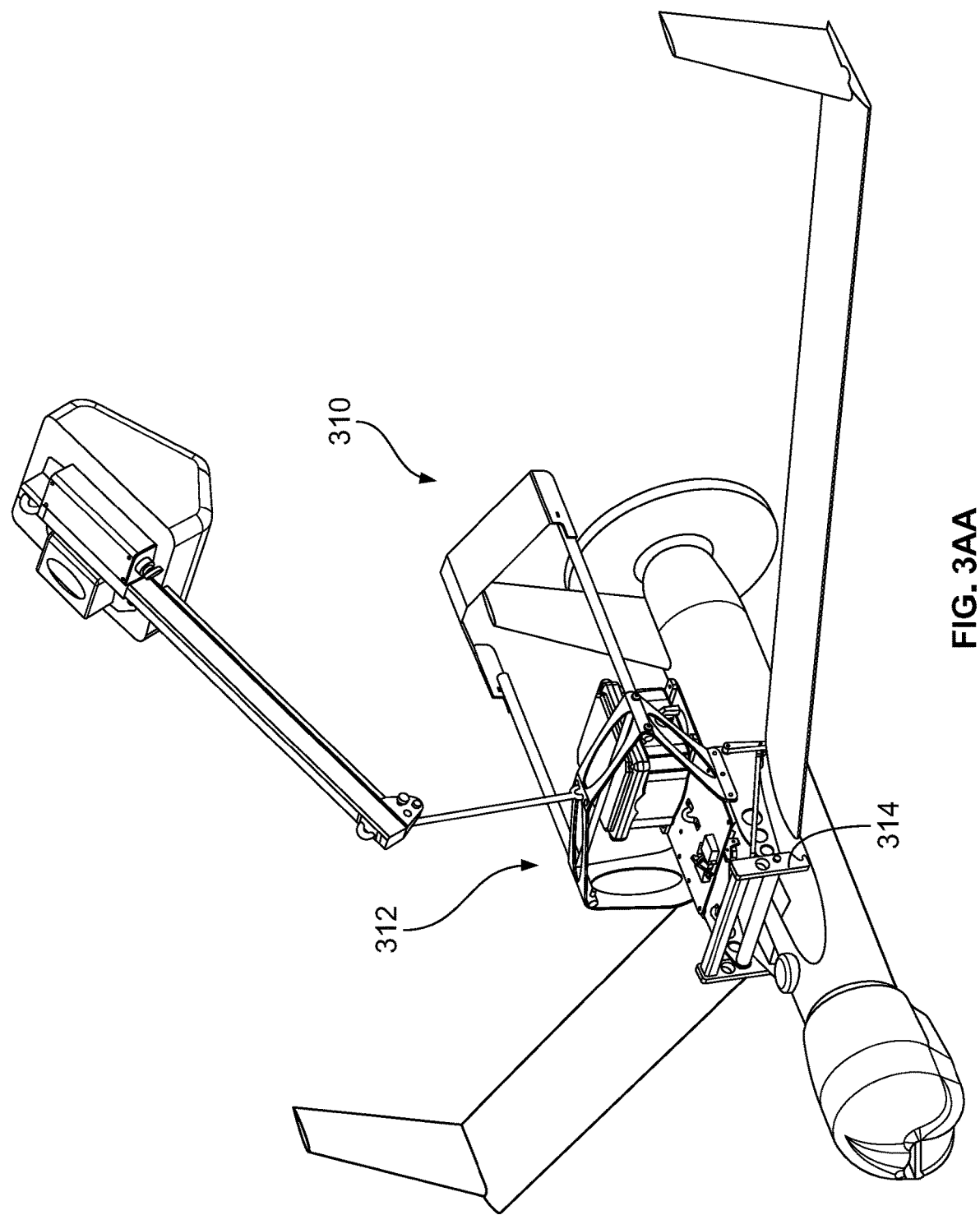
Figure 3C:
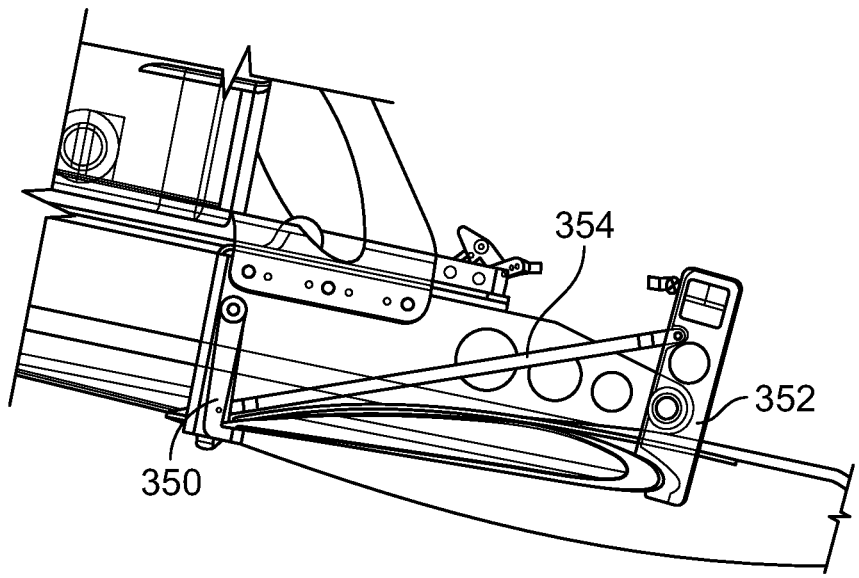
Figure 3D:
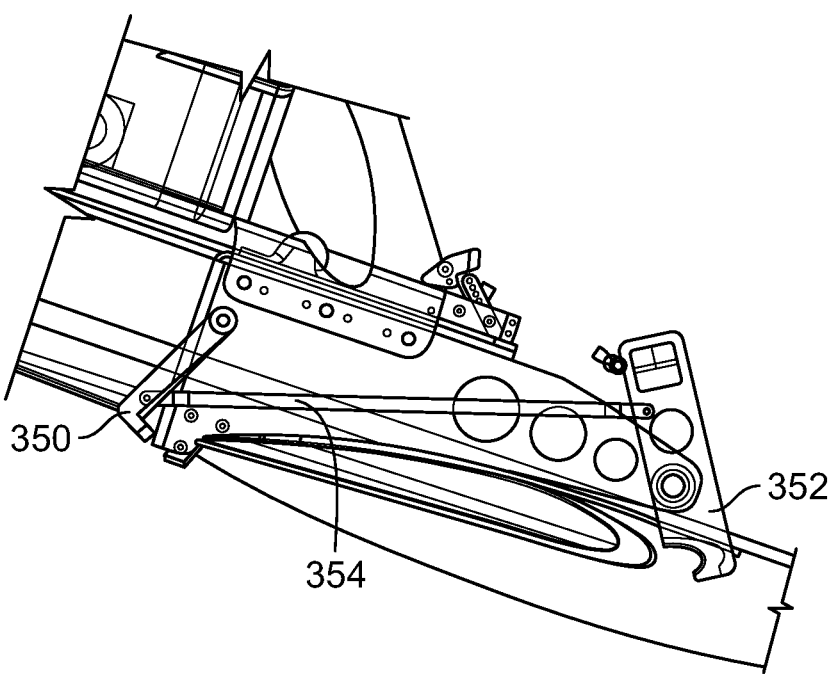

FIGS. 3Y and 3Z show an example aircraft launch apparatus 310 and a hoist 320. Aircraft launch apparatus 310 may be similar or identical to aircraft launch apparatus 10 described above. Aircraft launch apparatus 310 is described in more detail below with respect to FIG. 3Z.

FIG. 3Y shows the aircraft launch apparatus 310 and a hoist 320. The hoist 320 may be similar or identical in some respects to the hoist described with respect to FIGS. 6A-G and 7A-B below. In particular, the hoist 320 may include a winch or other mechanism configured to extend and/or retract a flexible member attached to the aircraft launch apparatus 310. The flexible member may include a suitable rope or other similar flexible element.

The hoist 320 also includes a suitable device configured to removably attach to a first flexible member attached to a parasail to raise the hoist into the air. This is described in further detail with respect to FIGS. 6A-G and 7A-B.

FIG. 3Z illustrates an enlarged view of the aircraft launch apparatus 310. Launch apparatus 310 may include a hub base 312 and a saddle 314. The hub base 312 may be similar or identical to the hub base 200 described herein. Further, the saddle 314 may be similar or identical to the saddle 300 described elsewhere within this disclosure. In particular, a release mechanism of the saddle 314 may be similar or identical to a release mechanism of the saddle 300 described elsewhere.

The launch apparatus 310 may also include one or more trailing members 316. These may be referred to as tail feathers, and may serve to maintain an orientation or direction of the launch apparatus 310. The trailing members 316 may operate in a manner similar to the rear landing gear modules 600c and 600d described herein, specifically by maintaining the direction/orientation of the launch apparatus. Notably, however, the launch apparatus 310 may not include landing gear or other members configured to extend below an attached aircraft in order to touch down or land on a ship (such as landing gear modules 600a-d described with respect to FIG. 3C).

FIG. 3AA illustrates the launch apparatus 310 having an aircraft attached to the saddle 314.

FIG. 3BB illustrates an example embodiment wherein a launch cradle 340 is in an operating position and a stowed position. The launch cradle 340 may be configured to carry or hold an aircraft, removing the need for landing gear or other members to hold the aircraft prior to and after it is released and/or captured. The launch cradle 340 may be configured to rotate between the operating position generally horizontal to the deck of the ship, and the stowed position wherein the cradle 340 is vertical to the deck of the ship. This can allow for a reduced footprint on the ship.

FIG. 3BB also illustrates an example position of the storage device 330 of FIG. 3Y on the ship. The storage device 330 of FIG. 3BB may be configured to store the aircraft launch apparatus 310, the hoist 320, and/or one or more other components or devices described herein such as flexible members, aircraft components, hoists, winches, etc. The storage device 330 may be configured to fit onto a ship, such as those described herein.

1.2 Parasail-Assisted Fixed-Wing Aircraft Retrieval System and Method

FIGS. 2A-2D are diagrammatic views showing one example parasail-assisted fixed-wing aircraft retrieval system and method of the present disclosure. In this example embodiment, the aircraft retrieval system includes the parasail P, the ballast B, the first winch 1110, the first flexible member 1110a, the first flexible member attachment device 1112, the one-way pulley 1114, the second winch 1120, the second flexible member 1120a, a drag-producing device 1130, a retrieval flexible member 1140, and a GPS receiver 1150.

The parasail P, the ballast B, the first winch 1110, the first flexible member 1110a, the first flexible member attachment device 1112, the one-way pulley 1114, the second winch 1120, and the second flexible member 1120a are described above.

The retrieval flexible member 1140 is a suitable rope or other similar flexible element.

The drag-producing device 1130 is a suitable device configured to produce drag when being pulled through the air. In this example embodiment, the drag-producing device includes a parachute.

The global positioning system (GPS) receiver 1150 is communicatively connectable with (such as via a suitable wireless protocol) GPS satellites (not shown), as is known in the art. The GPS receiver 1150 is configured to receive signals from one or more of the GPS satellites, to determine the multicopter's location using those signals, and to transmit signals representing the multicopter's location to a suitable external device. In this example embodiment, the GPS receiver 1150 is removably connectable to the retrieval flexible member 1140 in any suitable manner, and is used to communicate the position of the retrieval flexible member to the control system of the fixed-wing aircraft 30 to enable retrieval (as described in detail below).

To prepare for retrieval, the operator controls the first winch 1110 to retract most of the first flexible member 1110a and controls the second winch to retract most of the second flexible member 1120a. The operator attaches the free end of the first flexible member 1110a to the left and right bridle sets of the parasail P. This attaches the parasail P to the first winch 1110. The operator also attaches the ballast B to the left and right bridle sets of the parasail P such that the mass of the ballast B is generally evenly distributed between the left and right bridle sets of the parasail P.

In certain situations, the ship may already be equipped with the first winch, the first flexible member, the first parasail, and/or the ballast. In these situations, the operator need not take the above-described steps, and instead leverages the equipment already on the moving object (along with the additional components described above) to retrieve the fixed-wing aircraft from free, wing-borne flight.

The operator controls the ship S to head into the wind and maintain this course throughout the retrieval process. The operator opens the parasail P and controls the first winch 1110 to payout the first flexible member 1110a until the parasail P reaches a stable flying height, as shown in FIG. 2A. At this point in this example embodiment, about 50-100 feet of the first flexible member 1110a extend between the first winch 1110 and the parasail P. The operator then fixedly attaches the first flexible member attachment device 1112 (and its attached pulley 1114) to the first flexible member 1110 the first distance from the parasail P. In this example embodiment, the first distance is about 50-100 feet, though it may be any suitable distance in other embodiments. After attachment, the first flexible member attachment device 1112 is movable along the first flexible member 1110 toward the parasail P but not in the opposite direction.

The operator wraps the second flexible member 1020a around the wheel of the pulley 1114 and attaches it to a free end of the retrieval flexible member 1140, as shown in FIG. 2A. This attaches the first flexible member 1110a to the second flexible member 1120a and the retrieval flexible member 1140. The remainder of the retrieval flexible member 1140 is stored in a container C on the deck at this point. The operator attaches the drag-producing device 1130 to the second flexible member 1120a near its attachment point to the retrieval flexible member 2110c. The operator attaches the GPS receiver 1150 to the second flexible member 1120a between the pulley 1114 and the drag-producing device 1130. The operator controls the second winch 1120 to retract the second flexible member 1120a and remove any slack in the second flexible member 1120a, which draws the pulley 1114 and the GPS receiver 1150 toward one another. Once the slack is removed and the GPS receiver 1150 is at or near the pulley 1114, the operator controls the second winch 1120 to maintain enough tension in the second flexible member 1120a to retain the GPS receiver 1150 at or near the pulley 1114.

The operator controls the first and second winches such that the first and second flexible members 1110a and 1120a are respectively paid out from the first and second winches 1110 and 1120. More specifically, in this example embodiment, the operator controls: (1) the first winch 1110 to actively payout the first flexible member 1110a; and (2) the second winch 1120 to maintain sufficient tension in the second flexible member 1120a to retain the GPS receiver 1150 at or near the pulley 1114. As the first winch 1110 pays out the first flexible member 1110a, it causes the second winch 1120 to backdrive and payout the second flexible member 1120a (since they're connected via the first flexible capture member attachment device 1112) while retaining the GPS receiver 1150 at or near the pulley 1114 (since the second winch 1120 maintains sufficient tension in the second flexible member 1120a and the retrieval flexible member 1140), as shown in FIG. 2B. In other embodiments, the operator simultaneously controls the first and second winches to payout the first and second flexible members, respectively, rather than relying on the first winch causing the second winch to backdrive to payout the second flexible member.

As the first and second flexible members 1110a and 1120a are paid out from the respective first and second winches 1110 and 1120, the parasail P ascends via the wind and the continued motion of the ship S. This causes the retrieval flexible member 1140 to be paid out of the container C.

The operator controls the first and second winches 1110 and 1120 to stop paying out the first and second flexible members 1110a and 1120a, respectively, once about 250 feet of the first flexible member extend between the first winch 1110 and the parasail P. More specifically, in this example embodiment, the operator controls the first winch 1110 to stop actively paying out the first flexible member 1110a once about 250 feet (or any other suitable amount) of the first flexible member 1110a extends between the first winch 1110 and the parasail P. This stops the first flexible member 1110a from causing the second winch 1120 to backdrive to pay out the second flexible member 1120a.

Figure 2C:
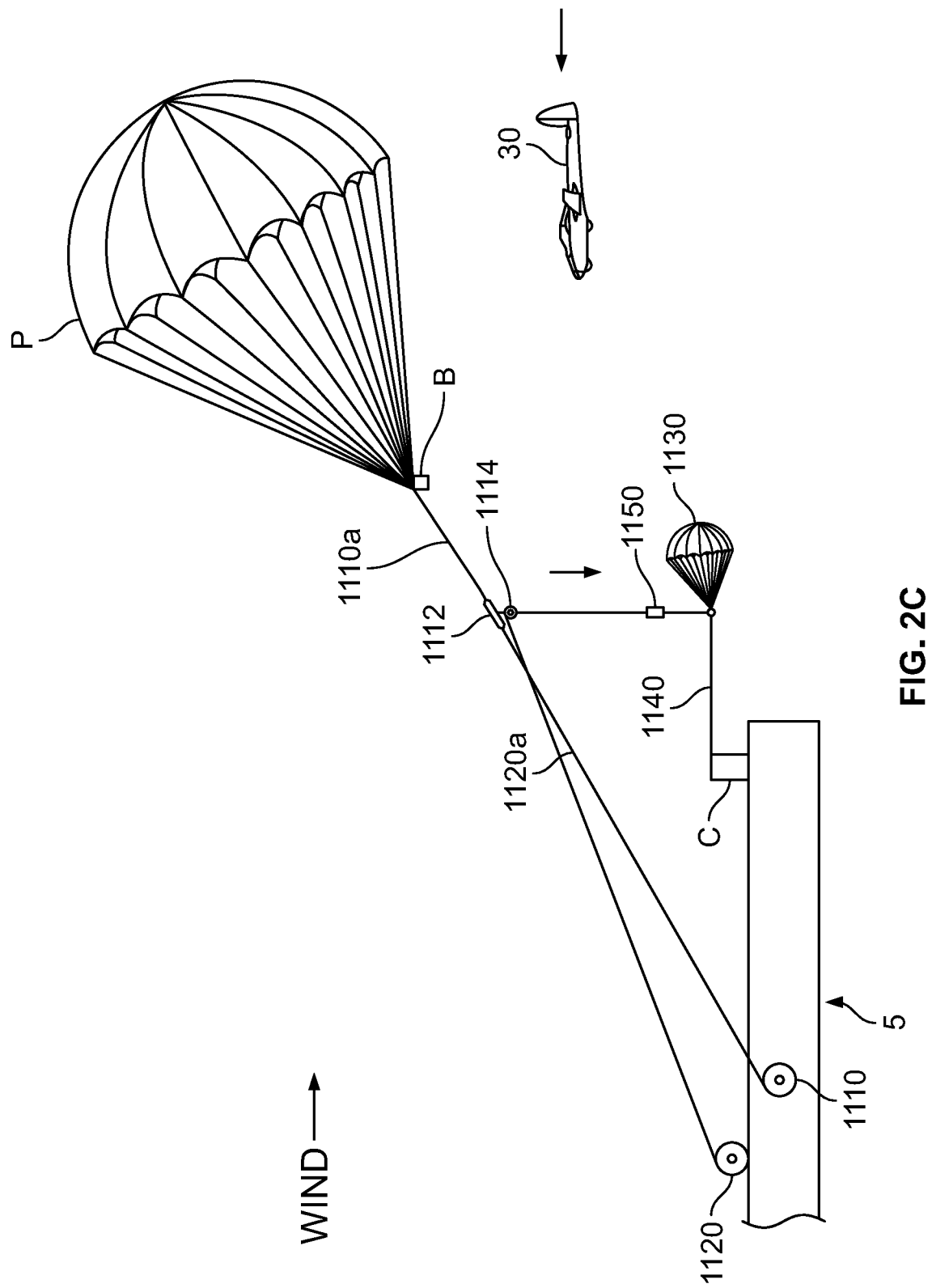

At this point the operator controls the second winch 1120 to payout the second flexible member 1120a to enable gravity to pull the drag-producing device 1130 and the GPS receiver 1150 downward relative to the first flexible member 1110a, the first flexible member attachment device 1112, and the pulley 1114, as shown in FIG. 2C. As this occurs, the drag-producing device 1130 begins producing drag via its interaction with the air. Specifically, the drag-producing device 1130 operates to straighten and tension the portion of the second flexible member 1120a extending between the pulley 1114 and the drag-producing device 1130.

The operator controls the second winch 1120 to stop paying out the second flexible member 1120a once about 100 feet of the second flexible member 1120a extend between the pulley 1114 and the drag-producing device 1130.

Figure 2D:
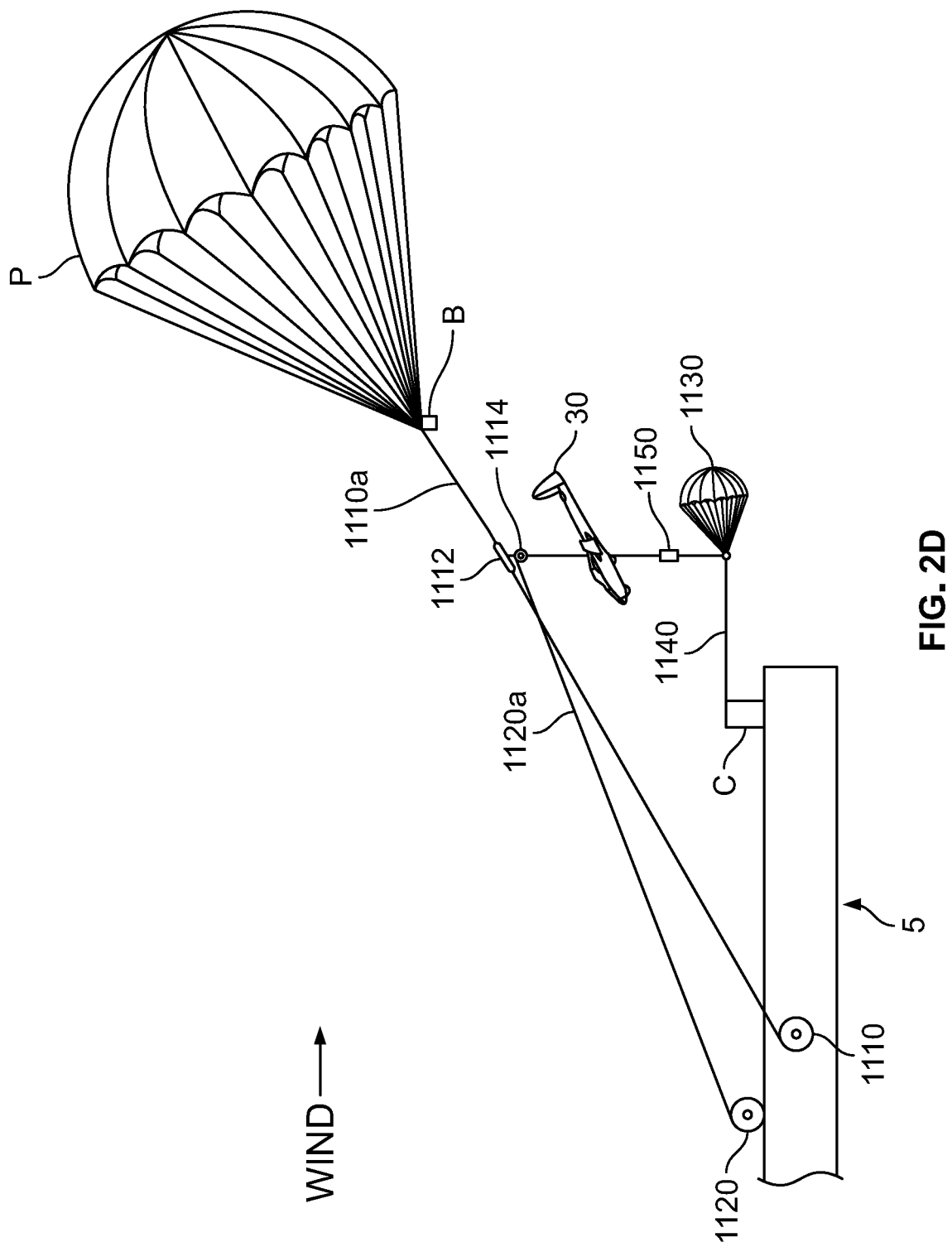

As shown in FIG. 2D, using the GPS coordinates received from the GPS receiver 1150, the operator controls the fixed-wing aircraft 30 to contact and capture a portion of the second flexible member 1120a in a manner similar to that described in U.S. Pat. No. 6,264,140, the entire contents of which are incorporated herein by reference. After capture, the operator controls the second winch 1120 to retract the second flexible member 1120a such that the fixed-wing aircraft 30, the drag-producing device 1130, and the GPS receiver 1150 ascend toward the first flexible member 1110a, the first flexible member attachment device 1112, and the pulley 1114. The operator controls the second winch 1120 such that the second flexible member 1120a stops retracting once the GPS receiver 1150 reaches the pulley 1114, yet maintains enough tension in the second flexible member 1120a to retain the GPS receiver 1150 at the pulley 1114.

The operator then controls the first and second winches 1110 and 1120 to respectively retract the first and second flexible members 1110a and 1120a until the fixed-wing aircraft 30 reaches the deck of the ship S, at which point the operator controls the winches to stop retracting. At this point, deck hands secure the fixed-wing aircraft 30 and detach the first flexible member attachment device 1112 from the first flexible member 1110a, which disconnects the first flexible member 1110a from the second flexible member 1120a and the retrieval flexible member 1130. The deck hands stow the fixed-wing aircraft 30. The operator controls the first winch 1110 to retract the remainder of the first flexible member 1110a such that the deck hands can collapse and stow the parasail P and the ballast B.

2. One-Winch Embodiment 2.1 Parasail-Assisted Fixed-Wing Aircraft Launch System and Method FIGS. 4A-4E are diagrammatic views showing another example parasail-assisted fixed-wing aircraft launch system and method of the present disclosure. In this example embodiment, the aircraft launch system includes the parasail P, the ballast B, the aircraft-launch apparatus 10, the first winch 1110, the first flexible member 1110a, a second flexible member 2110b, the first flexible member attachment device 1112, the pulley 1114, a flexible member guide 2116, a second flexible member attachment device 2118, and a feed-control device 2120.

The parasail P, the ballast B, the aircraft-launch apparatus 10, the first winch 1110, the first flexible member 1110a, the first flexible member attachment device 1112, and the pulley 1114 are described above.

The second flexible member 2110b is a suitable rope or other similar flexible element.

The second flexible member attachment device 2118 is a suitable device configured to removably attach to the first flexible member 1110a. In this example embodiment, the second flexible member attachment device 2118 includes an ascender that, once attached to the first flexible member 1110a, can move along the first flexible member in one direction but not the other. This enables the operator to easily reposition the second flexible member attachment device 2118 (in one direction) along the first flexible member 1110a without removing the second flexible member attachment device 2118 from the first flexible member 1110a. In other embodiments, the second flexible member attachment device is not configured to move along the second flexible member once attached to the first flexible member. A rope grab is one example of such a device.

The feed-control device 2120, which is attached to the second flexible member attachment device 2118, is a suitable device configured to receive a flexible member and to enable an operator to regulate whether and at what rate the flexible member can pass therethrough. A belay is one example of a feed-control device.

The flexible member guide 2116 is attachable to the first flexible member 1110a in any suitable manner and includes a guiding element—such as a closed loop—sized and shaped such that the second flexible member 2110b can pass therethrough. Other embodiments of the aircraft launch system do not include the flexible member guide.

One or more operators may use the components of the aircraft launch system to launch the fixed-wing aircraft 30 into free, wing-borne flight. A single operator is referred to below for brevity and clarity.

To prepare for launch, the operator attaches the first winch 1110 to a suitable area of the ship S in a suitable manner. In this example embodiment, the first winch 1110 is attached below the deck of the ship S. The operator attaches one end of the first flexible member 1110a to the drum of the first winch 1110 and controls the first winch 1110 to retract most of the first flexible member 1110a. The operator attaches the free end of the first flexible member 1110a to the left and right bridle sets of the parasail P. This attaches the parasail P to the first winch 1110. The operator also attaches the ballast B to the left and right bridle sets of the parasail P such that the mass of the ballast B is generally evenly distributed between the left and right bridle sets of the parasail P.

In certain situations, the ship S may already be equipped with the first winch, the first flexible member, the parasail, and/or the ballast. In these situations, the operator need not take the above-described steps, and instead leverages the equipment already on the moving object (along with the additional components described above) to launch the fixed-wing aircraft into free, wing-borne flight.

The operator positions the fixed-wing aircraft 30 on the deck, such as on a launch-assist structure (not shown) that can be removably attached to the deck and that retains the fixed-wing aircraft 30 in a desired launch orientation. The operator attaches the hub module 100 of the aircraft-launch apparatus 10 to the fixed-wing aircraft 30 by: (1) operating the front engager servo motor 6341 (either manually or remotely via the R/C controller) to rotate the front engager 6320 to the release rotational position; (2) inserting the trailing edges of the wings of the fixed-wing aircraft 30 into the trailing edge receiving channels 6364a of the pivotable portions 6364 of the rear engagers 6360; (3) positioning the saddle 300 relative to the fixed-wing aircraft 30 such that the leading edge engaging surfaces 6323b and 6326b of the front engager 6320 are adjacent the leading edges of the wings of the fixed-wing aircraft 30; (4) operating the front engager servo motor 6341 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 30; and (5) operating the lock servo motor 6345 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

At this point the fixed-wing aircraft 30 is attached to the saddle 300 because the front engager 6320 and the rear engagers 6360 engage the wings of the fixed-wing aircraft 30 therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6341 cannot rotate the front engager 6320 from the attached rotational position to the release rotational position. This prevents undesired release of the fixed-wing aircraft 30 from the saddle 300 (and the aircraft-launch apparatus 10).

After the hub module 100 is attached to the fixed-wing aircraft 30, the operator attaches the front and rear landing gear modules 600a to 600d to their respective arm modules 400a to 400d and attaches and locks the arm modules 400a to 400d to the hub module 100 to complete assembly of the aircraft-launch apparatus 10.

The operator starts up the engine of the fixed-wing aircraft 30 and controls the ship S to head into the wind and maintain this course throughout the launch process. The operator opens the parasail P and controls the first winch 1110 to payout the first flexible member 1110a until the parasail P reaches a stable flying height, as shown in FIG. 4A. At this point in this example embodiment, about 50-100 feet of the first flexible member 1110a extend between the first winch 1110 and the parasail P.

Figure 4B:
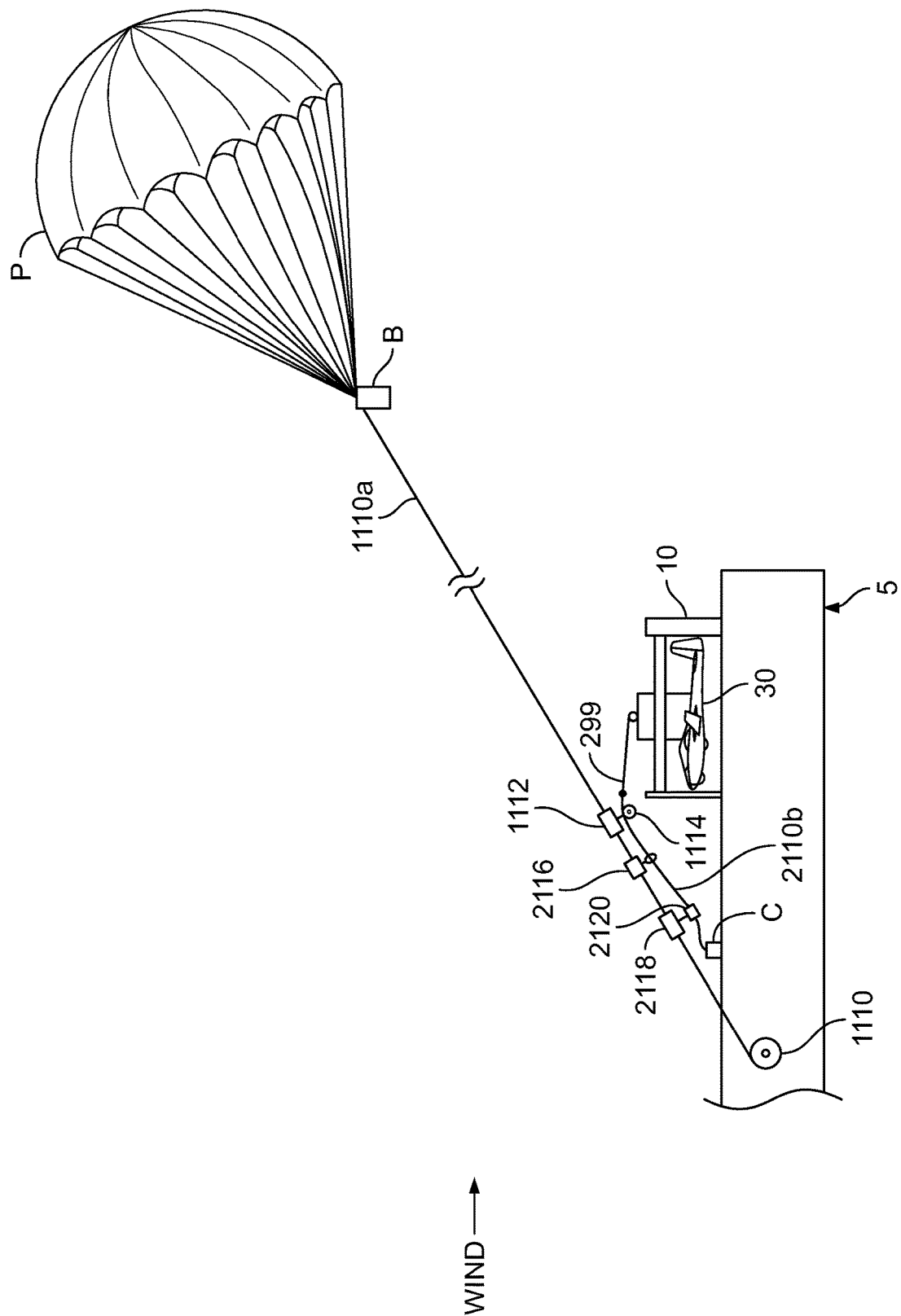

As shown in FIG. 4B, the operator attaches the first flexible member attachment device 1112 (and its attached pulley 1114) to the first flexible member 1110a a first distance from the parasail P. In this example embodiment, the first distance is about 50-100 feet, though it may be any suitable distance in other embodiments. The operator also attaches the second flexible member attachment device 2118 (and its attached feed-control device 2020) to the first flexible member 1110a between the first winch 1110 and the first flexible member attachment device 1112. The operator also attaches the flexible member guide 2116 to the first flexible member 1110a between the first and second flexible member attachment devices 1112 and 2118, respectively.

After attachment: (1) the first flexible member attachment device 1112 is movable along the first flexible member 1110a toward the parasail P but not in the opposite direction; (2) the second flexible member attachment device 2118 is movable along the first flexible member 1110a away from the parasail P but not in the opposite direction; and (3) the flexible member guide 2116 is not movable along the first flexible member 1110a.

The operator feeds one end of the second flexible member 2110b through the feed-control device 2120 and through the flexible member guide 2116, wraps the second flexible member 2110b around the wheel of the pulley 1114, and attaches the second flexible member 2110b to the snag-prevention member 299 of the aircraft-launch apparatus 10, as shown in FIG. 4B. This attaches the aircraft-launch apparatus 10 to the second winch 1120 and the first flexible member 1110a to the second flexible member 2110b. At this point, the remainder of the second flexible member 2110b is stored in a container C on the deck.

While holding the feed-control device 2120, the operator controls the first winch 1110 to actively payout the first flexible member 1110a. As that occurs: (1) the paid out first flexible member 1110a travels through the second flexible member attachment device 2118 (which is held stationary relative to the ship S due to the operator holding the feed-control device 2120), which enables the parasail P to ascend via the wind and the continued motion of the ship S; and (2) the operator simultaneously controls the feed-control device 2120 to enable the second flexible member 2110b to payout from the container C. While doing so, the operator controls the feed-control device 2120 to maintain enough tension in the second flexible member 2110b to overcome the force of gravity and maintain the snag-prevention device 299 at or near the pulley 1114. As the parasail P ascends, it lifts the aircraft-launch apparatus 10 and the attached fixed-wing aircraft 30 off of the deck of the ship S (via the first flexible member attachment device 1112 and the pulley 1114). Once the aircraft-launch apparatus 10 and the attached fixed-wing aircraft 30 are airborne, as the ship S travels into the wind, the rear landing gear of the aircraft-launch apparatus 10 act as vertical stabilizers (or fins) that ensure that the front of the aircraft-launch apparatus 10 and the nose of the attached fixed-wing aircraft 30 point generally into the wind.

Figure 4C:
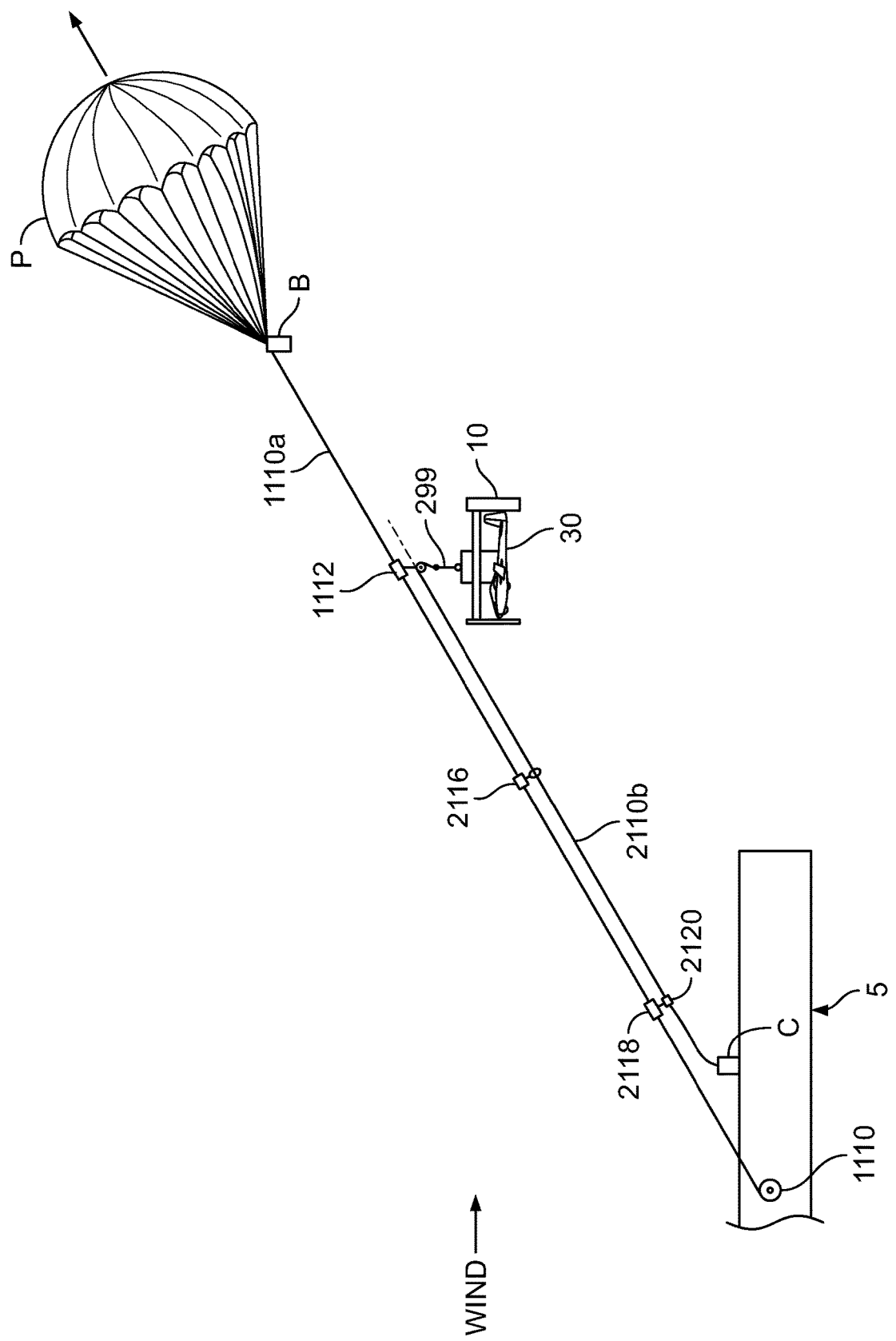
Figure 4D:
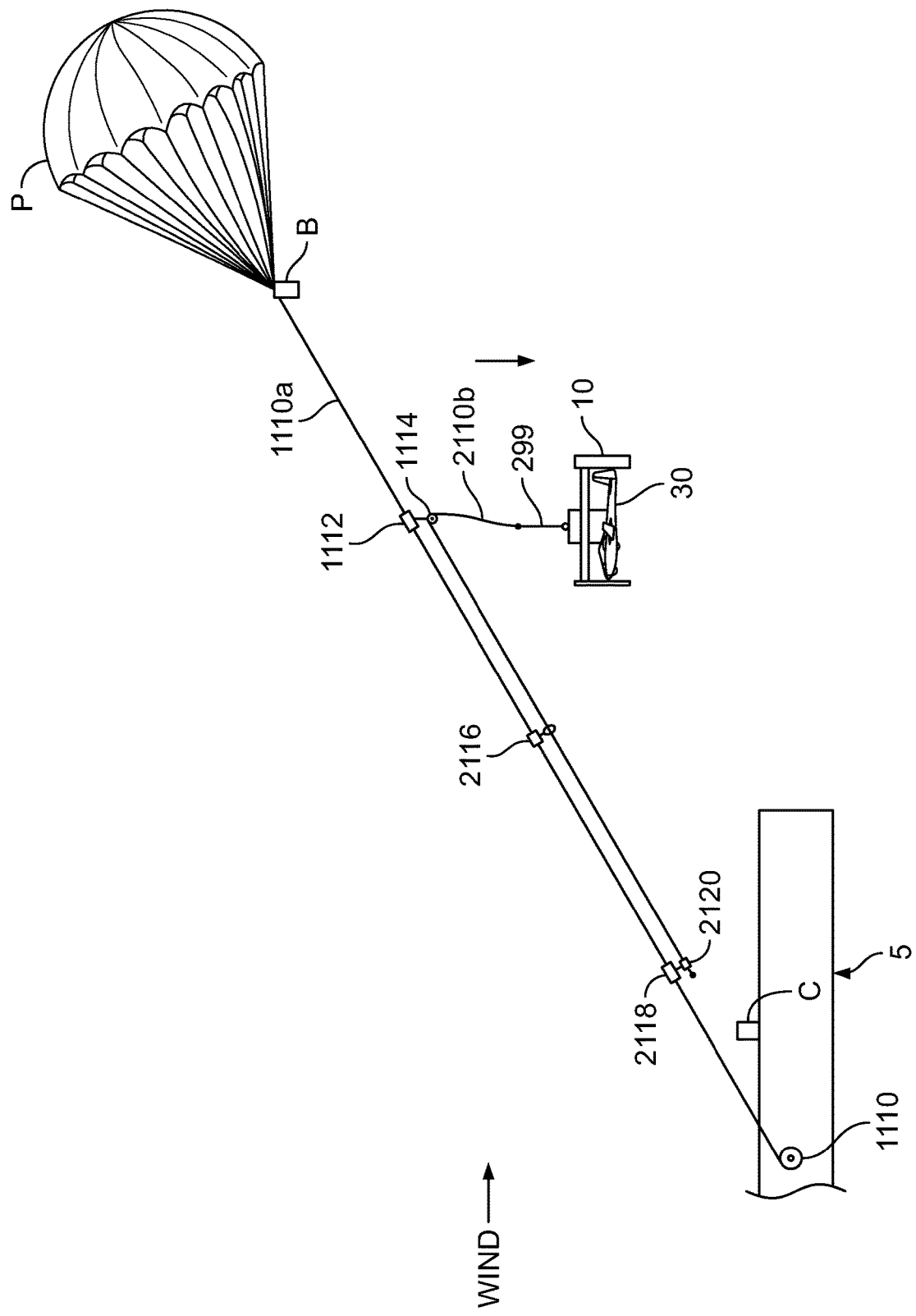

The operator controls the first winch 1110 to stop actively paying out the first flexible member 1110a and controls the feed-control device 2120 to stop enabling the second flexible member 2110b to pay out of the container C once about 230 feet (or any other suitable amount) of the first flexible member 1110a extend between the first flexible member attachment device 1112 and the second flexible member attachment device 2118, as shown in FIG. 4C. The operator controls the feed-control device 2120 to enable gravity to pull the aircraft-launch apparatus 10 and the attached fixed-wing aircraft 30 downward relative to the first flexible member 1110a, the first flexible member attachment device 1112, and the pulley 1114, as shown in FIG. 4D. While the pulley 1114 resists descent of the aircraft-launch apparatus 10 relative to the pulley 1114, the aircraft-launch apparatus 10 is heavy enough such that gravity overcomes this resistive force. Once a stop device at the free end of the second flexible member 2110b engages the feed-control device 2120, the aircraft-launch apparatus 10 has descended as far as it can relative to the pulley 1114 (since the stop device cannot fit through the feed-control device 2120).

Figure 4E:
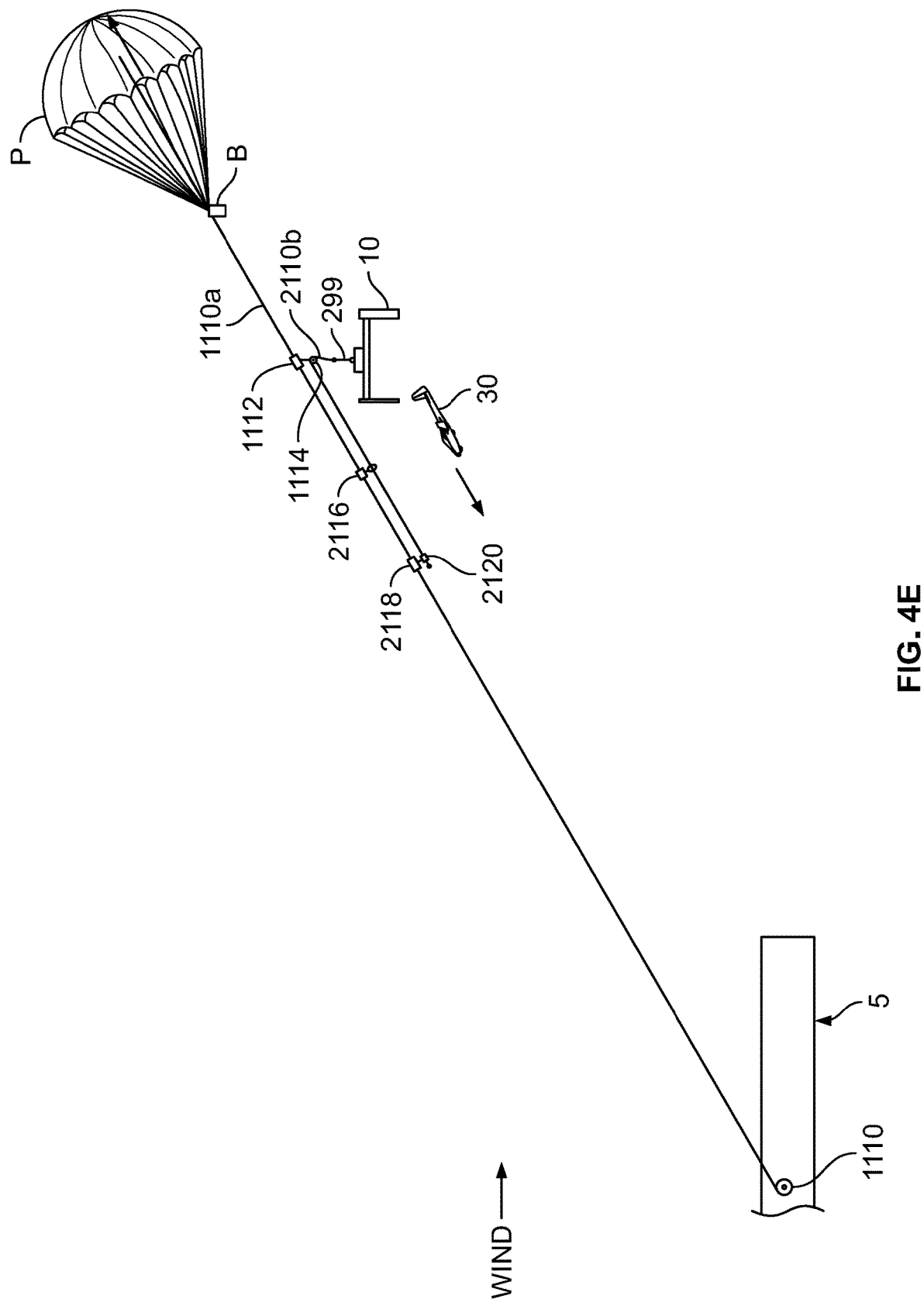

The operator controls the first winch 1110 to payout the first flexible member 1110a until about 700 feet of the first flexible member 1110a extend between the winch 1110 and the parasail P. The operator controls the aircraft-launch apparatus 10 to release the fixed-wing aircraft 30 from the saddle 300, as shown in FIG. 4E and as explained above.

After the fixed-wing aircraft 30 is released into free, wing-borne flight, the operator controls the first winch 1110 to retract the first flexible member 1110a until the second flexible member attachment device 2118 reaches the operator. The operator grasps the second flexible member 2110b and removes the second flexible member attachment device 2118 from the first flexible member 1110a. While holding the second flexible member 2110b, the operator controls the first winch 1110 to payout the first flexible member 1110a such that the parasail P ascends. Once the snag-prevention member 299 reaches the one-way pulley, the operator controls the first winch 1110 to retract the first flexible member 1110a. As this occurs, the operator maintains sufficient tension in the second flexible member 2110b to maintain the snag-prevention device 299 at or near the pulley 1114.

Once the aircraft-launch apparatus 10 reaches the deck of the ship S, the operator controls the first winch 1110 to stop retracting. At this point, deck hands secure the aircraft-launch apparatus 10 and detach the first flexible member attachment device 1112 from the first flexible member 1110a, which disconnects the first flexible member 1110a from the second flexible member 1120a. The deck hands disassemble and stow the aircraft-launch apparatus 10. The operator controls the first winch 1110 to retract the remainder of the first flexible member 1110a such that the deck hands can collapse and stow the parasail P and the ballast B.

In certain embodiments, the aircraft launch system includes a compliant structure, such as a trampoline, to aid in the launch process. In these embodiments, the compliant structure is erected over part of the deck of the ship (or other moving object), and the fixed-wing aircraft 30 is positioned on the compliant structure before (or after) the aircraft-launch apparatus 10 is attached to the fixed-wing aircraft 30. The compliant structure acts as a damper that dampens forces that would otherwise be exerted on the aircraft-launch apparatus 10 and the fixed-wing aircraft 30 to be damaged as the ship S moves (especially in rough seas), which reduces the potential for damage to these apparatuses.

In other embodiments in which the saddle is that described in U.S. Patent Application Publication No. 2017/0158318, the fixed-wing aircraft launch method incorporates the procedure for releasing the fixed-wing aircraft from the saddle described in U.S. Patent Application Publication No. 2017/0158318.

In another embodiment, the aircraft launch system includes a receptacle attached to the pulley and a locking element attached to the end of the second flexible member near the aircraft launch apparatus. The receptacle is sized to receive the locking element and is configured to engage the locking element responsive to receiving the locking element to retain the locking element therein. The receptacle is also configured to release the locking element responsive to the operator tugging the second flexible member.

In operation, before controlling the first winch to payout the first flexible capture member to enable the parasail to ascend, the operator ensures the locking element is received in the receptacle and that the receptacle engages the locking element to retain the locking element therein. This ensures the aircraft launch apparatus is positioned near the pulley during this part of the launch process. Once the operator desires the aircraft launch apparatus to descent, the operator tugs on the second flexible member to cause the receptacle to disengage the locking element, thereby causing the aircraft launch apparatus to descend. After release of the fixed-wing aircraft, the operator controls the second winch to retract the second flexible member until the locking element is received in the receptacle such that the receptacle retains the locking element therein.

2.2 Parasail-Assisted Fixed-Wing Aircraft Retrieval System and Method

FIGS. 5A-5E are diagrammatic views showing another example parasail-assisted fixed-wing aircraft retrieval system and method of the present disclosure. In this example embodiment, the aircraft retrieval system includes the parasail P, the ballast B, the first winch 1110, the first flexible member 1110a, the second flexible member 2110b, a third flexible member 2110c, the first flexible member attachment device 1112, the pulley 1114, the second flexible member attachment device 2118, the feed-control device 2120, the drag-producing device 1130, and the GPS receiver 1150. These components are described above.

To prepare for retrieval, the operator attaches the first winch 1110 to a suitable area of the ship S in a suitable manner. In this example embodiment, the first winch 1110 is attached below the deck of the ship S. The operator attaches one end of the first flexible member 1110a to the drum of the first winch 1110 and controls the first winch 1110 to retract most of the first flexible member 1110a. The operator attaches the free end of the first flexible member 1110a to the left and right bridle sets of the parasail P. This attaches the parasail P to the first winch 1110. The operator also attaches the ballast B to the left and right bridle sets of the parasail P such that the mass of the ballast B is generally evenly distributed between the left and right bridle sets of the parasail P.

In certain situations, the ship may already be equipped with the first winch, the first flexible member, the parasail, and/or the ballast. In these situations, the operator need not take the above-described steps, and instead leverages the equipment already on the moving object (along with the additional components described above) to retrieve the fixed-wing aircraft from free, wing-borne flight.

Figure 5A:
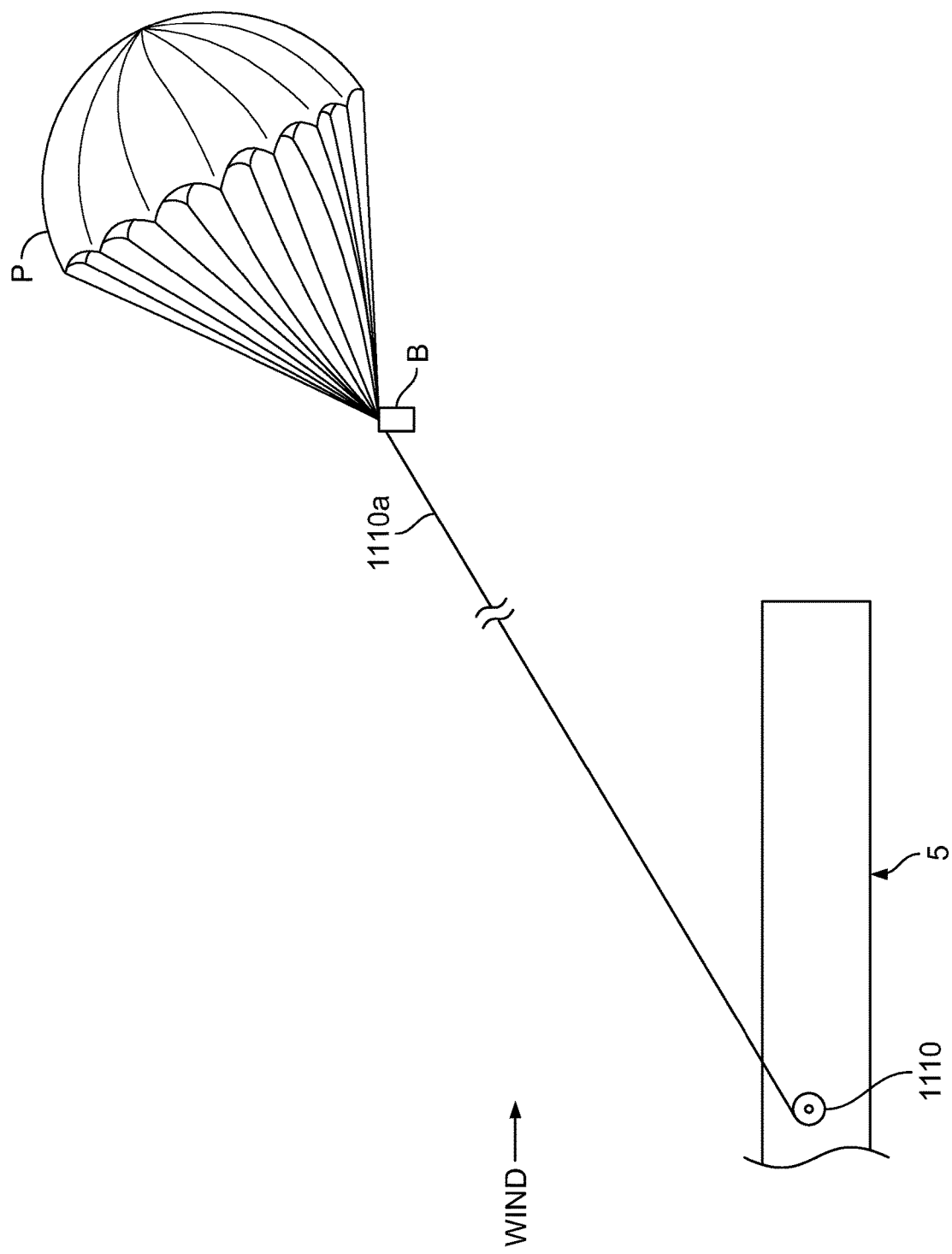

The operator controls the ship S to head into the wind and maintain this course throughout the retrieval process. The operator opens the parasail P and controls the first winch 1110 to payout the first flexible member 1110a until the parasail P reaches a stable flying height, as shown in FIG. 5A. At this point in this example embodiment, about 50-100 feet of the first flexible member 1110a extend between the first winch 1110 and the parasail P.

Figure 5B:
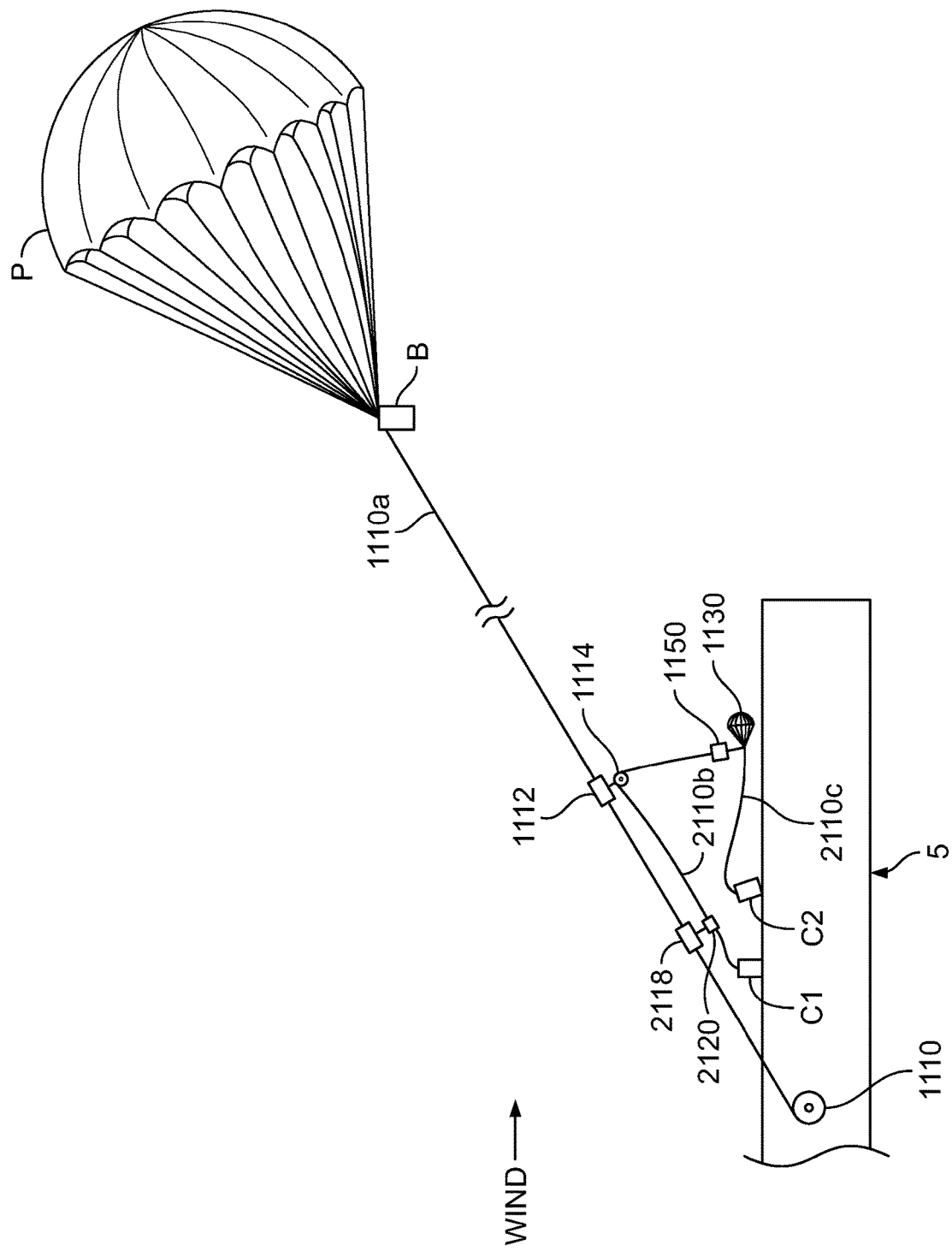

As shown in FIG. 5B, the operator attaches the first flexible member attachment device 1112 (and its attached pulley 1114) to the first flexible member 1110a a first distance from the parasail P. In this example embodiment, the first distance is about 50-100 feet, though it may be any suitable distance in other embodiments. The operator also attaches the second flexible member attachment device 2118 (and its attached feed-control device 2020) to the first flexible member 1110a between the first winch 1110 and the first flexible member attachment device 1112. After attachment: (1) the first flexible member attachment device 1112 is movable along the first flexible member 1110a toward the parasail P but not in the opposite direction; and (2) the second flexible member attachment device 2118 is movable along the first flexible member 1110a away from the parasail P but not in the opposite direction.

The operator feeds one end of the second flexible member 2110b through the feed-control device 2120 and through the flexible member guide 2116, wraps the second flexible member 2110b around the wheel of the pulley 1114, and attaches the second flexible member 2110b to a free end of the third flexible member 2110c, as shown in FIG. 5B. This attaches the first flexible member 1110a to the second flexible member 2110b and to the third flexible member 2110c. At this point, the remainder of the second flexible member 2110b is stored in a container C1 on the deck and the remainder of the third flexible member 2110c is stored in a container C2 on the deck. The operator attaches the drag-producing device 1130 to the second flexible member 2110b near its attachment point to the third flexible member 2110c. The operator attaches the GPS receiver 1150 to the second flexible member 2110b between the pulley 1114 and the drag-producing device 1130.

While holding the feed-control device 2120, the operator controls the first winch 1110 to actively payout the first flexible member 1110a. As that occurs: (1) the paid out first flexible member 1110a travels through the second flexible member attachment device 2118 (which is held stationary relative to the ship S due to the operator holding the feed-control device 2120), which enables the parasail P to ascend via the wind and the continued motion of the ship S; (2) the operator simultaneously controls the feed-control device 2120 to enable the second flexible member 2110b to payout from the container C1 and the third flexible member 2110c to payout from the container C2 (since it's connected to the second flexible member 2110b). While doing so, the operator controls the feed-control device 2120 to maintain enough tension in the second flexible member 2110b to overcome the force of gravity and maintain the GPS receiver 1150 at or near the pulley 1114 and also maintains some amount of tension in the third flexible member 2110c. As the parasail P ascends, it lifts the GPS receiver 1150 and the drag-producing device 1130 off of the deck of the ship S (via the first flexible member attachment device 1112 and the pulley 1114).

Figure 5D:
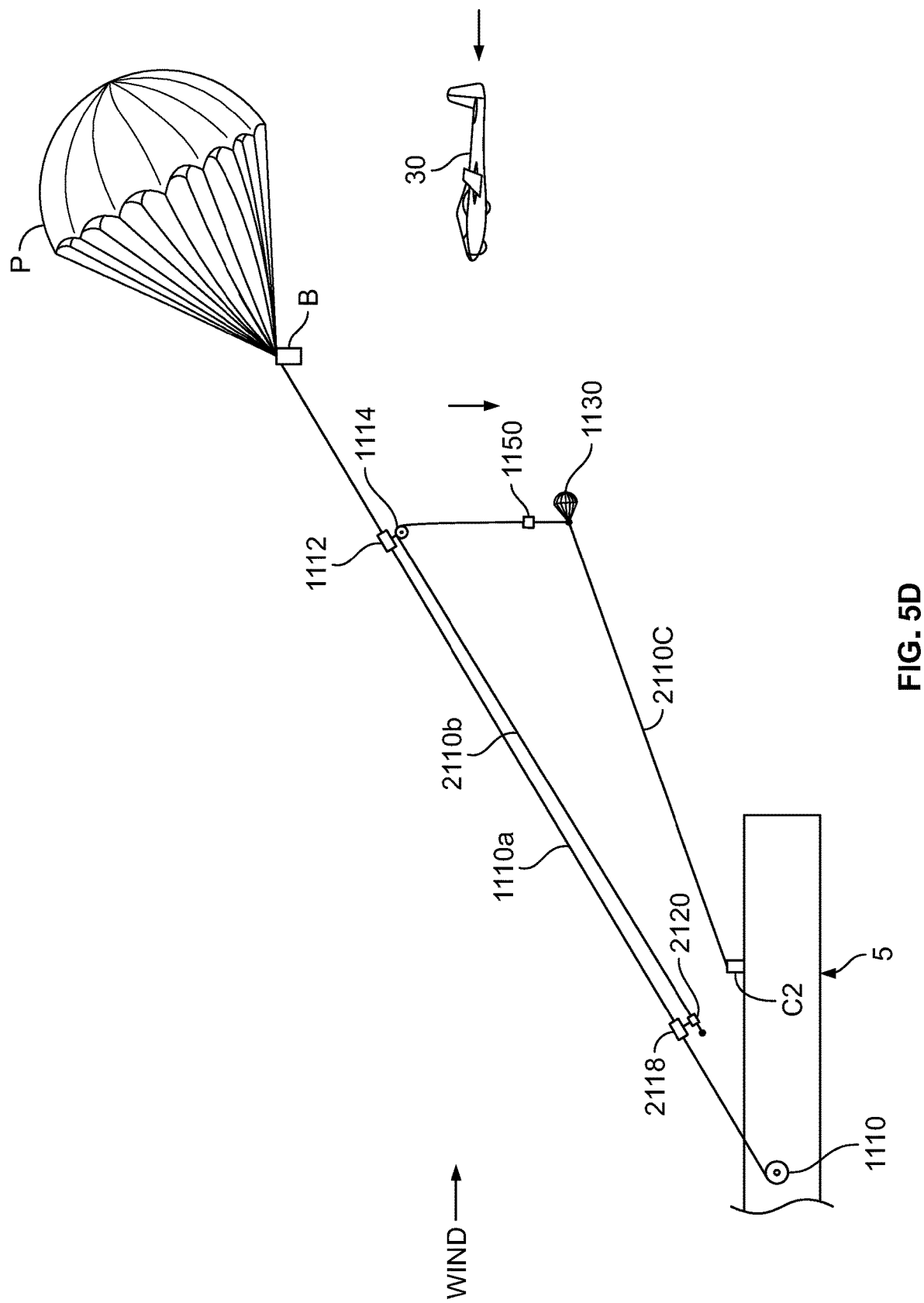

The operator controls the first winch 1110 to stop actively paying out the first flexible member 1110a and controls the feed-control device 2120 to stop enabling the second flexible member 2110b to pay out of the container C1 once about 200 feet (or any other suitable amount) of the first flexible member 1110a extend between the first flexible member attachment device 1112 and the second flexible member attachment device 2118, as shown in FIG. 5C. The operator controls the feed-control device 2120 to enable gravity to pull the GPS receiver 1150 and the drag-producing device 1130 downward relative to the first flexible member 1110a, the first flexible member attachment device 1112, and the pulley 1114, as shown in FIG. 5D. While the pulley 1114 resists descent of the GPS receiver 1150 and the drag-producing device 1130 relative to the pulley 1114, the aircraft-launch apparatus 10 is heavy enough such that gravity overcomes this resistive force. Once a stop device at the free end of the second flexible member 2110b engages the feed-control device 2120, the GPS receiver 1150 and the drag-producing device 1130 have descended as far as they can relative to the pulley 1114 (since the stop device cannot fit through the feed-control device 2120). As this occurs, the drag-producing device 1130 begins producing drag via its interaction with the air. Specifically, the drag-producing device 1130 operates to straighten and tension the portion of the second flexible member 2110b extending between the pulley 1114 and the drag-producing device 1130.

Figure 5E:
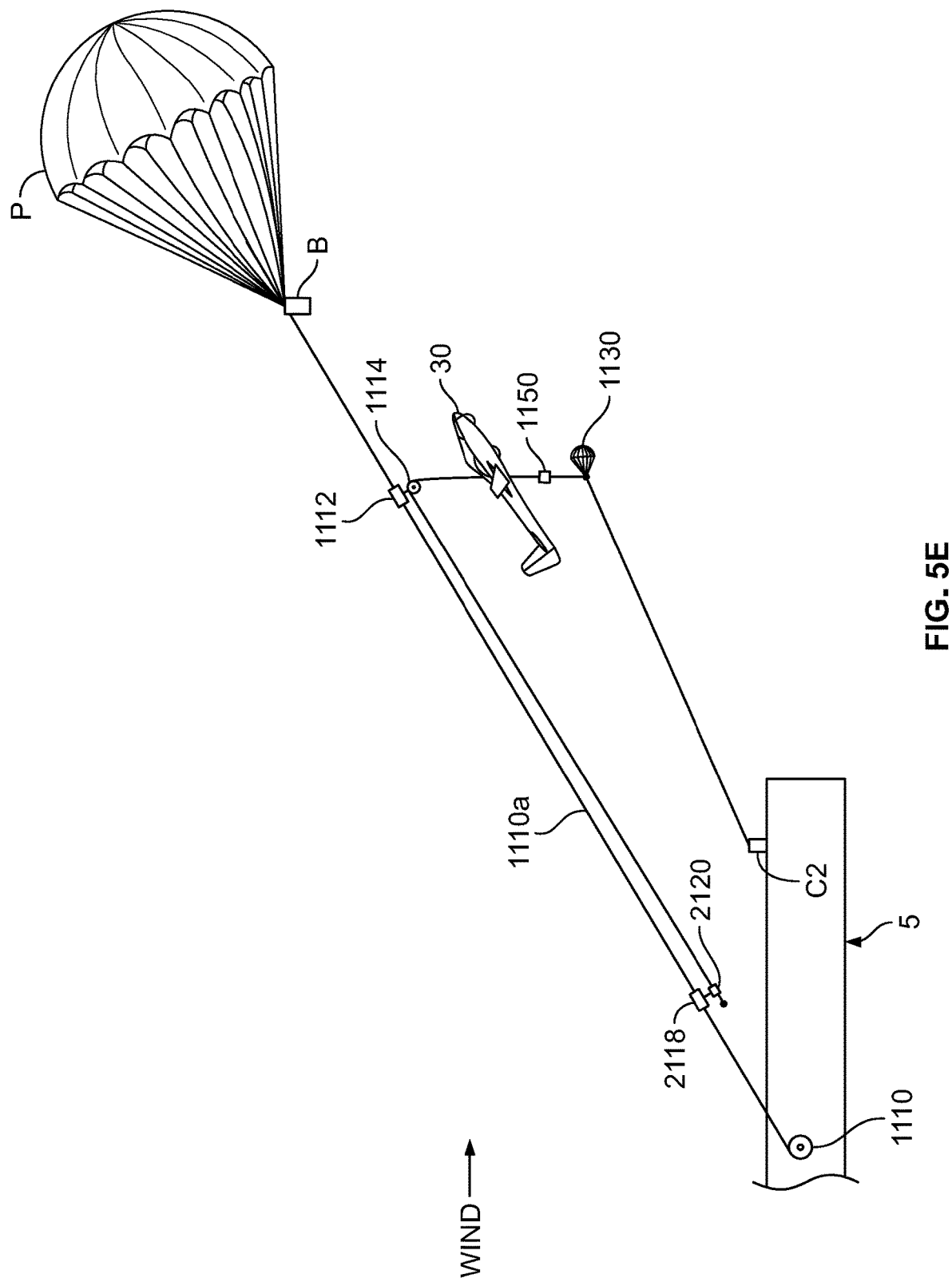

As shown in FIG. 5E, using the GPS coordinates received from the GPS receiver 1150, the operator controls the fixed-wing aircraft 30 to contact and capture a portion of the second flexible member 2110b in a manner similar to that described in U.S. Pat. No. 6,264,140, the entire contents of which are incorporated herein by reference. After capture, the operator grasps the second flexible member attachment device 2118 and, while holding the second flexible member attachment device 2118, controls the first winch 1110 to payout the first flexible member 1110a. The paid out first flexible member 1110a travels through the second flexible member attachment device 2118 (which is held stationary relative to the ship S), which enables the parasail P to ascend via the wind and the continued motion of the ship S. This causes captured fixed-wing aircraft 30, the GPS receiver 1150, and the drag-producing device 1130 to ascend toward the pulley 1114.

Once the captured fixed-wing aircraft reaches the pulley 1114, the operator controls the first winch 1110 to retract the first flexible member 1110a. As this occurs, the operator maintains sufficient tension in the second flexible member 2110b to maintain the captured fixed-wing aircraft 30 at or near the pulley 1114 and maintains sufficient tension in the third flexible member 2110c to prevent substantial movement of the fixed-wing aircraft 30. Once the fixed-wing aircraft 30 reaches the deck of the ship S, the operator controls the first winch 1110 to stop retracting. At this point, deck hands secure the fixed-wing aircraft 30 and detach the first and second flexible member attachment devices 1112 and 2118 from the first flexible member 1110a, which disconnects the first flexible member 1110a from the second flexible member 2110b and the third flexible member 2110c. The operator controls the first winch 1110 to retract the remainder of the first flexible member 1110a such that the deck hands can collapse and stow the parasail P and the ballast B.

Figure 6A:
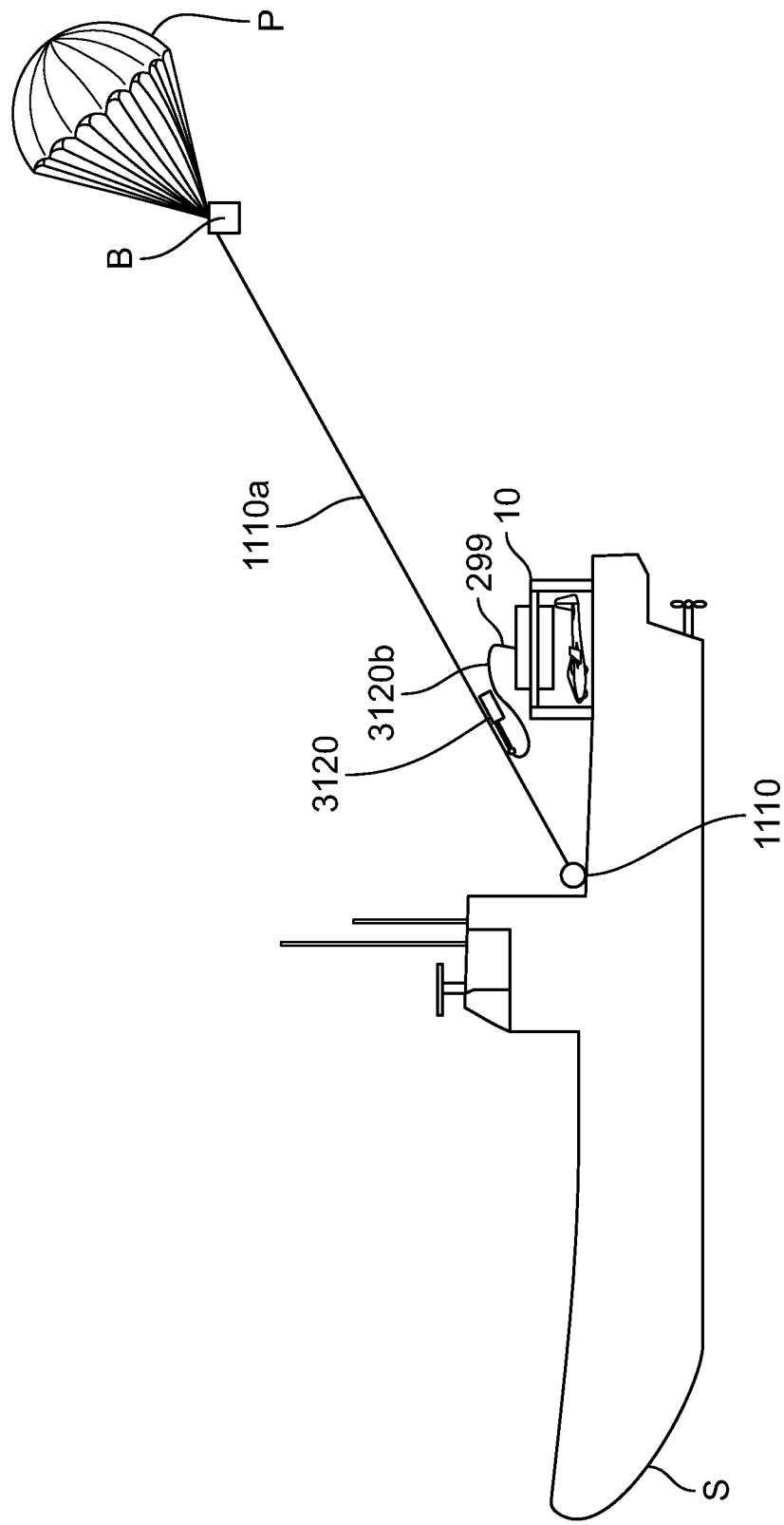
FIGS. 6A-6C are diagrammatic views showing another example parasail-assisted method of launching a fixed-wing aircraft into free, wing-borne flight using an aircraft launch system including a winch and a hoist, wherein the hoist is supported by the parasail tow line.
Figure 6B:
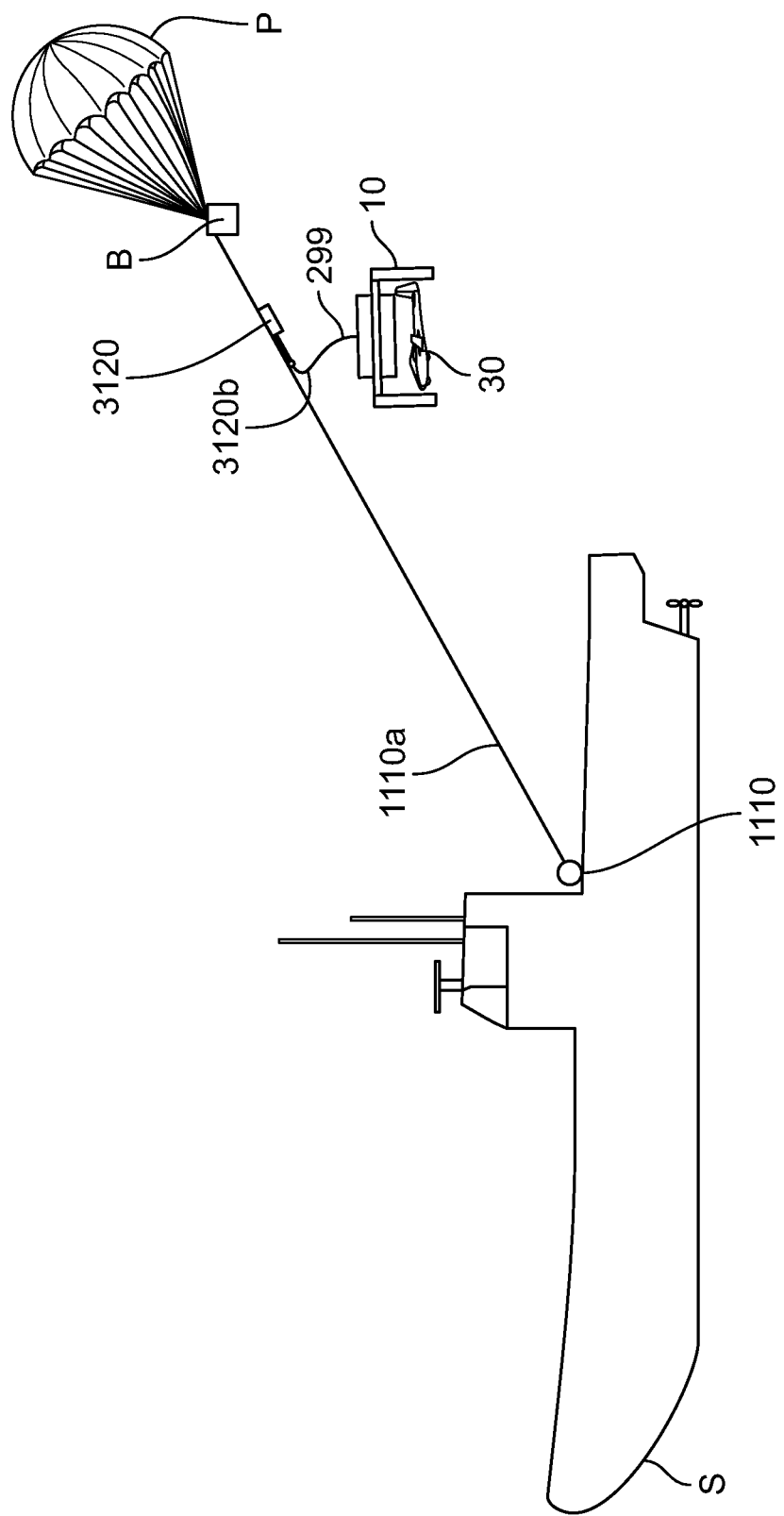
Figure 6C:
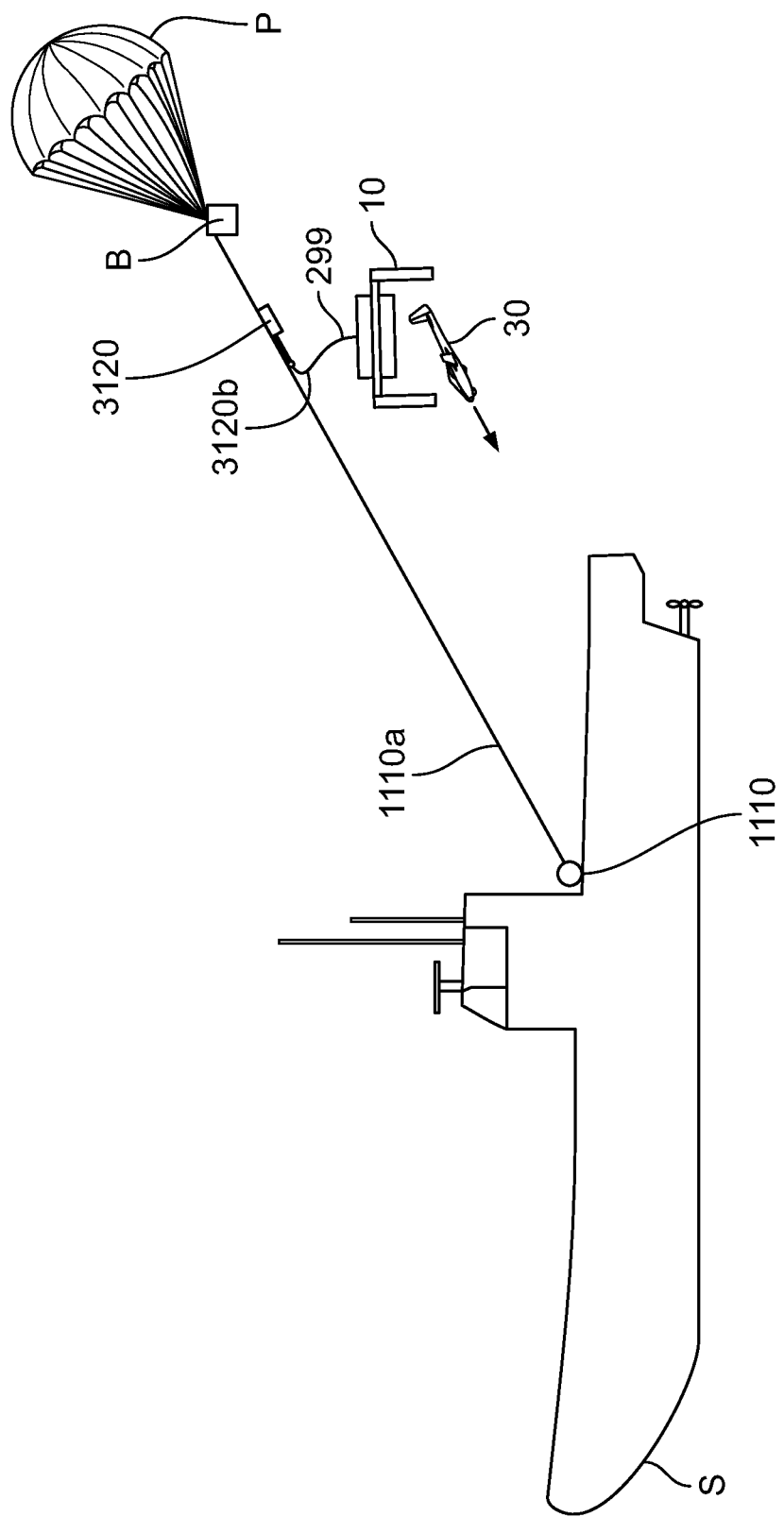

3. Winch and Hoist Embodiment 3.1 Parasail-Assisted Fixed-Wing Aircraft Launch System and Method FIGS. 6A to 6C are diagrammatic views showing another example parasail-assisted fixed-wing aircraft launch system and method of the present disclosure. In this example embodiment, the aircraft launch system includes the parasail P, the ballast B, the aircraft-launch apparatus 10, the winch 1110, the first flexible member 1110a, a hoist 3120, and a second flexible member 3120b.

The parasail P, the ballast B, the aircraft-launch apparatus 10, the winch 1110, and the first flexible member 1110a are described above.

The hoist 3120 includes a winch or other mechanism configured to extend and/or retract the second flexible member 3120b. The second flexible member 3120b includes a suitable rope or other similar flexible element.

Figure 7A:
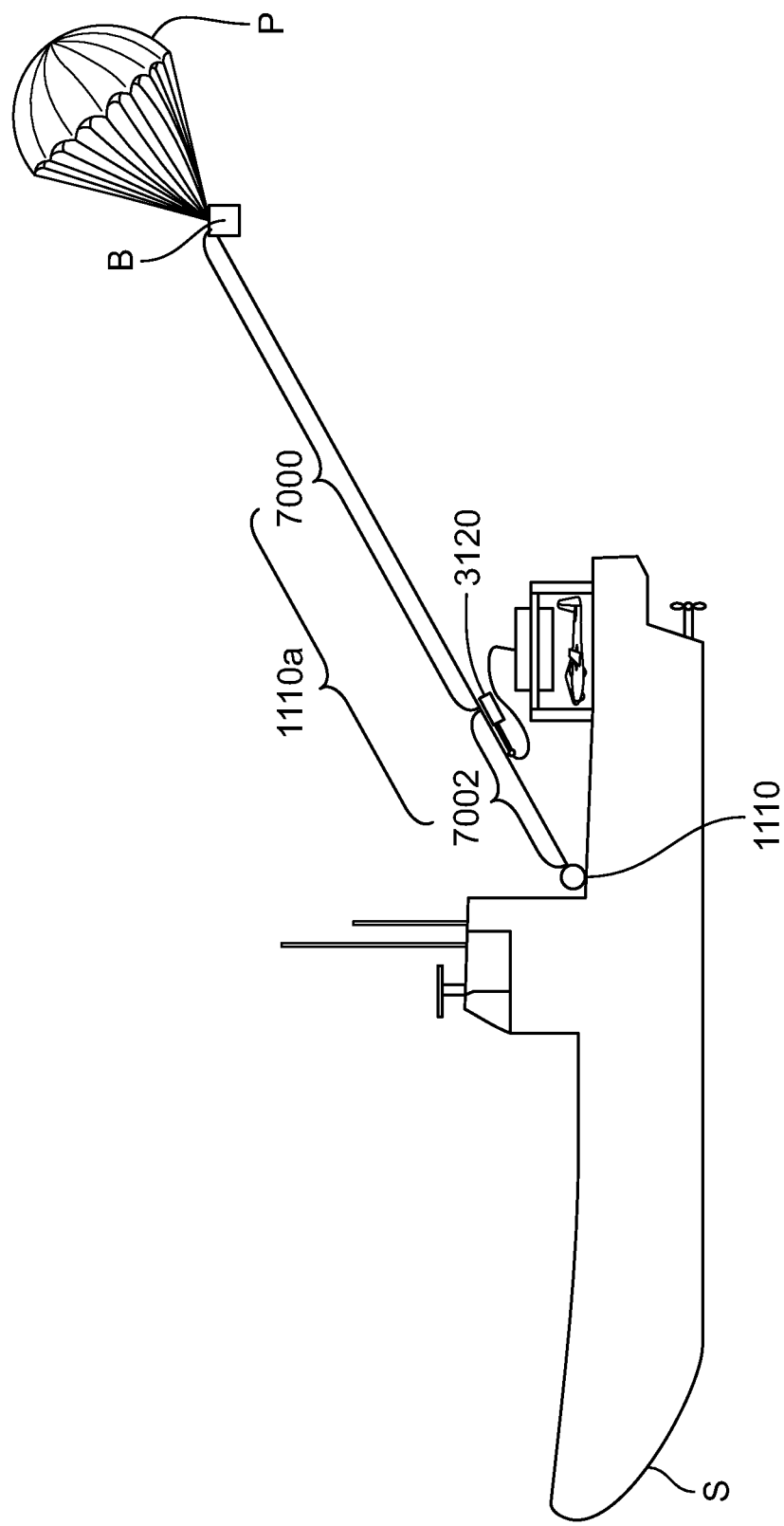
FIGS. 7A and 7B are diagrammatic views showing the spatial relationship between a hoist and parasail of various example embodiments of the present disclosure.
Figure 7B:
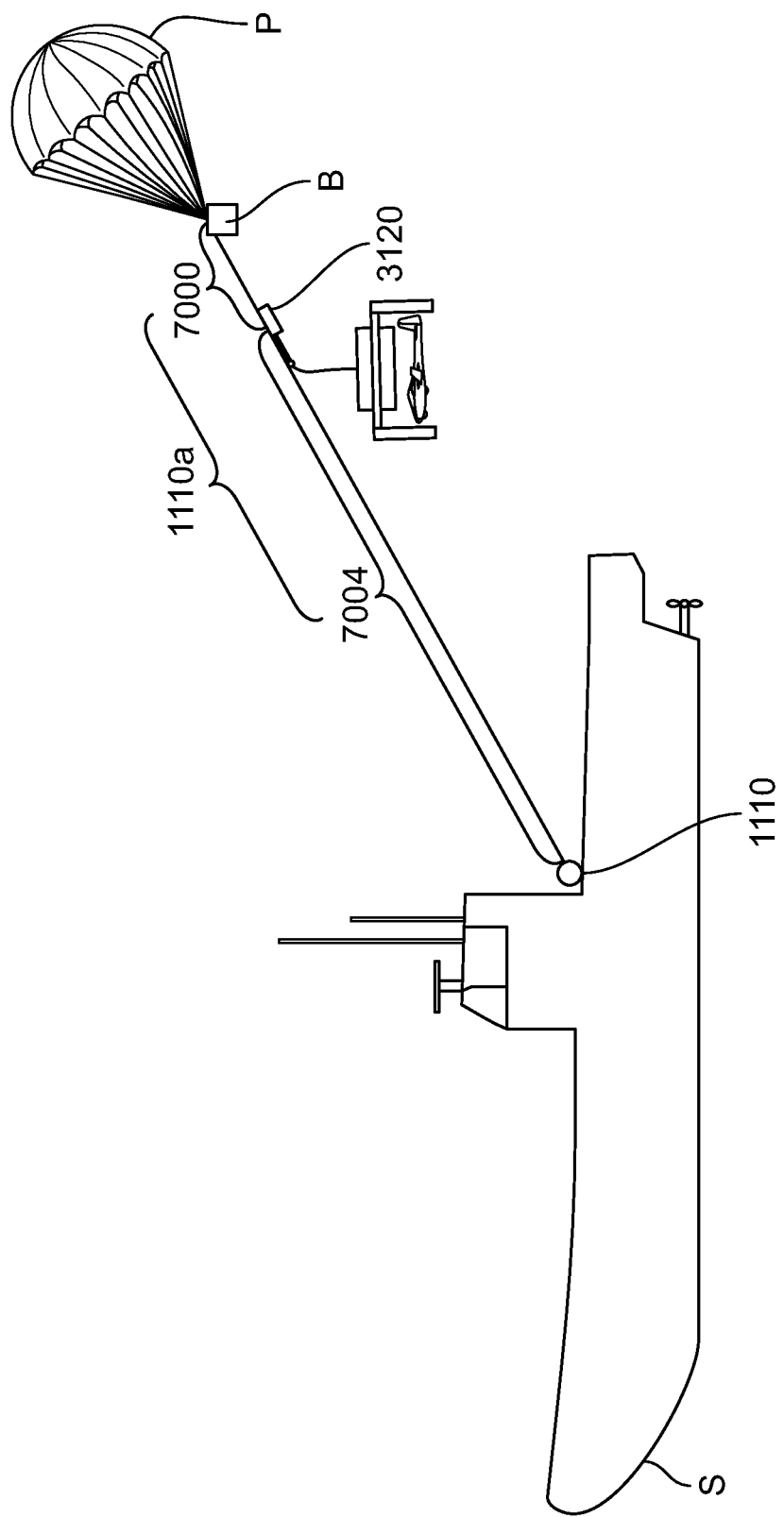

The hoist 3120 includes a suitable device configured to removably attach to the first flexible member 1110a. In this example embodiment, the hoist 3120 includes one or more locking members or connecting members that attach the hoist 3120 to the first flexible member 1110a. This enables the operator to easily extend or retract the hoist 3120 from the ship S by controlling the winch 1110 and enabling the parasail P to ascend and descend. It should be noted that once the hoist 3120 is attached to the first flexible member 1110a, it may remain a fixed distance from the ballast B and/or parasail P. In other words, once the hoist 3120 has been attached to the first flexible member 1110a, the hoist 3120 may rise upward along with the parasail P as the winch 1110 lets out more of the first flexible member 110a. FIGS. 7A and 7B illustrate this feature. This example maintains the benefits of keeping the launching aircraft clear of the area during parasail launch and landing. Further, the hoist is affixed to the first flexible member, so there is no need to synchronize parallel lengths of tether during the critical phases of the launch sequence.

FIG. 7A shows the first flexible member 1110a comprising a first segment 7000 between the ballast B and the hoist 3120, and a second segment 7002 between the hoist 3120 and the winch 1110. Once the hoist 3120 is attached to the first flexible member, the length of the first segment 7000 will not change.

FIG. 7B shows that the parasail has been let out and has risen into the air. The length of segment 7000 remains unchanged, and thus the hoist 3120 has risen along with the parasail. FIG. 7B shows that the length of segment between the hoist 3120 and the winch 1110 has increased. This is segment 7004 in FIG. 7B. Segment 7004 is longer than segment 7002. Consequently, the hoist 3120 and aircraft have departed the aft deck of the ship S.

Referring back to FIGS. 6A to 6C, one or more operators may use the components of the aircraft launch system to launch the fixed-wing aircraft 30 into free, wing-borne flight. A single operator is referred to below for brevity and clarity.

To prepare for launch, the operator attaches the winch 1110 to a suitable area of the ship S in a suitable manner. In this example embodiment, the winch 1110 is attached to the deck of the ship S. The operator attaches one end of the first flexible member 1110a to the drum of the winch 1110 and controls the winch 1110 to retract most of the first flexible member 1110a. The operator attaches the free end of the first flexible member 1110a to the left and right bridle sets of the parasail P. This attaches the parasail P to the first winch 1110. The operator also attaches the ballast B to the left and right bridle sets of the parasail P such that the mass of the ballast B is distributed between the left and right bridle sets of the parasail P. The operator may deliberately distribute the mass unevenly, to force the parasail P to follow the ship off-center, thus maximizing clearance between the flexible members and the launching aircraft during release and climb-out.

In certain situations, the ship S may already be equipped with the winch, the first flexible member, the parasail, and/or the ballast. In these situations, the operator need not take the above-described steps, and instead leverages the equipment already on the moving object (along with the additional components described above) to launch the fixed-wing aircraft into free, wing-borne flight.

The operator opens the parasail P, exposing it to the headwind, and controls the winch 1110 to payout the first flexible member 1110a until the parasail P reaches a stable flying height, as shown in FIG. 6A. At this point in this example embodiment, about 50-100 feet of the first flexible member 1110a extend between the first winch 1110 and the parasail P.

The operator positions the fixed-wing aircraft 30 on the deck, such as on a launch-assist structure (not shown) that can be removably attached to the deck and that retains the fixed-wing aircraft 30 in a desired launch orientation. The operator attaches the hub module 100 of the aircraft-launch apparatus 10 to the fixed-wing aircraft 30 by: (1) operating the front engager servo motor 6341 (either manually or remotely via the R/C controller) to rotate the front engager 6320 to the release rotational position; (2) inserting the trailing edges of the wings of the fixed-wing aircraft 30 into the trailing edge receiving channels 6364a of the pivotable portions 6364 of the rear engagers 6360; (3) positioning the saddle 300 relative to the fixed-wing aircraft 30 such that the leading edge engaging surfaces 6323b and 6326b of the front engager 6320 are adjacent the leading edges of the wings of the fixed-wing aircraft 30; (4) operating the front engager servo motor 6341 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 30; and (5) operating the lock servo motor 6345 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

At this point the fixed-wing aircraft 30 is attached to the saddle 300 because the front engager 6320 and the rear engagers 6360 engage the wings of the fixed-wing aircraft 30 therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6341 cannot rotate the front engager 6320 from the attached rotational position to the release rotational position. This prevents undesired release of the fixed-wing aircraft 30 from the saddle 300 (and the aircraft-launch apparatus 10).

After the hub module 100 is attached to the fixed-wing aircraft 30, the operator attaches the front and rear landing gear modules 600a to 600d to their respective arm modules 400a to 400d and attaches and locks the arm modules 400a to 400d to the hub module 100 to complete assembly of the aircraft-launch apparatus 10.

The operator starts up the engine of the fixed-wing aircraft 30 and controls the ship S to head into the wind and maintains this course throughout the launch process. As shown in FIG. 6A, the operator attaches the hoist 3120 to the first flexible member 1110a a first distance from the parasail P. In this example embodiment, the first distance is about 50-100 feet, though it may be any suitable distance in other embodiments.

The operator attaches one end of the second flexible member 3120b to the snag-prevention member 299 of the aircraft-launch apparatus 10, as shown in FIG. 6B. This attaches the aircraft-launch apparatus 10 to the hoist 3120, and the first flexible member 1110a to the second flexible member 2110b. At this point, the remainder of the second flexible member 2110b is stored in the hoist 3120.

The operator controls the winch 1110 to actively payout the first flexible member 1110a. As that occurs, the paid out first flexible member 1110a enables the parasail P to ascend along with the aircraft-launch apparatus 10. While ascending, the hoist 3120 maintains enough tension in the second flexible member 3120b to overcome the force of gravity and maintain the aircraft-launch apparatus at or near the hoist 3120. As the parasail P ascends, it lifts the aircraft-launch apparatus 10 and the attached fixed-wing aircraft 30 off of the deck of the ship S. Once the aircraft-launch apparatus 10 and the attached fixed-wing aircraft 30 are airborne, as the ship S travels into the wind, the rear landing gear or fins of the aircraft-launch apparatus 10 act as vertical stabilizers ensuring the front of the aircraft-launch apparatus 10 and the nose of the attached fixed-wing aircraft 30 point generally into the relative wind.

The operator controls the winch 1110 to payout the first flexible member 1110a to a predetermined height. In some examples, about 700 feet of the first flexible member 1110a extends between the winch 1110 and the parasail P. The operator controls the hoist to lower the aircraft launch apparatus to about 100 feet below the first flexible member. Then the operator controls the aircraft-launch apparatus 10 to release the fixed-wing aircraft 30 from the saddle 300, as shown in FIG. 6C and as explained above.

After the fixed-wing aircraft 30 is released into free, wing-borne flight, the operator controls the hoist to elevate the aircraft launch apparatus to the first flexible member, and the winch 1110 to retract the first flexible member 1110a until the hoist 3120 and the aircraft-launch apparatus 10 reach the operator. The operator grasps the aircraft-launch apparatus 10 and the hoist 3120 and removes them from the first flexible member 1110a. The deck hands disassemble and stow the aircraft-launch apparatus 10. The operator controls the winch 1110 to retract the remainder of the first flexible member 1110a such that the deck hands can collapse and stow the parasail P and the ballast B.

In certain embodiments, the aircraft launch system includes a compliant structure, such as a trampoline, to aid in the launch process. In these embodiments, the compliant structure is erected over part of the deck of the ship (or other moving object), and the fixed-wing aircraft 30 is positioned on the compliant structure before (or after) the aircraft-launch apparatus 10 is attached to the fixed-wing aircraft 30. The compliant structure acts as a damper that dampens forces that would otherwise be exerted on the aircraft-launch apparatus 10 and the fixed-wing aircraft 30 to be damaged as the ship S moves (especially in rough seas), which reduces the potential for damage to these apparatuses.

In other embodiments in which the saddle is that described in U.S. Patent Application Publication No. 2017/0158318, the fixed-wing aircraft launch method incorporates the procedure for releasing the fixed-wing aircraft from the saddle described in U.S. Patent Application Publication No. 2017/0158318.

3.2 Parasail-Assisted Fixed-Wing Aircraft Retrieval System and Method

FIGS. 6D-6G are diagrammatic views showing another example parasail-assisted fixed-wing aircraft retrieval system and method of the present disclosure. In this example embodiment, the aircraft retrieval system includes the parasail P, the ballast B, the winch 1110, the first flexible member 1110a, the hoist 3120, the second flexible member 3120b, a reel 3130, a third flexible member 3130c, and the GPS receiver 3150. Some of these components are described above.

To prepare for retrieval, the operator attaches the winch 1110 to a suitable area of the ship S in a suitable manner. In this example embodiment, the winch 1110 is attached to the deck of the ship S. The operator attaches one end of the first flexible member 1110a to the drum of the winch 1110 and controls the winch 1110 to retract most of the first flexible member 1110a. The operator attaches the free end of the first flexible member 1110a to the left and right bridle sets of the parasail P. This attaches the parasail P to the winch 1110. The operator also attaches the ballast B to the left and right bridle sets of the parasail P such that the mass of the ballast B is distributed between the left and right bridle sets of the parasail P.

In certain situations, the ship may already be equipped with the winch, the first flexible member, the parasail, and/or the ballast. In these situations, the operator need not take the above-described steps, and instead leverages the equipment already on the moving object (along with the additional components described above) to retrieve the fixed-wing aircraft from free, wing-borne flight.

The operator controls the ship S to head into the wind and maintains this course throughout the retrieval process. The operator opens the parasail P and controls the winch 1110 to payout the first flexible member 1110a until the parasail P reaches a stable flying height, as shown in FIG. 6D. At this point in this example embodiment, about 50-100 feet of the first flexible member 1110a extend between the winch 1110 and the parasail P.

As shown in FIG. 6D, the operator attaches the hoist 3120 to the first flexible member 1110a a first distance from the parasail P. In this example embodiment, the first distance is about 50-100 feet, though it may be any suitable distance in other embodiments.

The operator attaches the second flexible member 3120b to a free end of the third flexible member 3130c, as shown in FIG. 6D. This attaches the first flexible member 1110a to the second flexible member 3120b and to the third flexible member 3130c. At this point, the remainder of the second flexible member 3120b is stored in the hoist 3120, and the remainder of the third flexible member 3130c is stored on the reel 3130. The operator may attach a drag-producing device to the second flexible member 3120b near its attachment point to the third flexible member 3130c. The operator attaches the GPS receiver 3150 to the second flexible member 3120b, also near this location. Alternatively, the GPS receiver may be attached at the hoist location, but the location described above may be preferred when accuracy and clearance to the first flexible member is important.

The operator controls the winch 1110 to actively payout the first flexible member 1110a. As that occurs, the operator allows the reel 3130 to pay-out the third flexible member 3130c from the reel 3130. While doing so, the operator controls the hoist 3120 to maintain enough tension in the second flexible member 3120b to overcome the force of gravity and maintain the GPS receiver 3150 at or near hoist 3120 and also maintains some amount of tension in the third flexible member 3130c. As the parasail P ascends, it lifts the GPS receiver 3150 and any attached drag-producing device off of the deck of the ship S.

Figure 6E:
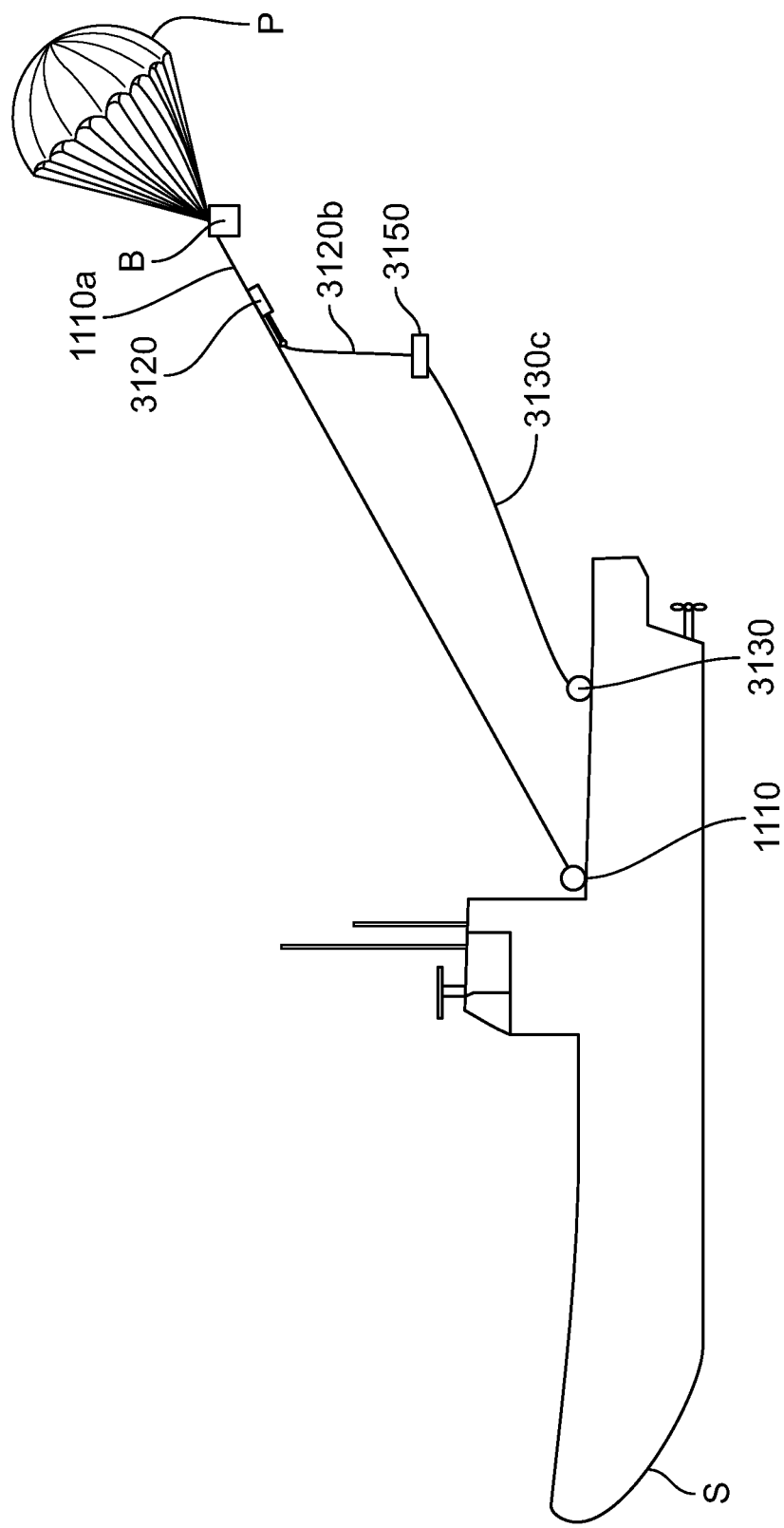

The operator controls the winch 1110 to stop actively paying out the first flexible member 1110a and controls the reel 3130 to stop enabling the third flexible member 3130c to pay out of the reel 3130 once a sufficient length of the first flexible member 1110a extends from the winch 1110 to the parasail P, as shown in FIG. 6E. The operator controls the hoist 3120 to enable gravity and aerodynamic drag to pull the GPS receiver 3150 downward relative to the first flexible member 1110a as shown in FIG. 6E.

Figure 6F:
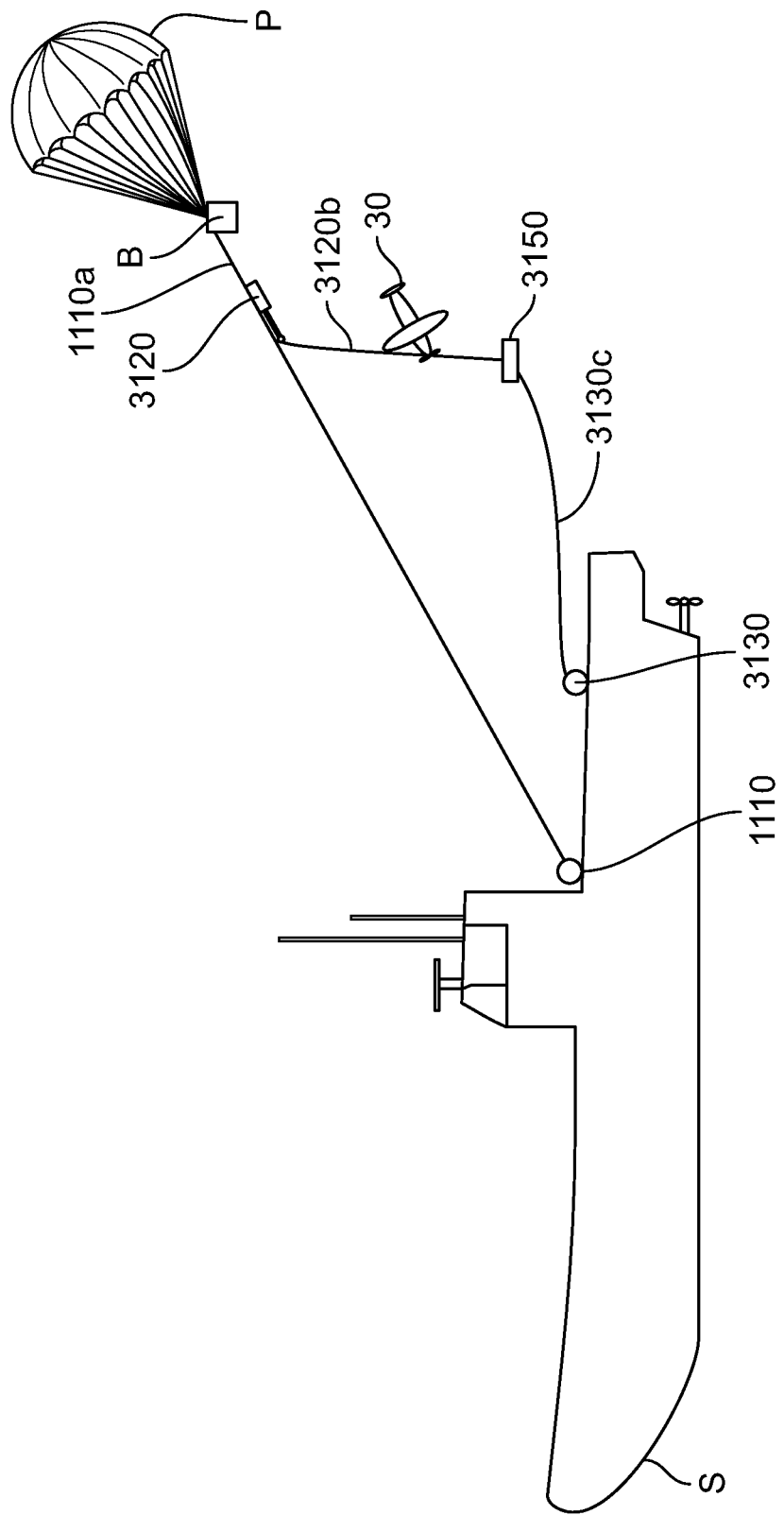
Figure 6G:
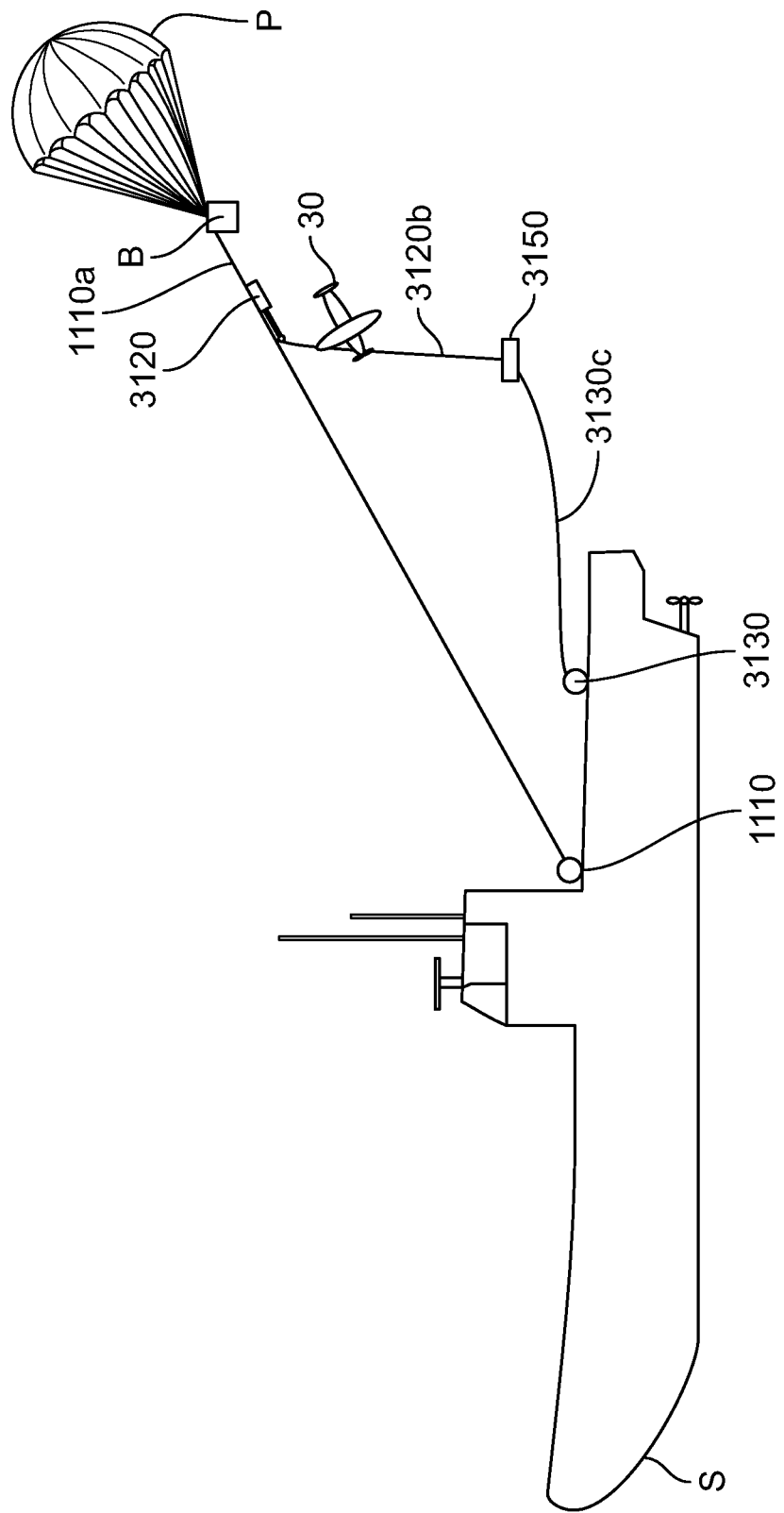

As shown in FIG. 6F, using the GPS coordinates received from the GPS receiver 3150, the operator controls the fixed-wing aircraft 30 to contact and capture a portion of the second flexible member 3120b in a manner similar to that described in U.S. Pat. No. 6,264,140, the entire contents of which are incorporated herein by reference. After capture, the operator controls the hoist 3120 to retract the second flexible member 3120B into the hoist 3120, and raise the captured fixed-wing aircraft 30 toward the first flexible member 1110a.

Once the captured fixed-wing aircraft reaches the hoist 3120, the operator controls the winch 1110 to retract the first flexible member 1110a. As this occurs, the operator maintains sufficient tension in the third flexible member 3130c using the reel 3130 to keep the GPS receiver from dipping into the water. Once the fixed-wing aircraft 30 reaches the deck of the ship S, the operator controls the winch 1110 to stop retracting. At this point, deck hands secure the fixed-wing aircraft 30 and detach the hoist from the first flexible member 1110a, which disconnects the first flexible member 1110a from the second flexible member 3120b The operator then controls the winch 1110 to retract the remainder of the first flexible member 1110a such that the deck hands can collapse and stow the parasail P and the ballast B.

In some embodiments, usage of the concepts described herein may take the form of a primary or host ship and its tender. For example, the host ship may be a larger ship configured to store the secondary ship as its tender. The tender in turn may be a rigid hulled inflatable boat (RHIB) specially configured for launch and retrieval of the aircraft. As such, the tender may be configured to store specialized hardware such as the parasail winch or winches, parasail launching mast, aircraft launch cradle, engine cooling system for the aircraft, and engine starter for the aircraft. Further, the tender may have an enlarged deck for use in connection with the launching and retrieval of the aircraft as described herein.

In some examples, the hardware may also be engaged with suitable quick disconnect fittings to the tender. This can allow quick swapping of the hardware with seats or other components when not in use.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A method for parasail assisted aircraft launch, the method comprising:
deploying a parasail having a parasail towrope above a wake of a ship;
affixing an aircraft hoisting device to the parasail towrope;
paying out the parasail towrope, forcing the aircraft hoisting device and aircraft aloft to a predetermined altitude;
remotely controlling a winch of the aircraft hoisting device mounted to the parasail towrope; and
releasing the aircraft from the aircraft hoisting device into free flight.

2. The method of claim 1, including restraining the aircraft using a launch cradle before liftoff from a deck of the ship.

3. The method of claim 2, including movably attaching the launch cradle to a parasail launching mast.

4. The method of claim 2, including moving the launch cradle to a stowed position when not in use.

5. The method of claim 2, including maintaining azimuth alignment of the launch cradle with the parasail towrope by pivoting the launch cradle about the parasail mast.

6. The method of claim 1, including stabilizing the parasail using a ballast affixed to a bridle of the parasail.

7. The method of claim 1, including flying the parasail asymmetrically as the result of an uneven ballast.

8. The method of claim 1, including deploying the parasail using a powered winch.

9. The method of claim 1, including stabilizing the aircraft about one or more axis before launch release using tail feathers of the aircraft hoisting device.

10. The method of claim 1, including causing a temporary trampoline structure to bridge across an aft portion of the ship for pre lift-off staging of the parasail and aircraft hoisting device.

11. The method of claim 1, including operating the aircraft hoisting device remotely from the ship.

12. The method of claim 1, including disabling a release function of the aircraft hoisting device until the predetermined altitude is achieved.

13. The method of claim 1, including paying out a length of towrope between the parasail and the aircraft hoisting device, wherein the length is sized to ensure the parasail remains above an air-wake of a superstructure of the ship before the aircraft is hoisted from a deck of the ship.

14. A method for parasail assisted aircraft recovery, the method comprising:
deploying a parasail having a parasail towrope above a wake of a ship;
affixing an aircraft capture rope to the parasail;
affixing a global positioning system (GPS) reference device to a rope ascending device affixed to the aircraft capture rope;
intercepting a fixed-wing aircraft via the capture rope; and
lowering the fixed-wing aircraft to a deck of the ship.

15. The method of claim 14, including stabilizing the parasail using a ballast affixed to a bridle of the parasail.

16. The method of claim 15, including affixing a drag producing device to the aircraft capture rope proximate the GPS reference device.

17. The method of claim 16, including controlling a position of the drag producing device using a payout device.

18. The method of claim 17, including maintaining the position of the drag producing device.

19. The method of claim 17, including maintaining the drag producing device in a deflated state until impact by the fixed-wing aircraft.

20. The method of claim 14, including affixing a hoisting device to the parasail towrope.

21. The method of claim 20, including hoisting the fixed-wing aircraft toward the parasail towrope before lowering the fixed-wing aircraft to the deck of the ship.

22. The method of claim 20, including positioning the hoisting device with a predetermined length of towrope between the parasail and the hoisting device, wherein the length is sufficient to keep the parasail flying above an air wake of a superstructure of the ship, until the fixed-wing aircraft is lowered onto the deck of the ship.

23. The method of claim 14, including reducing, using the rope ascending device, a distance between the GPS reference device and the fixed-wing aircraft after the fixed-wing aircraft has intercepted the aircraft capture rope.

24. A method for launching a fixed-wing aircraft into wing-borne flight, the method comprising:
controlling a first winch connected to a parasail via a first flexible member to payout part of the first flexible member;
attaching a second flexible member to the first flexible member; and
remotely controlling a second winch connected to an aircraft launch device via the second flexible member to payout part of the second flexible member to cause the aircraft launch device to descend relative to the first flexible member.

25. A fixed-wing aircraft launching system comprising:
a parasail having a parasail tow rope and configured to be deployed above a wake of a ship;
a winch configured to deploy the parasail; and
an aircraft hoisting device affixable to the parasail tow rope and moveable with respect to the parasail tow rope;
wherein the aircraft hoisting device is configured to grip a fixed-wing aircraft and to release the fixed-wing aircraft after the fixed-wing aircraft has reached a predetermined altitude.

26. A fixed-wing aircraft recovery system comprising:
a parasail having a parasail tow rope and configured to be deployed above a wake of a ship, wherein the parasail includes an uneven ballast and is configured to fly asymmetrically as the result of the uneven ballast;
a winch configured to deploy the parasail; and
an aircraft hoisting device affixable to the parasail tow rope;
wherein the aircraft hoisting device is configured to shorten a distance between the parasail tow rope and the fixed-wing aircraft before lowering the fixed-wing aircraft to a deck of the ship.

27. A method for parasail assisted aircraft launch, the method comprising:
deploying a parasail having a parasail towrope above a wake of a ship;
affixing an aircraft hoisting device to the parasail towrope;
restraining the aircraft using a launch cradle before liftoff from a deck of the ship;
maintaining azimuth alignment of the launch cradle with the parasail towrope by pivoting the launch cradle about the parasail mast;
paying out the parasail towrope, forcing the aircraft hoisting device and aircraft aloft to a predetermined altitude; and
releasing the aircraft from the aircraft hoisting device into free flight.

28. A method for parasail assisted aircraft launch, the method comprising:
deploying a parasail having a parasail towrope above a wake of a ship, wherein the parasail is flown asymmetrically as the result of an uneven ballast;
affixing an aircraft hoisting device to the parasail towrope;
paying out the parasail towrope, forcing the aircraft hoisting device and aircraft aloft to a predetermined altitude; and
releasing the aircraft from the aircraft hoisting device into free flight.

29. A method for parasail assisted aircraft launch, the method comprising:
deploying a parasail having a parasail towrope above a wake of a ship;
affixing an aircraft hoisting device to the parasail towrope;
paying out the parasail towrope, forcing the aircraft hoisting device and aircraft aloft to a predetermined altitude;
disabling a release function of the aircraft hoisting device until the predetermined altitude is achieved; and
releasing the aircraft from the aircraft hoisting device into free flight.

30. A method for parasail assisted aircraft recovery, the method comprising:
deploying a parasail having a parasail towrope above a wake of a ship;
stabilizing the parasail using a ballast affixed to a bridle of the parasail;
affixing an aircraft capture rope to the parasail;
affixing a global positioning system (GPS) reference device to the aircraft capture rope;
affixing a drag producing device to the aircraft capture rope proximate the GPS reference device;
controlling a position of the drag producing device using a payout device;
maintaining the drag producing device in a deflated state until impact by the fixed-wing aircraft;
intercepting a fixed-wing aircraft via the capture rope; and
lowering the fixed-wing aircraft to a deck of the ship.

* * * * *